US012746496B2

(12) United States Patent
Choi et al.

(10) Patent No.: US 12,746,496 B2
(45) Date of Patent: Sep. 29, 2026

(54) INDOOR UNIT FOR AIR CONDITIONER

(71) Applicant: LG ELECTRONICS INC., Seoul (KR)

(72) Inventors: Sunggyu Choi, Seoul (KR); Kangyoung Kim, Seoul (KR); Eunsun Lee, Seoul (KR); Jungwon Lee, Seoul (KR); Junseok Bae, Seoul (KR); Myeonggu Kang, Seoul (KR); Giyeong Gyeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 18/649,782

(22) Filed: Apr. 29, 2024

(65) Prior Publication Data

US 2024/0278156 A1 Aug. 22, 2024

Related U.S. Application Data

(63) Continuation of application No. 17/879,969, filed on Aug. 3, 2022, now Pat. No. 11,969,682, which is a (Continued)

(30) Foreign Application Priority Data

Mar. 7, 2018 (KR) ........................ 10-2018-0026970
Feb. 14, 2019 (KR) ........................ 10-2019-0017451

(51) Int. Cl.
*B01D 46/68* (2022.01)
*B01D 46/00* (2022.01)
(Continued)

(52) U.S. Cl.
CPC ..... *B01D 46/0008* (2013.01); *B01D 46/0002* (2013.01); *B01D 46/0013* (2013.01); (Continued)

(58) Field of Classification Search
CPC ... B01D 46/0008; B01D 46/68; B01D 46/681
See application file for complete search history.

(56) References Cited

U.S. PATENT DOCUMENTS

2009/0173683 A1 7/2009 Burrows .............. B01D 61/025 210/234
2010/0129013 A1 5/2010 Schroeder ............ B01D 61/025 210/234
(Continued)

FOREIGN PATENT DOCUMENTS

CN 1795803 A 7/2006
CN 101105308 A 1/2008
(Continued)

OTHER PUBLICATIONS

Notice of Allowance of Korean Patent Office in Appl'n No. 10-2021-0001778, dated Jan. 18, 2022.
(Continued)

*Primary Examiner* — Robert A Hopkins
(74) *Attorney, Agent, or Firm* — Bryan Cave Leighton Paisner LLP

(57) ABSTRACT

The indoor unit for the air conditioner according to the present invention includes: a cabinet assembly forming an external appearance of the indoor unit and having an air suction port formed in a rear of the cabinet assembly; a filter module disposed at the air suction port to filter dust contained in air being introduced through the air suction port; a filter cleaner configured to move upward and downward in a rear of the filter module to remove foreign substances stuck in the filter module; a guide rail vertically disposed on one side of the filter module and configured to guide upward and downward movement of the filter cleaner.

18 Claims, 36 Drawing Sheets

Related U.S. Application Data continuation of application No. 16/294,626, filed on Mar. 6, 2019, now Pat. No. 11,541,342.

(51) Int. Cl.
*B01D 46/12* (2022.01)
*B01D 46/48* (2006.01)
*B01D 46/681* (2022.01)
*F24F 1/0073* (2019.01)
*F24F 8/108* (2021.01)
*F24F 8/90* (2021.01)

(52) U.S. Cl.
CPC ......... *B01D 46/0032* (2013.01); *B01D 46/12* (2013.01); *B01D 46/48* (2013.01); *B01D 46/68* (2022.01); *B01D 46/681* (2022.01); *F24F 1/0073* (2019.02); *F24F 8/108* (2021.01); *F24F 8/90* (2021.01); *B01D 2279/50* (2013.01)

(56) References Cited

U.S. PATENT DOCUMENTS

| | | | |
|---|---|---|---|
| 2010/0192768 | A1 | 8/2010 | Kim et al. |
| 2014/0331859 | A1 | 11/2014 | Gruenbacher et al. |
| 2015/0202559 | A1 | 7/2015 | Oh et al. |
| 2018/0008926 | A1 | 1/2018 | Oishi et al. |
| 2018/0178260 | A1 | 6/2018 | Yu et al. |
| 2019/0183301 | A1 | 6/2019 | Hwang et al. |
| 2021/0008480 | A1 | 1/2021 | Oishi et al. |
| 2021/0307578 | A1 | 10/2021 | Hwang et al. |

FOREIGN PATENT DOCUMENTS

| | | | | | |
|---|---|---|---|---|---|
| CN | 101105310 | A | | 1/2008 | |
| CN | 101105314 | A | | 1/2008 | |
| CN | 101109564 | A | | 1/2008 | |
| CN | 101135491 | A | | 3/2008 | |
| CN | 201059693 | Y | | 5/2008 | |
| CN | 201069243 | Y | | 6/2008 | |
| CN | 101270913 | A | | 9/2008 | |
| CN | 101278158 | A | | 10/2008 | |
| CN | 101278159 | A | | 10/2008 | |
| CN | 101408326 | A | | 4/2009 | |
| CN | 101424423 | A | * | 5/2009 | ................ F24F 8/90 |
| CN | 101581468 | A | | 11/2009 | |
| CN | 101581471 | A | | 11/2009 | |
| CN | 101737934 | A | | 6/2010 | |
| CN | 101808711 | A | | 8/2010 | |
| CN | 202411022 | U | | 9/2012 | |
| CN | 103008289 | A | | 4/2013 | |
| CN | 104816921 | A | | 8/2015 | |
| CN | 105492835 | A | | 4/2016 | |
| CN | 106687752 | A | | 5/2017 | |
| CN | 107013973 | A | | 8/2017 | |
| CN | 107140394 | A | | 9/2017 | |
| CN | 206526017 | U | | 9/2017 | |
| CN | 107514696 | A | | 12/2017 | |
| CN | 108126434 | A | | 6/2018 | |
| CN | 108361815 | A | | 8/2018 | |
| CN | 108906786 | A | | 11/2018 | ......... G01N 35/1016 |
| CN | 209651234 | U | | 11/2019 | |
| EP | 2 095 030 | A2 | | 9/2009 | |
| EP | 2 908 065 | A1 | | 8/2015 | |
| JP | 2000046390 | A | | 2/2000 | |
| JP | 2005308391 | A | | 11/2005 | |
| JP | 2009058143 | A | | 3/2009 | |
| JP | 2013-148233 | A | | 8/2013 | |
| KR | 20060073936 | A | | 6/2006 | |
| KR | 10-2008-0052883 | A | | 6/2008 | |
| KR | 20080058733 | A | | 6/2008 | |
| KR | 10-2008-0078199 | A | | 8/2008 | |
| KR | 20100117224 | A | | 11/2010 | |
| KR | 20120061515 | A | | 6/2012 | |
| WO | WO-2008018680 | A2 | | 2/2008 | .............. F24F 13/28 |
| WO | 2014/182986 | A1 | | 11/2014 | |
| WO | 2017/028710 | A1 | | 2/2017 | |
| WO | WO-2017204868 | A1 | | 11/2017 | ......... G01N 35/1016 |
| WO | 2018/038473 | A1 | | 3/2018 | |

OTHER PUBLICATIONS

Office Action of the Chinese Patent Office in Appl'n No. 201910173036.2, dated Sep. 22. 2020.

* cited by examiner

INDOOR UNIT FOR AIR CONDITIONER

CROSS-REFERENCE TO RELATED APPLICATION

This application is a Continuation of U.S. patent application Ser. No. 17/879,969, filed on Aug. 3, 2022, which is a Continuation of U.S. patent application Ser. No. 16/294,626, filed on Mar. 6, 2019, now U.S. Pat. No. 11,541,342, which claims the priority benefit of Korean Patent Application No. 10-2018-0026970, filed on Mar. 7, 2018 and Korean Patent Application No. 10-2019-0017451, filed on Feb. 14, 2019, the contents of which are all hereby incorporated by reference herein in their entirety.

BACKGROUND OF THE INVENTION

1. Field of the Invention

The present invention relates to an indoor unit for an air conditioner and, more particularly, to an indoor unit for an air conditioner, which includes a filter cleaner to clean a filter.

2. Description of the Related Art

An indoor unit for an air conditioner may adjust required indoor temperature by discharging air heat-exchanged with a refrigerant to an indoor space. The indoor unit for the air conditioner suctions indoor air through an air suction port, make the suctioned air to exchange heat with a refrigerant, and discharge the heat-exchanged air to an air discharge port.

In indoor unit for the air conditioner may be divided into a ceiling-mounted type, a wall-mounted type, and a stand-alone type. In a standalone indoor unit, an outlet may be formed at the front or either side of a cabinet, and an air suction port may be formed in the rear of the cabinet.

Since the stand-alone indoor unit is disposed with an outlet facing an indoor space, an outlet disposed in the rear of cabinet is disposed to face a wall surface or an edge of the indoor space. Therefore, even a filter disposed at the air suction port to filter foreign substances may be disposed on a rear surface of the cabinet.

It is difficult to change an installation position of the stand-alone indoor unit due to size or weight of the product or arrangement of a refrigerant tube. Thus, a user should replace or clean the filter from the back of the cabinet. This may cause inconvenience to the user due to limitation in a space where the air suction unit is installed.

Chinese Patent Application Publication No. 103008289 discloses a standalone-type air conditioner having an air suction port formed in the rear. At the air suction port formed in the rear of the indoor unit, a filter is disposed, and a filter cleaner is disposed in the rear of the filter and capable of moving upward and downward with respect to the filter and suctioning foreign substances from the filter.

However, in the above disclosure, the filter cleaner capable of moving in upward and downward directions cleans an area limited in a left and right direction. In a structure including the aforementioned filter cleaner, a filter is required to move in the left-right direction in order to clean in the left-right direction. Therefore, the aforementioned related art discloses a structure in which arrangement of a filter can be changed in the left and right direction.

In addition, in the structure where arrangement of the filter can be changed in the left-right direction, as described above, the filter is required to deform in shape in order to move in a limited left-right area in the left-right direction. Therefore, the aforementioned related art discloses a structure in which the shape of the filter an be deformed at left and right ends thereof.

Accordingly, in a structure in which arrangement or shape of a filter is not changed, it is difficult to apply the above description. In particular, in a filter structure including a dust collecting device or a deodorization filter, arrangement and deformation of shape of the filter is strictly limited, and thus, such a filter structure cannot be applied to various filters, and, even in a structure in which a plurality of different filters are used together, it is difficult to apply the above description.

In addition, a filter cleaner according to the aforementioned related art discloses a feature of removing foreign substances stuck in a filter by employing a suctioning method. Since a filter is a device for chemically or physically filtering flowing foreign substances, foreign substances stuck in the filter may not be removed properly only by means of airflow. In general, refrigerators are home appliances for storing foods at a low temperature in a storage space that is covered by a door.

SUMMARY OF THE INVENTION

The first object of the present invention is to provide an indoor unit for an air conditioner which allows a filter disposed a fixed position and having a fixed shape in rear of the indoor unit to be maintained in a clean condition. That is, it is to provide an indoor unit for an air conditioner which provides a separate filter cleaner for cleaning a filter, in addition to a user's cleaning of the filter, the filter cleaner which moves upward and downward with respect to the fixed filter to clean.

In order to separate foreign substances stuck in the filter and move upward and downward with respect to the filter module positioned in upward and downward directions, a structure in which the filter cleaner is allowed to move with maintaining a predetermined distance from the filter module is required. Besides, the more the elements is included in the filter cleaner, the heavier the weight of the filter cleaner becomes, and, in this case, upward and downward movement may require burden. The second object of the present invention is to provide a structure in which a filter cleaner is enabled to move upward and downward with maintaining a predetermined distance from a filter positioned in upward and downward directions.

Since foreign substances stuck in the filter is foreign substances stuck in the course of being introduced into the filter, a physical force is required to separate the foreign substances stuck in gaps in the filter from the filter. In addition, foreign substances separated from the filter may be introduced to the filter again, and thus, a procedure for removing the re-introduced dust may be needed. The third object of the present invention is to addressing a problem relating to separating such dust from a filter and removing the dust.

The fourth object of the present invention is to provide an indoor unit for an air conditioner having a dust container disposed in a filter cleaner in rear of the indoor unit, wherein a user is allowed to insert or draw the dust container from a position in front of the indoor unit.

For the filter cleaner, a structure having a plurality of functions is required: the plurality of functions includes easily detaching a dust container, and forming an air flow path to allow dust to flow into the dust container when the dust container is mounted to the filter cleaner. The fifth object of the present invention is to provide an indoor unit for an air conditioner capable of performing the plurality of functions with a simple structure.

Objects of the present invention are not limited to the aforementioned objects, and other objects not mentioned in the above may be clearly comprehended to those of skill in the art to which the embodiment pertains through the following description.

In order to achieve the aforementioned objects, an indoor unit for an air conditioner according to the present invention may include a suction port in a rear thereof, a filter module disposed at the suction port, a filter cleaner moving upward and downward in rear of the filter module, and a guide rail guiding the upward and downward movement of the filter cleaner, so that the filter moving upward and downward may remove foreign substances stuck in the filter module.

In addition, the filter cleaner includes a mobile gear for movement, a guide roller, an agitator for cleaning, and a dust container. The dust container is disposed below the agitator with a structure where foreign substances separated by the agitator can be contained, and the guide roller may bring the filter cleaner to enable cleaning the filter module by the agitator. Accordingly, the filter cleaner is able to move in close contact with the filter module at a distance which allows removing the dust from the filter module upon operation of the agitator.

The filter cleaner may further include a suction fan configured to form airflow so that the foreign substances separated from the filter module due to rotation of the agitator flows into the dust container, thereby sending the foreign substances separated by the agitator to the dust container.

The guide rail may include: a gear rail forming a thread to be engaged with the mobile gear; and a roller rail disposed in rear of the gear rail and forming a rib structure to which the guide roller is mounted, and accordingly, the filter cleaner is capable of stably moving along the guide rail.

The gear rail is formed on both surfaces of the guide rail, and the mobile gear includes a pair of mobile gear disposed to be respectively engaged with gear rails formed on the both side surfaces of the guide rail, and accordingly, the filter cleaner is capable of stably moving along the guide rail.

The roller rail is formed in rear of the gear rail on both side surfaces of the guide rail, and the guide roller comprises at least one pair of guide rollers to be respectively mounted to roller rails formed on the both side surfaces of the guide rail, and accordingly, the filter cleaner is capable of moving in close contact with the filter module.

The guide roller further include: an upper guide roller mounted above the mobile gear to move along the guide rail, and bringing the filter cleaner into close contact with the filter module; and a lower guide roller mounted below the upper guide roller to move along the guide rail, and bringing the filter cleaner into close contact with the filter module, and accordingly, the filter cleaner is capable of stably moving along the guide rail.

The filter cleaner includes: a base cover forming an external appearance of the filter cleaner and disposed to face the filter module; and an outer cover forming the external appearance of the filter cleaner and coupled to a rear of the base cover, and a guide rail groove is formed in the base cover in upward and downward directions to receive the guide rail.

The mobile gear is disposed on an inner surface of the base cover, and disposed such that part of the mobile gear protrudes toward the guide rail groove through a mobile gear hole formed on one side of the guide rail groove, and accordingly, the filter cleaner is capable of stably moving along the guide rail.

Each of the upper guide roller and the lower guide roller is disposed in a guide roller groove portion formed concave rearward on an outer surface of the base cover, and each of the upper guide roller and the lower guide roller is disposed such that part thereof protrudes toward the guide rail groove, and accordingly, the filter cleaner is capable of stably moving along the guide rail.

The upper guide roller and the lower guide roller are disposed rearward of the mobile gear, and accordingly, the filter cleaner is capable of stably moving along the guide rail.

A magnetic force generator for generating a magnetic force to limit upward movement of the filter cleaner is disposed in an upper portion of the guide rail, and the filter cleaner includes a hall sensor configured to sense the magnetic force generated by the magnetic force generator, and accordingly, upward movement of the filter cleaner may be limited.

A lower plate is provided in a lower portion of the guide rail to limit downward movement of the filter cleaner, and the filter cleaner includes a lower detection sensor configured to sense contact with the lower plate, and accordingly, downward movement of the filter cleaner may be limited.

The filter cleaner includes: an agitator groove forming a space where the agitator is rotatably disposed; and a communication hole formed on one side of the agitator groove to communicate with the dust container, and accordingly, foreign substances separated from the filter module by the agitator may flow into the dust container.

A duster formed at a lower end of the communication hole in a direction of rotation of the agitator and contacting an end portion of the agitator is formed in the agitator groove, and accordingly, foreign substances stuck on the agitator may be separated and then flow to the dust container.

The filter cleaner further includes a connection housing connecting the agitator groove to the dust container.

The connection housing guides the dust container to be inserted and drawn, and forms a space where the dust container is to be inserted.

The dust container includes a magnetic member for maintaining a state in which the dust container is mounted to the filter cleaner, so that the state in which the dust container is mounted may be stably maintained.

A dust container fixing member subject to an attracting force from the magnetic member acts on is disposed is disposed in the connection housing at an end portion of the space where the dust container is to be inserted, and accordingly, the state in which the dust container is mounted may be stably maintained.

The dust container is inserted into a side surface of the filter cleaner and has a curved shape convex rearward so as to have a structure in which the dust container inserted into the filter cleaner disposed in the rear thereof is drawn in a forward direction.

The dust container includes: a dust container body forming a space where dust is contained; an upper cover disposed above the dust container body and having a dust container suction port formed therein; a lower cover disposed below the dust container body and having a discharge port formed therein; a dust container filter disposed within the lower cover, and filtering dust contained in air discharged through the discharge port; and a dust container filer mount having the dust container filter mounted therein, and accommodated within the lower cover.

The filter cleaner further includes a side brush part disposed on one side of the agitator to be in contact with an end portion of the filter module, and accordingly, it is possible to remove foreign substances even from an outer end portion of the filter module.

Details of other embodiments are included in the following description and the accompanying drawings.

According to an indoor unit for an air conditioner of the present invention, there are one or more effects as below.

According to the above solutions, first, the indoor unit of the present invention has a structure in which a filter cleaner moves upward and downward with respect to a filter module positioned in upward and downward directions and the filter cleaner removes foreign substances stuck in the filter module as an agitator rotates in friction with the filter module. As the foreign substances stuck in the filter module is separated by the friction with the agitator, there is an advantage in that the filter can be managed clean. In doing so, air with dust removed therefrom is discharged through an air outlet, thereby maintaining an indoor space in a clean and pleasant condition.

Second, as the guide roller serving to bring the filter cleaner into close contact with the filter module is movably mounted to the guide rail, the filter cleaner is allowed to stably move in an up-down direction of the filter and the agitator is allowed to maintain friction with the filter module, and thus, there is an advantage in that the filter module may be maintained in a clean condition.

Third, foreign substances stuck in the filter may be separated by the agitator included in the filter cleaner and the separated foreign substances is suctioned by the suction fan toward a dust container, and thus, there is an advantage in that foreign substances stuck in the filter may be cleaned effectively.

Fourth, as the dust container to be inserted into and drawn from the filter cleaner has a shape convex rearward and a dust container receiving hole, through which the dust container is received, is formed on a side surface of the filter cleaner, the dust container may be drawn in a forward direction, and thus, there is an advantage in that a user is allowed to easily insert or draw the dust container of the filter cleaner disposed in rear of the indoor unit from a position in front of the indoor unit.

Fifth, the connection housing coupled to the inside of the base cover forms a space to receive the dust container, a flow path toward the dust container, and a structure connected to the suction fan. This is a simple structure and there is an advantage in that a stable fixed structure of the dust container and a structure to allow dust to be smoothly introduced into the dust container may be formed.

Effects of the present invention may not be limited to the above and other objects and other objects which are not described may be clearly comprehended to those of skill in the art to which the embodiment pertains through the following description.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
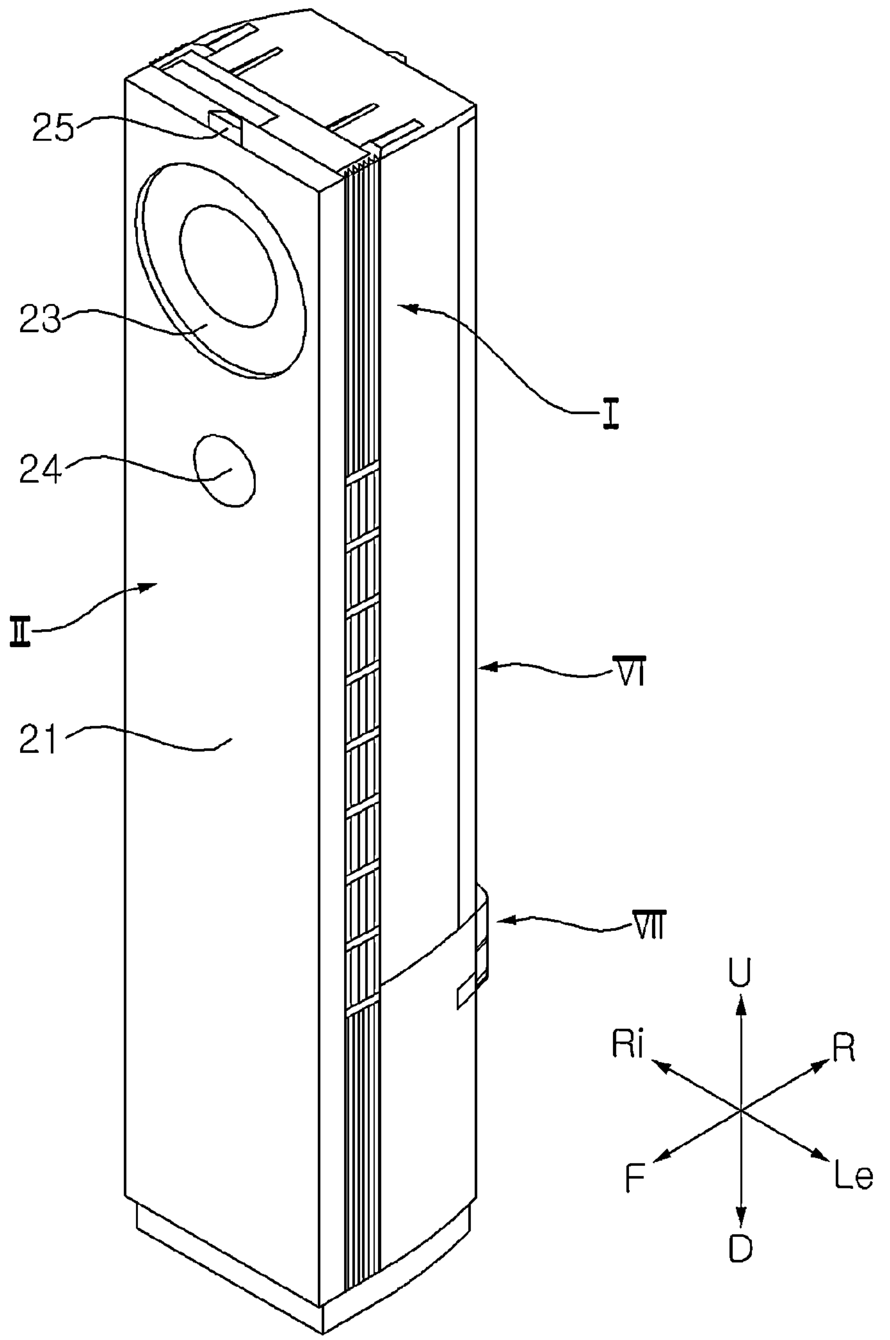
FIG. 1 is a front perspective view of an indoor unit according to an embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Throughout the present specification, like numbers refer to like elements.

In the following description, the terms "first," "second," etc. are used only to avoid confusion between components, and do not indicate the sequence or importance of the components. The directions of "upward (U)", "downward (D)", "leftward (Le)", "rightward (Ri)", "forward (F)", and "rearward (R)" in drawings are used for convenience of explanation but do not limit the scope of the present invention. Thus, the aforementioned directions may be differently defined.

Hereinafter, an indoor unit for an air conditioner according to embodiments of the present invention will be described with reference to the accompanying drawings.

First, referring to FIGS. 1 to 5, all assembly structures of an air conditioner according to an embodiment will be described schematically, and each assembly structure will be described schematically.

<Overall Configuration>

An indoor unit for an air conditioner according to an embodiment may include a cabinet assembly I forming an external appearance of the indoor unit and having an open front surface, a door assembly II covering the open front surface of the cabinet assembly I, a blower assembly La disposed within the cabinet assembly I to generate airflow; a heat exchange assembly N exchanging heat of air flowing by the blower assembly III with a refrigerant, a filter assembly VI filtering air introduced into the cabinet assembly I, a filter cleaning assembly VII removing foreign substances existing on one side surface of the filter assembly VI, and a humidifying assembly V discharging humidified air to the outside of the cabinet assembly I.

<Cabinet Assembly>

The cabinet assembly I according to the present embodiment may include an upper cabinet 11 forming an air suction port 111 in the rear thereof and having a space where a heat exchanger 41 is installed, a base unit 12 disposed below the upper cabinet 11 and forming a space where some elements of the humidifying assembly V are disposed, a lower cabinet 13 covering the rear side and lateral sides of the base unit 12, and a side discharge member 14*a* and 14*b* disposed between the upper cabinet 11 and the door assembly II and forming a side discharge port 141 through which air is discharged.

At a portion where the air suction port 111 is formed on the rear surface of the upper cabinet 11, the filter assembly VI is mounted. On the open front surface of the upper cabinet 11, the door assembly II is disposed. The upper cabinet 11 is disposed above the lower cabinet 13. The upper cabinet 11 is disposed above the base unit 12. The upper cabinet 11 is disposed behind the door assembly II.

The upper cabinet 11 may form a space where the heat exchanger 41, a front blowing module 31, and lateral blowing modules 32*a*, 32*b*, and 32*c* are disposed. Within the upper cabinet 11, a heat exchanger mounting member (not shown) to which the heat exchanger 41 is mounted, a front blowing module mounting member (not shown) to which the front blowing module 31 is mounted, and a lateral blowing module mounting member (not shown) to which the lateral blowing modules 32*a*, 32*b*, and 32*c* are mounted may be disposed.

The filter assembly VI may be disposed in the rear of the upper cabinet 11. The filter assembly VI includes a plurality of filter modules 62*a*, 62*b*, 62*c*, and 62*d* that is disposed in the rear of the upper cabinet 11 in leftward and rightward directions.

A guide rail 711 guiding movement of the filter cleaner 72 is disposed between the plurality of filter modules 62*a*, 62*b*, 62*c*, and 62*d* that is disposed in the rear of the upper cabinet 11 in the in the leftward and rightward directions. The guide rail 711 guiding movement of the filter cleaner 72 may be disposed in the rear of the upper cabinet 11. The guide rail 711 is disposed to protrude rearward from the middle of the plural filter modules 62*a*, 62*b*, 62*c*, and 62*d* that is disposed in the rear of the upper cabinet 11 in thein the leftward and rightward directions.

At a portion in the rear of the upper cabinet 11, where the guide rail 711 is mounted, an ionizing part (not shown) may be disposed. The ionizing part may receive a high voltage and ionize air flowing toward the air suction port 111 by electric discharge.

The upper cabinet 11 is disposed in the rear of the side discharge member 14*a* and 14*b*. The upper cabinet 11 is disposed above the base unit 12.

The base unit 12 is disposed below the upper cabinet 11. The base unit 12 forms a space where elements of the humidifying assembly V, such as a water tank 51, a heating unit 52, etc., are disposed. A power supply device 73 wound around by a power line 731 connected to the filter cleaning assembly VII may be disposed within the base unit 12.

The base unit 12 may take a box shape having an open front surface. The lower cabinet 13 and part of the side discharge members 14*a* and 14*b* may be disposed on an outer circumference of the base unit 12. A power line through-hole 133 which is penetrated by the power line 731 connected to the filter cleaning assembly VII, and a humidifying tube through hole (hot shown) which is penetrated by a humidifying tube 54 the humidifying assembly V may be formed in the base unit 12. The door assembly II may be disposed on the front surface of the base unit 12. The upper cabinet 11 may be mounted above the base unit 12. On the upper side of the base unit 12, an additional support member 121 for supporting a structure disposed above the base unit 12 may be further mounted.

In the rear of the base unit 12, a power line cover tube hole 122 penetrated by a power line cover tube 733 may be formed.

While the base unit 12 and the upper cabinet 11 disposed in upward and downward directions are coupled to each other, the door assembly II is disposed on the front surfaces of the base unit 12 and the upper cabinet 11.

The lower cabinet 13 may cover the lateral surfaces and the rear surface of the base unit 12. Since the lower cabinet 13 is disposed external to the base unit 12, the lower cabinet 13 is capable of reinforcing strengthens of the base unit 12. The guide rail 711 guiding movement of the filter cleaner 72 of the filter cleaning assembly VII, a lower plate 7131 limiting downward movement of the filter cleaner 72, and a rearward protruding cover 131 having a power line hole 1312, through which the power line 731 connected to the filter cleaner 72 is exposed from the inside of the base unit 12 to the outside, may be disposed On the rear surface of the lower cabinet 13. The lower plate 7131 is disposed above the rearward protruding cover 131.

The guide rail 711 and the lower plate 7131 may be configured separately from the lower cabinet 13. The rearward protruding cover 131 protrudes from the rear of the lower cabinet 13, and the power line hole 1312 is formed on the upper side of the rearward protruding cover 131. The power line hole 1312 is formed at a position corresponding to a lower plate groove 7131*a* formed in the lower plate 7131 and a guide groove 7113 formed in the guide rail 711. That is, the power line hole 1312, the lower plate groove 7131*a*, and the guide groove 7113 may be disposed at positions corresponding thereto in upward and downward directions, so that the power line 731 is capable of stably continuing.

Some elements of the power line cover tube 733 which will be described below may be disposed inside the rearward protruding cover 131, the power line cover tube 733 which minimizes friction with an external configuration due to movement of the power line 731 disposed within the base unit 12.

A distance from a top surface 1311 of the rearward protruding cover 131 to an upper end 13*a* of the lower cabinet 13 may be greater than a distance D2 by which the filter cleaner 72 of the filter cleaning assembly VII described below is formed in upward and downward directions.

A refrigerant hole 132 penetrated by a refrigerant tube (not shown) of the heat exchange assembly IV may be formed on the rear surface of the lower cabinet 13. The power line hole 1312 penetrated by a power line, which supplying power from an external power source, may be formed on the rear surface of the lower cabinet 13.

The side discharge members 14*a* and 14*b* may be disposed between the upper cabinet 11 and the door assembly II. The side discharge member 14*a* and 14*b* may be disposed between the lower cabinet 13 and the door assembly II. The side discharge members 14*a* and 14*b* may cover part of side surfaces of the indoor unit for the air conditioner.

The side discharge port 141 for discharging air flowing by the lateral blowing modules 32*a*, 32*b*, and 32*c* described below may be formed on both side surfaces of the side discharge members 14*a* and 14*b*. A plurality of vanes 142 guiding a direction of air to be discharged may be disposed at the side discharge port 141. The plurality of vanes may be integrally formed with the side discharge members 14*a* and 14*b*. The plurality of vanes according to the present embodiment may be inclined in a forward direction, enabled to guide air discharged to the outside of the cabinet to flow in the forward direction.

<Door Assembly>

The door assembly II includes a door plate 21 covering the front surface of the indoor unit and having a front discharge port 22 at one side, a door moving member (not shown) moving the door plate 21 in leftward and rightward directions, a discharge port cover 23 opening and closing the front air discharge port 22 formed in the door plate 21, and a cover moving member (not shown) moving the front discharge port cover 23 in upward and downward directions.

The door moving member according to the present embodiment is capable of moving the door plate 21 in the in the leftward and rightward directions in the front of the cabinet assembly I. The cover moving member according to the present embodiment may move the discharge port cover 23 to open or close the front discharge port 22 by moving the discharge port cover 23. The cover moving member may move the discharge port cover 23 in a direction downward of the front discharge port 22. When the front discharge port 22 is opened by the movement of the discharge port cover 23, the front blowing module 31 described below may be exposed to an outside. The front blowing module 31 may move in a forward-backward direction of the front discharge port 22 which is open.

The door assembly II may further include a display unit displaying an operation state of the indoor unit or receiving a user's command, and a camera sensor 25 sensing a condition of an indoor space. Here, the condition of the indoor space may include a size of the indoor space, the number of people existing in the indoor space, and a position of a person in the indoor space.

The display unit 24 according to the present embodiment may be disposed below the front discharge port 22. The camera sensor 25 according to the present embodiment may be disposed above the door plate 21.

<Blower Assembly>

A blower assembly III includes a front blowing module 31 discharging air in a direction forward of the indoor unit, and lateral blowing modules 32*a*, 32*b*, or 32*c* discharging air in directions from both side surfaces of the indoor unit. The blowing assembly if according to the present embodiment may include one front blowing module 31 and three lateral blowing modules 32*a*, 32*b*, and 32*c*. The front blowing module 31 and the lateral blowing modules 32*a*, 32*b*, and 32*c* are disposed in front of the heat exchange assembly N.

The front blowing module 31 is disposed above the lateral blowing modules 32*a*, 32*b*, and 32*c*. The front blowing module 31 discharges air toward a front discharge port 22 that is formed in a door plate 21.

The front blowing module 31 according to the present embodiment may be configured such that a direction which the discharge port faces is capable of rotating upward, downward, leftward, rightward, or diagonally. Thus, while the discharge port of the front blowing module 31 is disposed forward of the front discharge port 22, the front blowing module 31 may adjust an air discharging direction in a manner in which an air discharging portion rotates upward, downward, leftward, rightward, or diagonally.

The front blowing module 31 may include a front blowing fan 311, a front blowing motor 312, and a front blowing fan housing 313. The front blowing module 31 according to the present embodiment is a structure of the front blowing fan 311 and the front blowing housing 313, and air discharged therefrom may reach a far distance forward.

The lateral blowing modules 32_a_, 32_b_, and 32_c_ are disposed below the front blowing module 31. The lateral blowing modules 32_a_, 32_b_, and 32_c_ according to the present embodiment may be provided in plural in upward and downward directions. Each of the lateral blowing modules 32_a_, 32_b_, and 32_c_ may discharge air through a side discharge port 141.

The lateral blowing module 32_a_, 32_b_, and 32_c_ may be disposed in front of the heat exchanger 41, and discharge heat-exchanged air toward the side discharge port 141. Air flowing by the lateral blowing module 32_a_, 32_b_, and 32_c_ may flow along the vanes 142 disposed in the side discharge port 141.

<Heat Exchange Assembly>

A heat exchange assembly IV exchanges heat of indoor air, suctioned into an upper cabinet 11, with a refrigerant. The heat exchange assembly IV may include a heat exchanger 41 in which the refrigerant to exchange heat with the indoor air flows, and a refrigerant tube (not shown) forming a refrigerant flow path along which the refrigerant is introduced into or exhausted from the heat exchanger 41.

The refrigerant tube may include a refrigerant inflow tube (not shown) in which a refrigerant introduced into the heat exchanger 41 flows, and a refrigerant exhaust tube (not shown) in which a refrigerant exhausted from the heat exchanger 41 flows.

The heat exchanger 41 is disposed in rear of a blower assembly III. The heat exchange 41 may be disposed between an air suction port 111 and an air discharge port 22 or 141 to allowing air flowing in the indoor unit to be heat-exchanged. The heat exchanger 41 is disposed between a filter assembly VI and the blower assembly III. The heat exchanger 41 may have a length corresponding to a height by which the plurality of lateral blowing modules 32_a_, 32_b_, and 32_c_ and the front blowing module 31 are disposed in upward and downward directions.

The heat exchanger 41 may be disposed within the upper cabinet 11. The heat exchanger 41 may be coupled to a heat exchange coupler formed in the upper cabinet 11.

<Humidifying Assembly>

A humidifying assembly V may discharge humidified air to the outside of the indoor unit. The humidifying assembly V may include a water tank 51 containing water, a heating unit 52 receiving the water from the water tank 51 and heating the water, a humidifying discharge nozzle 53 in which a humidifying discharge port (not shown) for discharging heated humidified air is formed, and a humidifying flow path (not shown) guiding humidified air, heated by the heating unit 52, toward the humidifying discharge nozzle 53.

The water tank 51 and the heating unit 52 may be disposed in an inner space of the base unit 12. The humidifying discharge nozzle 53, which is formed at an end portion of the humidifying flow tube 54, may be disposed at a portion at which a side discharge port 141 is formed. Thus, humidified air discharged along the humidifying discharge nozzle 53 may be discharged to the outside of the indoor unit by lateral blowing modules 32_a_, 32_b_, and 32_c_ together with air flowing toward the side discharge port 141.

The humidifying flow path 52 may allow humid air, heated by the heating unit 52 disposed within the base unit 12, to flow toward the humidifying discharge nozzle 53. The humidifying flow path 54 may connect the heating unit 52, which is disposed within the base unit 12, and the humidifying discharge nozzle 53, which is formed at the side discharge port 141 at a height at which the upper cabinet 11 is positioned.

<Filter Assembly>

A filter assembly VI removes foreign substances from air introduced into an air suction port 111. The filter assembly VI is movably disposed in rear of an upper cabinet 11. The filter assembly VI may be disposed at the air suction port 111 formed in the rear of the upper cabinet 11 and filter indoor air flowing through the air suction port 111. The filter assembly VI is disposed movably with respect to the upper cabinet 11.

Figure 2:
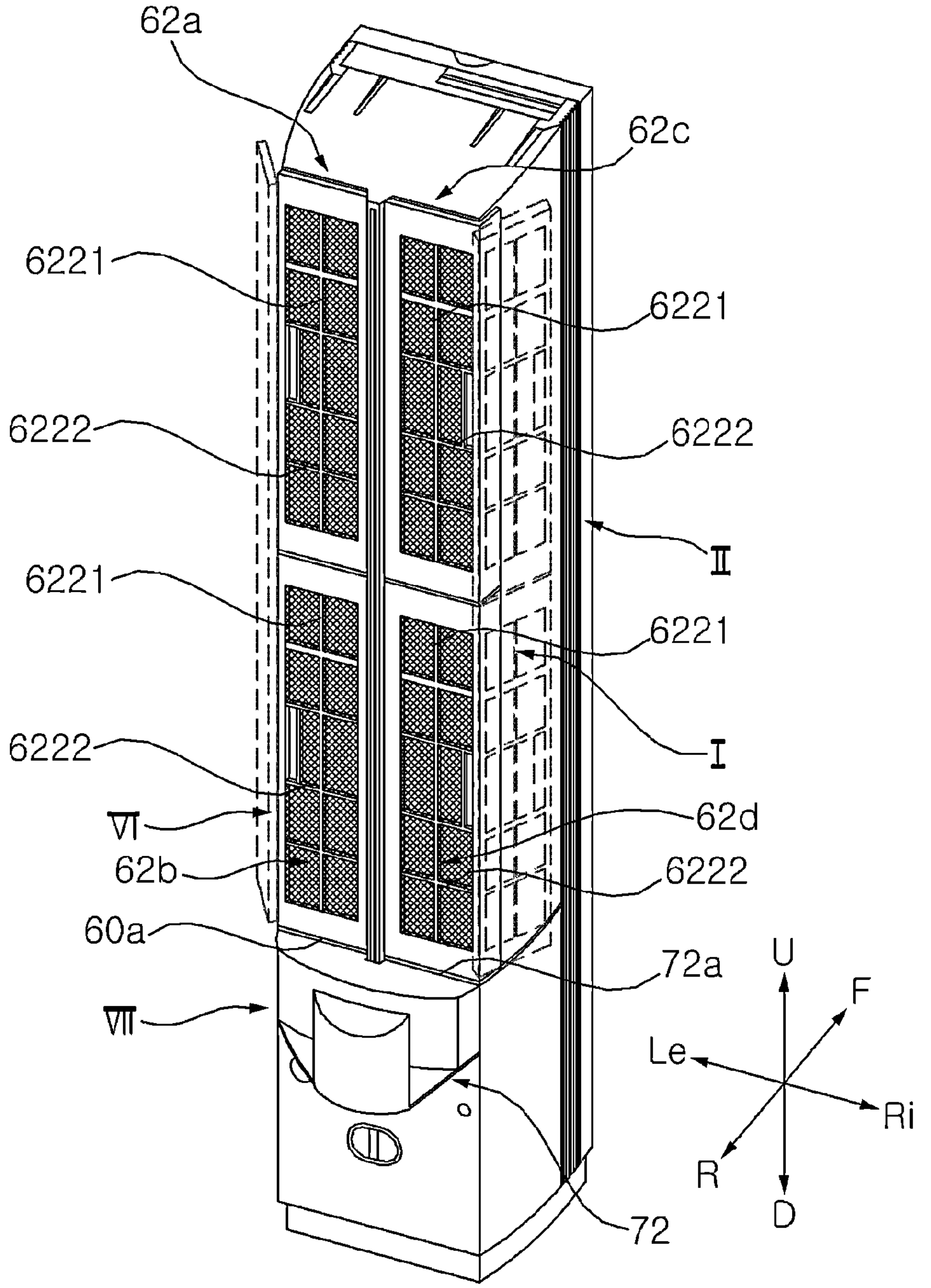
FIG. 2 is a rear perspective view of an indoor unit according to an embodiment of the present invention.
Figure 3:
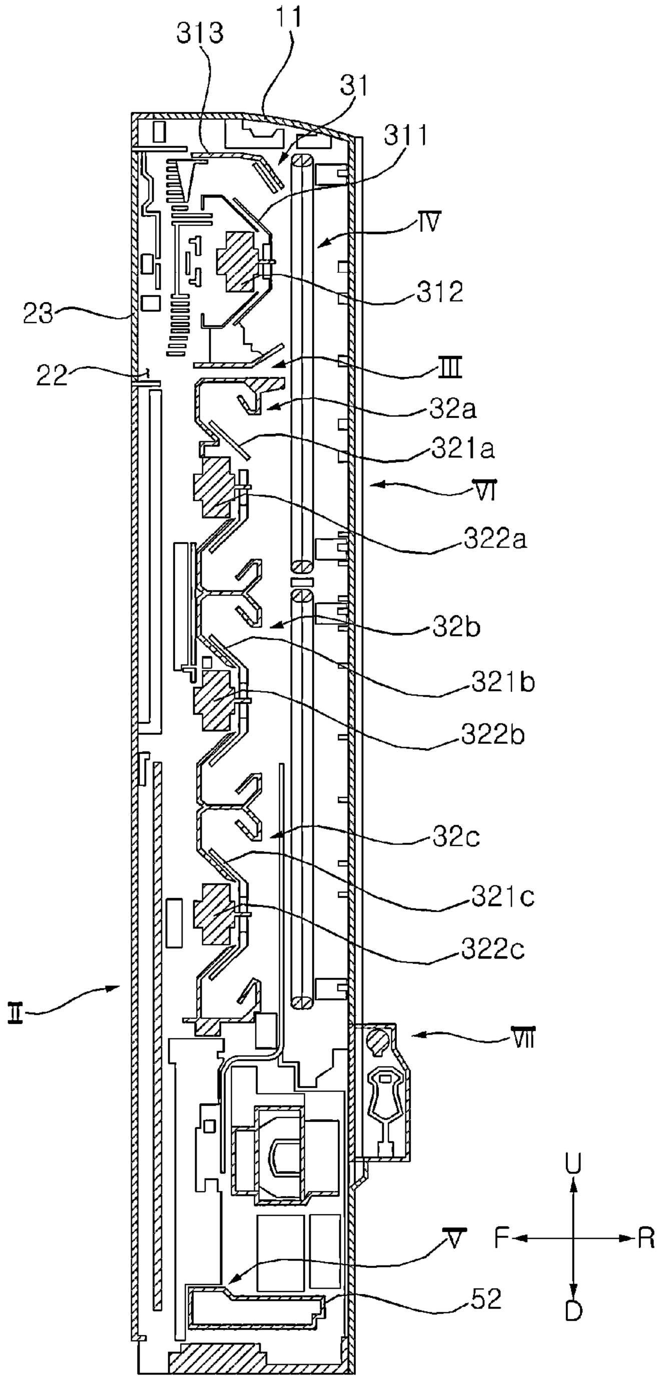
FIG. 3 is a side cross-sectional view of an indoor unit according to an embodiment of the present invention.
Figure 4:
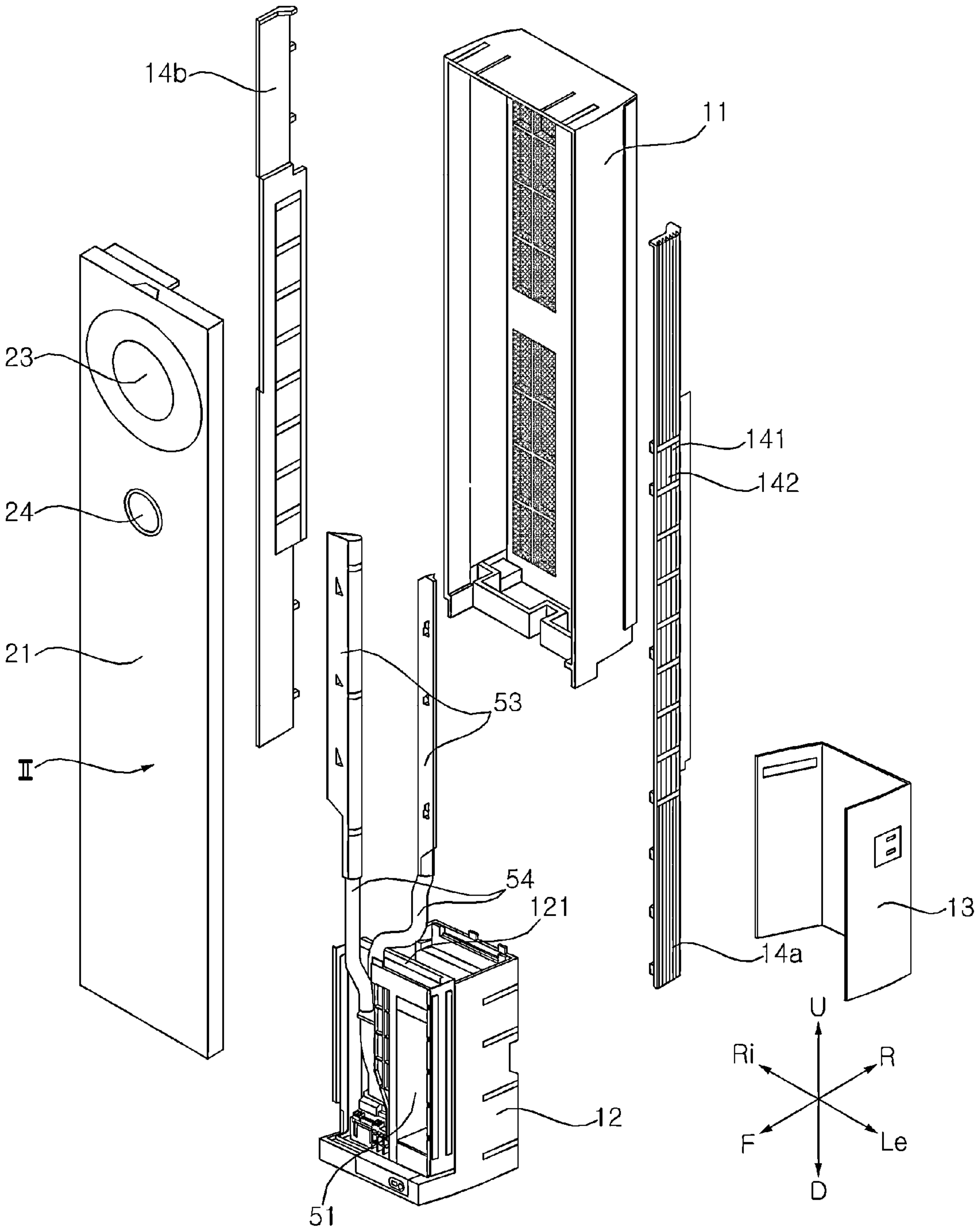
FIG. 4 is an exploded perspective view of a cabinet assembly and a door assembly according to an embodiment of the present invention.

Referring to FIG. 2, the filter assembly VI according to the present embodiment includes a filter module 62_a_, 62_b_, 62_c_, and 62_d_ for removing foreign substances from air suctioned into the air suction port 111. In the filter assembly VI, the filter module 62_a_, 62_b_, 62_c_, 62_d_ may be disposed on the air suction port 111 or disposed external to a side surface of the upper cabinet 11.

The filter assembly VI according to the present embodiment may include the filter module 62_a_, 62_b_, 62_c_, and 62_d_ for removing foreign substances from airflow, a filter mounting member (not shown) to which the filter module 62_a_, 62_b_, 62_c_, and 62_d_ is mounted, and a mobile member (not shown) for changing a position of the filter mounting member.

When disposed at the air suction port, the filter module 62_a_, 62_b_, 62_c_, and 62_d_ may be inserted into or drawn from the filter mounting member in a width direction of the filter module formed in a left and right direction.

The filter module 62_a_, 62_b_, 62_c_, and 62_d_ according to the present embodiment may change in position by the filter mounting member or the moving member. That is, the filter module 62_a_, 62_b_, 62_c_, and 62_d_ may change from a first position, which indicates that the filter module is disposed on the air suction port 111 in the rear of the upper cabinet 11, into a second position, which indicates that the filter module is disposed external to a side surface of the upper cabinet 11.

At the first position indicative of arrangement at the air suction port 111, the filter module 62_a_, 62_b_, 62_c_, and 62_d_ may form a surface which the filter cleaner 72 is capable of moving over.

When the filter module 62_a_, 62_b_, 62_c_, and 62_d_ is disposed external to a side surface of the upper cabinet 11, the filter module is disposed with the width direction facing forward, so that a user is allowed to easily insert or draw the filter module from a front position.

The filter module 62_a_, 62_b_, 62_c_, and 62_d_ according to the present embodiment may include a first filter module 62_a_ and 62_b_ covering the left side of the air suction port 111 of the upper cabinet 11, and a second filter module 62_c_ and 62_d_ covering the right side of the air suction port 111 of the upper cabinet 11.

The first filter module 62_a_ and 62_b_ may be disposed to cover the left side of the air suction port 111 or disposed on the left side of the left surface of the upper cabinet 11. The second filter module 62_c_ and 62_d_ may be disposed to cover the right side of the air suction port 111 or disposed on the right side of the right surface of the upper cabinet 11.

When the first filter module 62_a_ and 62_b_ and the second filter module 62_c_ and 62_d_ are all formed at the air suction port 111, a surface which the filter cleaner 72 is capable of moving over is formed.

The filter module 62_a_, 62_b_, 62_c_, and 62_d_ is disposed detachably with respect to the filter mounting member. The filter module 62_a_, 62_b_, 62_c_, and 62_d_ may filter foreign substances from air introduced into the air suction port 111. The filter module 62_a_, 62_b_, 62_c_, and 62_d_ according to the present embodiment may include a pre-filter by which large-sized dust in the air introduced into the air suction port 111 is filtered, a dust collecting filter (not shown) which collects air particles ionized by the ionization part to filter air, and a deodorization filter (not shown) which removes odor from air.

The filter module 62*a*, 62*b*, 62*c*, and 62*d* according to the present embodiment may have a pre-filter 621, and a filter case 622 to be mounted to the filter mounting member. In the filter case 622, a plurality of suction holes is formed in a direction in which the pre-filter 621 is mounted. On a surface where the pre-filter 621 is mounted, the filter case 622 may include a vertical rib 6221 and a horizontal rib 6222.

The vertical rib 6221 and the horizontal rib 6222 may form a grid shape, and reinforce strength of the filter case 622. The pre-filter 621 may have a mesh form to filter large-sized dust from air introduced into the filter module 62*a*, 62*b*, 62*c*, and 62*d*.

A lower end portion 60*a* of the filter assembly VI may be disposed above the lower cabinet 13. When the filter cleaner 72 of the filter cleaning assembly VII is disposed at the lowest position in a range in which the filter cleaner 72 is allowed to move along the guide rail 711, the lower end portion 60*a* of the filter assembly VI is disposed above an upper end portion 72*a* of the filter cleaner 72.

Here, the lower end portion 60*a* of the filter assembly VI may refer to a portion that is disposed at a further lower position in the lower end portion of the filter mounting member 61*a* and 61*b* and the lower end portion of the filter module 62*b* and 62*d* disposed below. Therefore, as shown in FIG. 2, when disposed at the lowest position in the range in which the filter cleaner 72 is allowed to move along the guide rail 711, a position of a filter mounting member to which the filter module 62*a*, 62*b*, 62*c*, or 62*d* is mounted may be changed.

<Filter Cleaning Assembly>

A filter cleaning assembly VII may move in upward and downward directions on the rear surface of a filter assembly VI, and remove foreign substances existing on the outside of the filter assembly VI. The filter cleaning assembly VII removes foreign substances stuck in a pre-filter 621 of a filter module 62*a*, 62*b*, 62*c* and 62*d*.

The filter cleaning assembly VII includes a filter cleaner 72 moving on the rear of the filter assembly VI and removing foreign substances stuck in the filter assembly VI, a movement guider 71 guiding movement of the filter cleaner 72, and a power supply device 73 supplying power to the filter cleaner 72.

<Filter Cleaning Assembly-Movement Guider>

Figure 5:
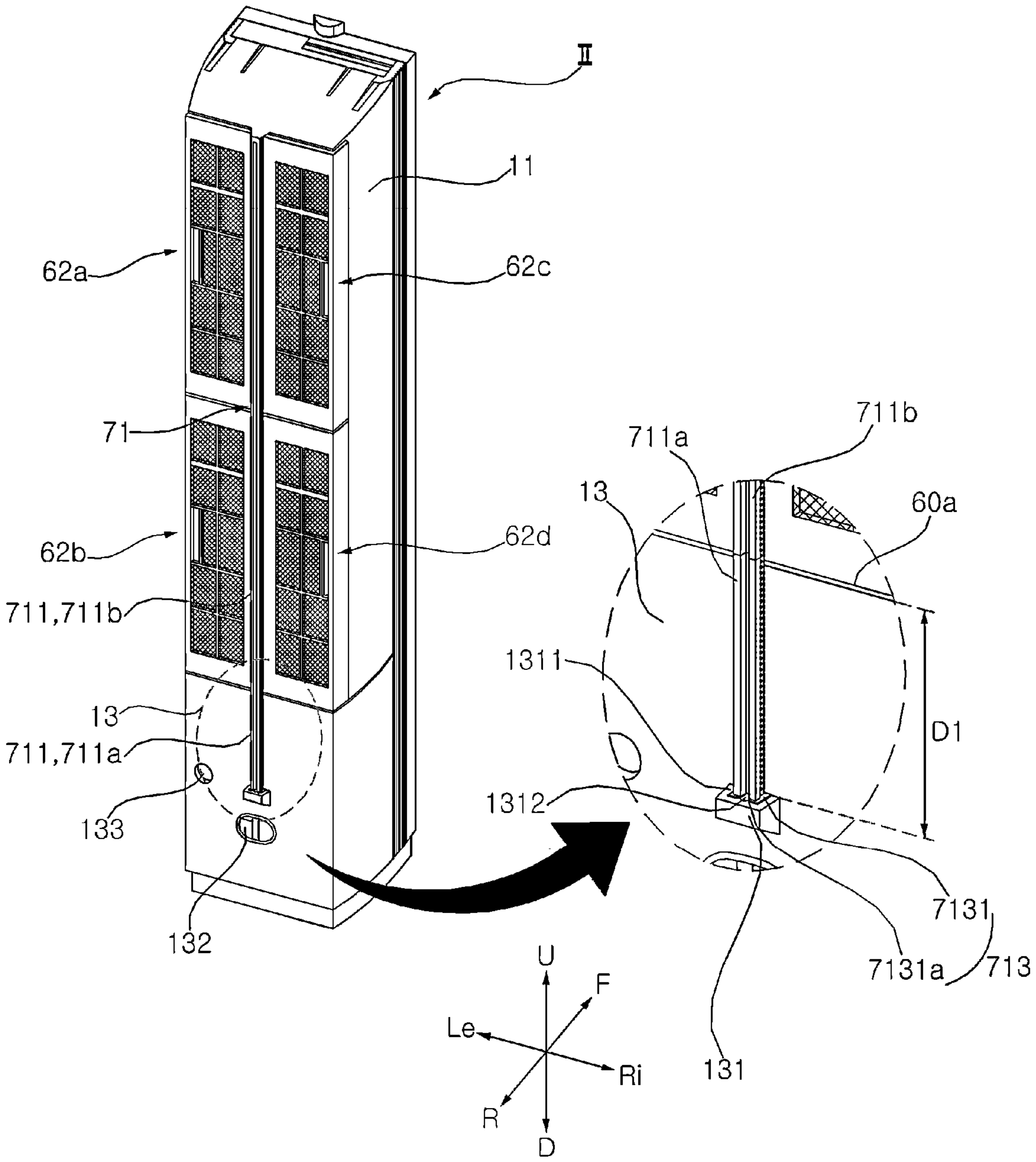
FIG. 5 is a rear perspective view of an indoor unit with a filter cleaner removed according to an embodiment of the present invention.
Figure 6:
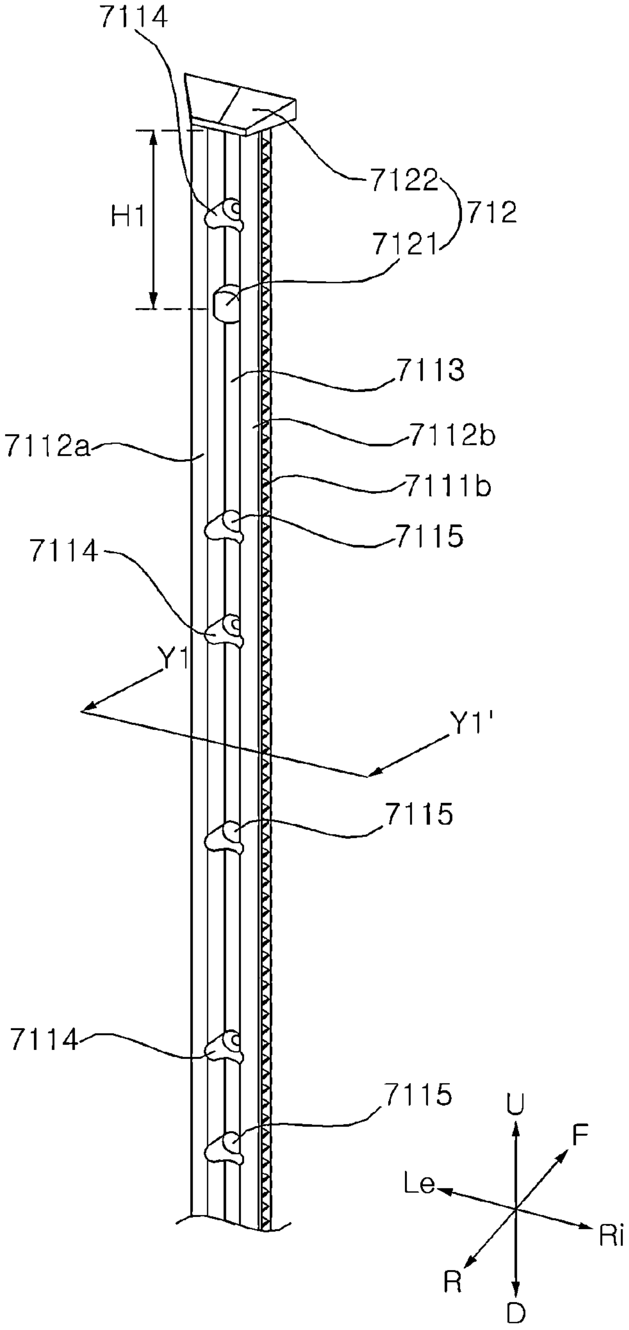
FIG. 6 is a top perspective view of a movement guider according to an embodiment of the present invention.
Figure 7:
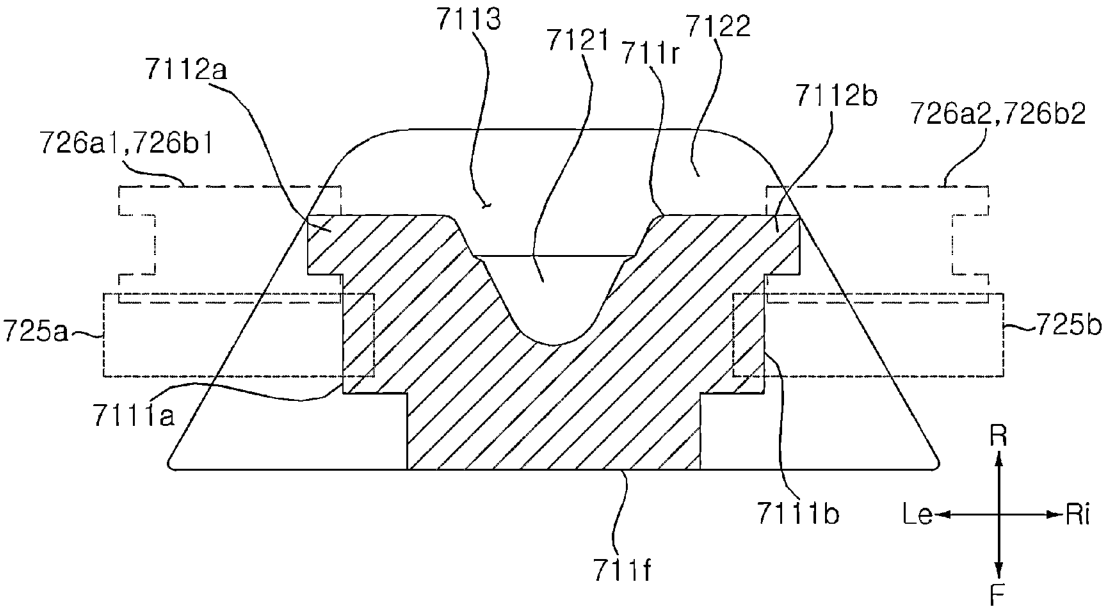
FIG. 7 is a cross-sectional view cut along line Yl-Yl' in FIG. 6.
Figure 8:
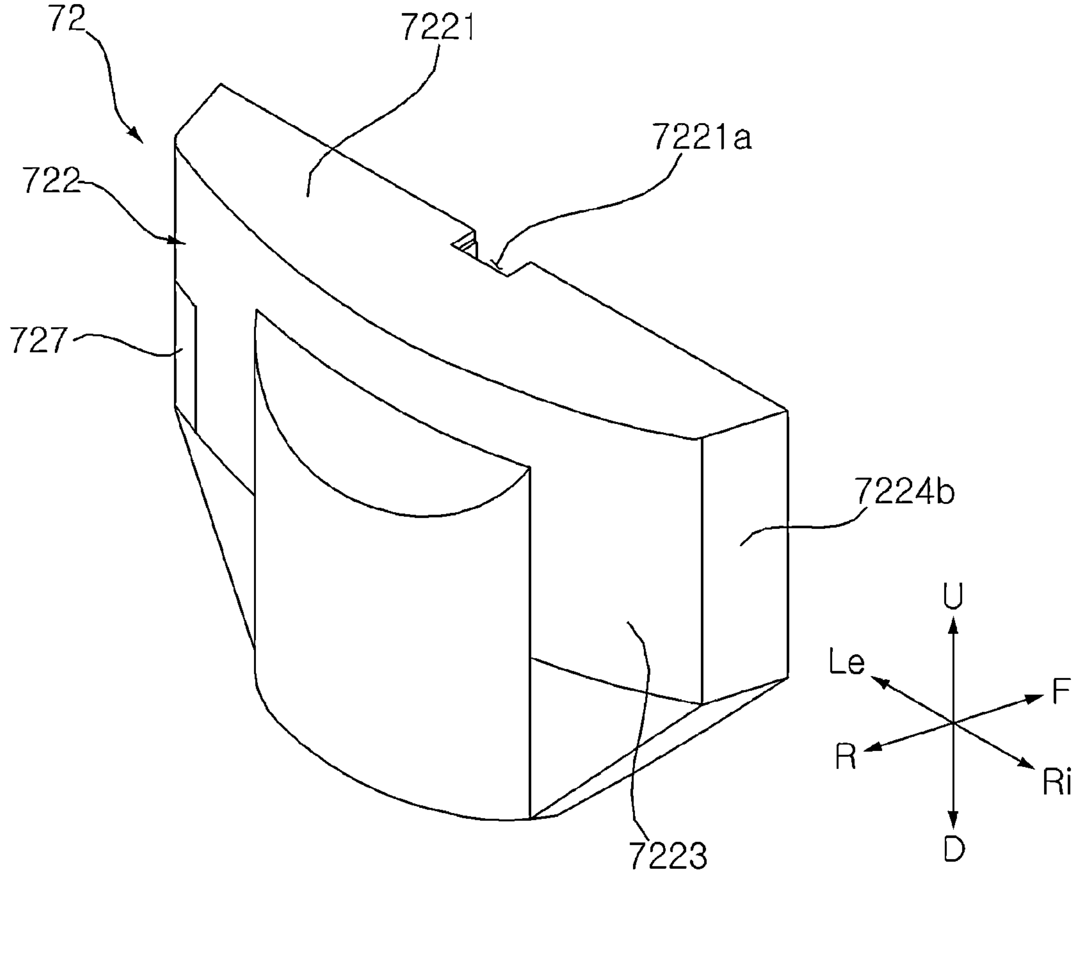
FIG. 8 is a rear perspective view of a filter cleaner according to an embodiment of the present invention.
Figure 9:
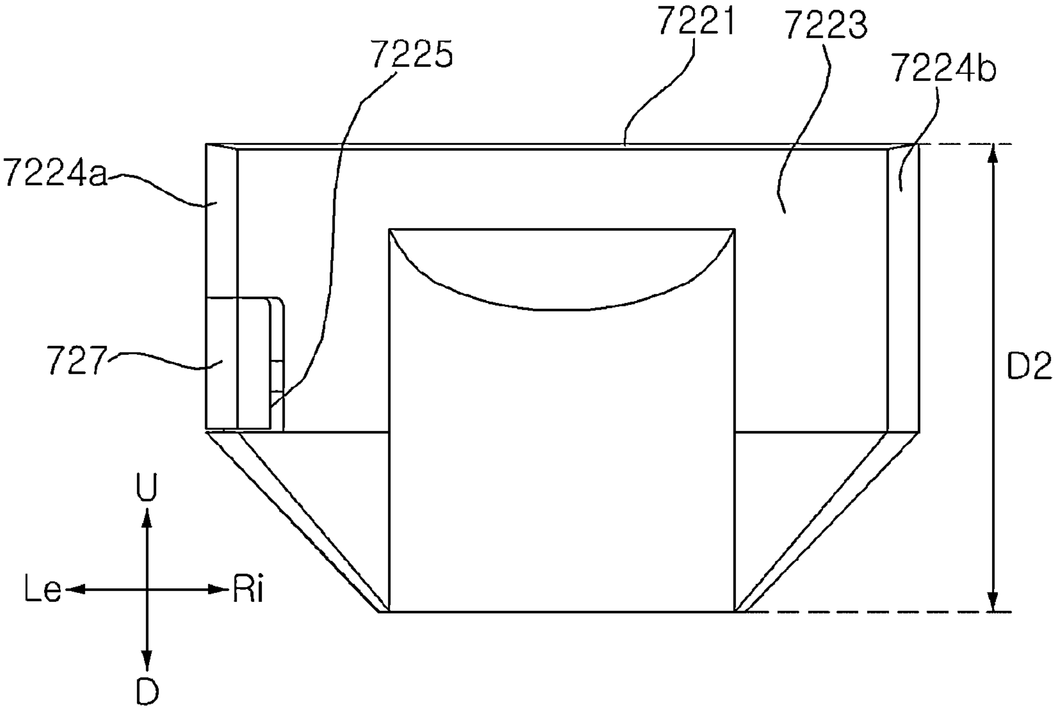
FIG. 9 is a rear view of a filter cleaner according to an embodiment of the present invention.
Figure 10:
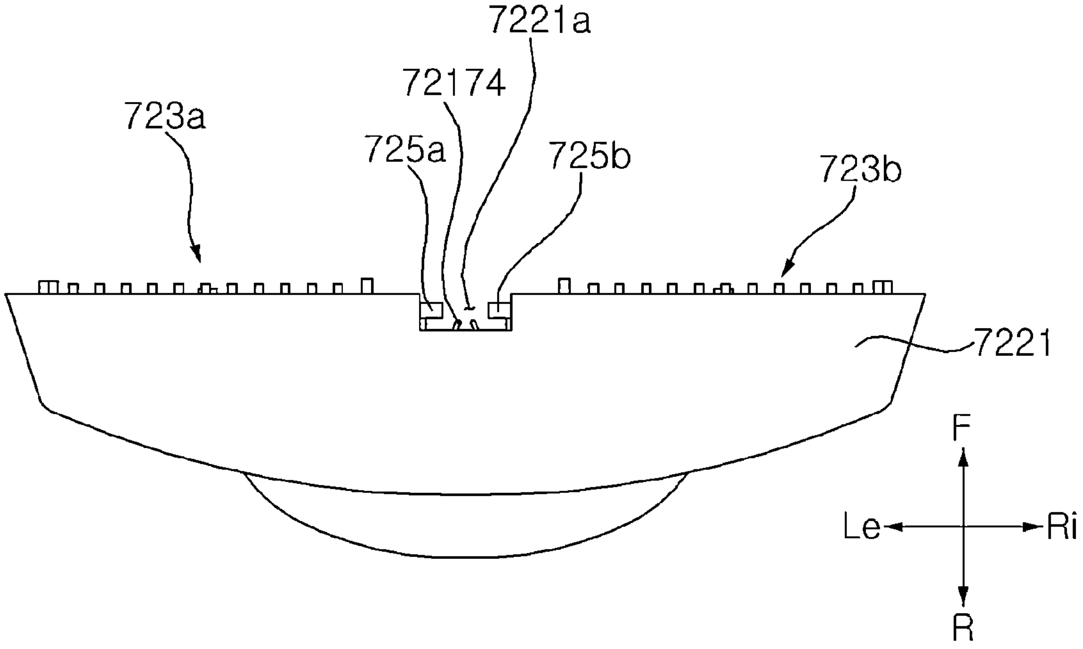
FIG. 10 is a plan view of a filter cleaner according to an embodiment of the present invention.
Figure 11:
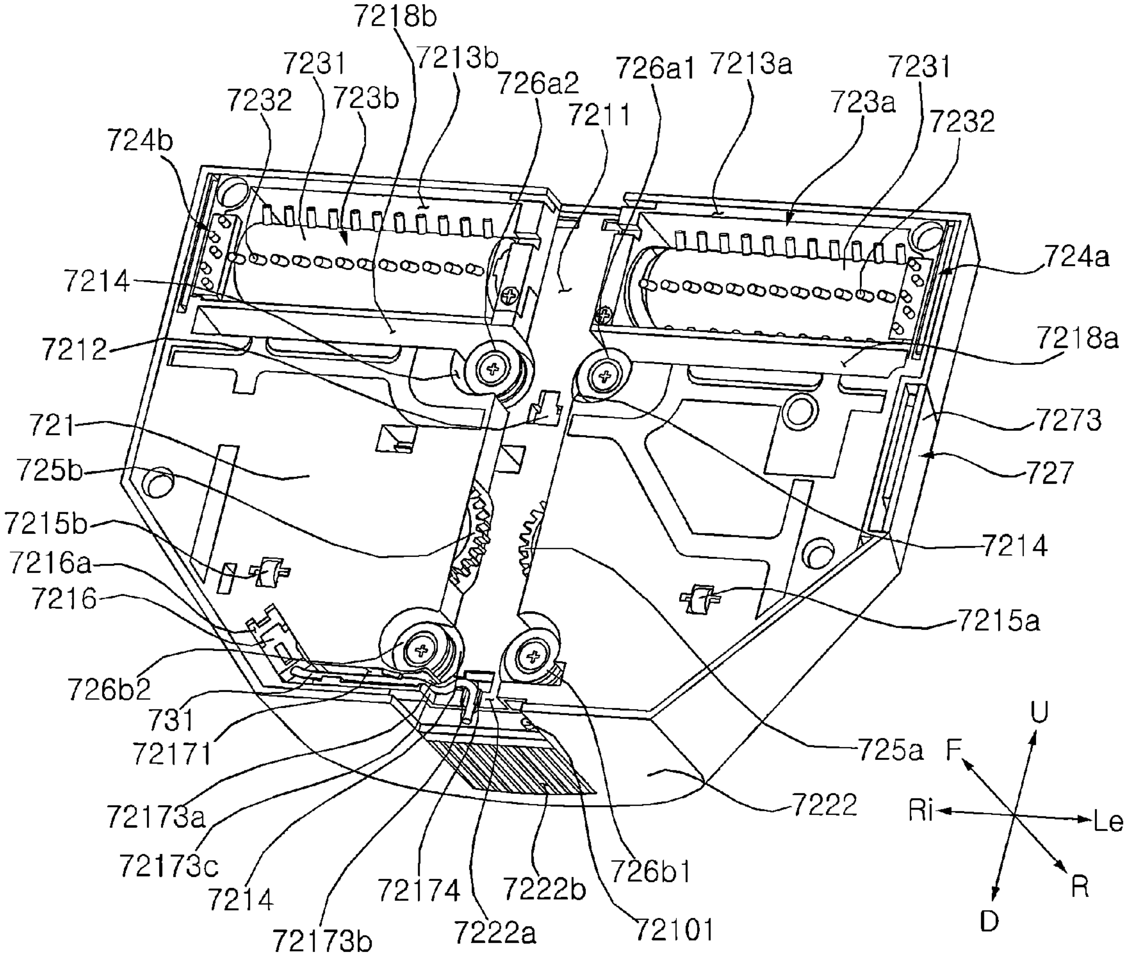
FIG. 11 is a rear perspective view of a filter cleaner according to an embodiment of the present invention.
Figure 12:
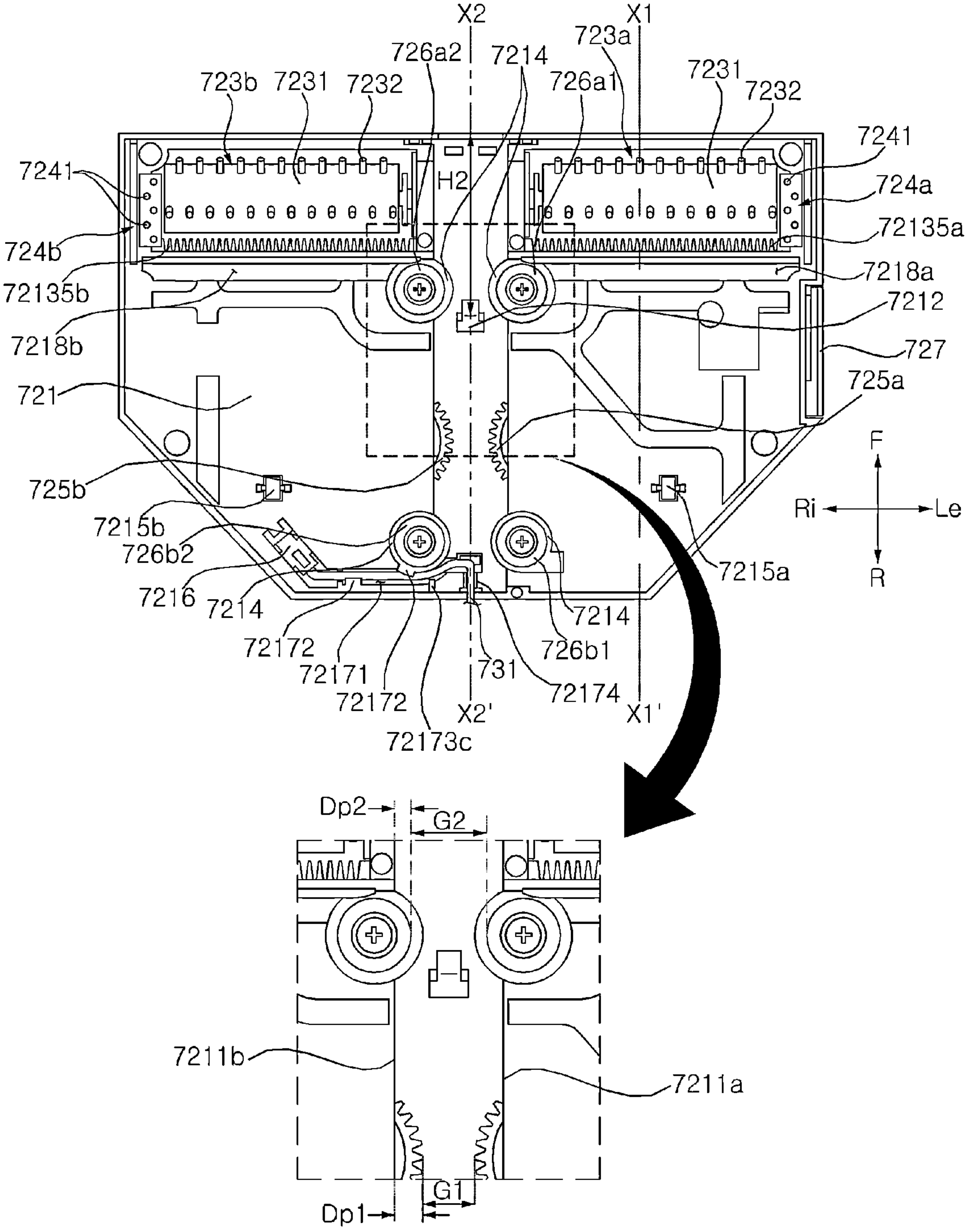
FIG. 12 is a front view of a filter cleaner according to an embodiment of the present invention.
Figure 13:
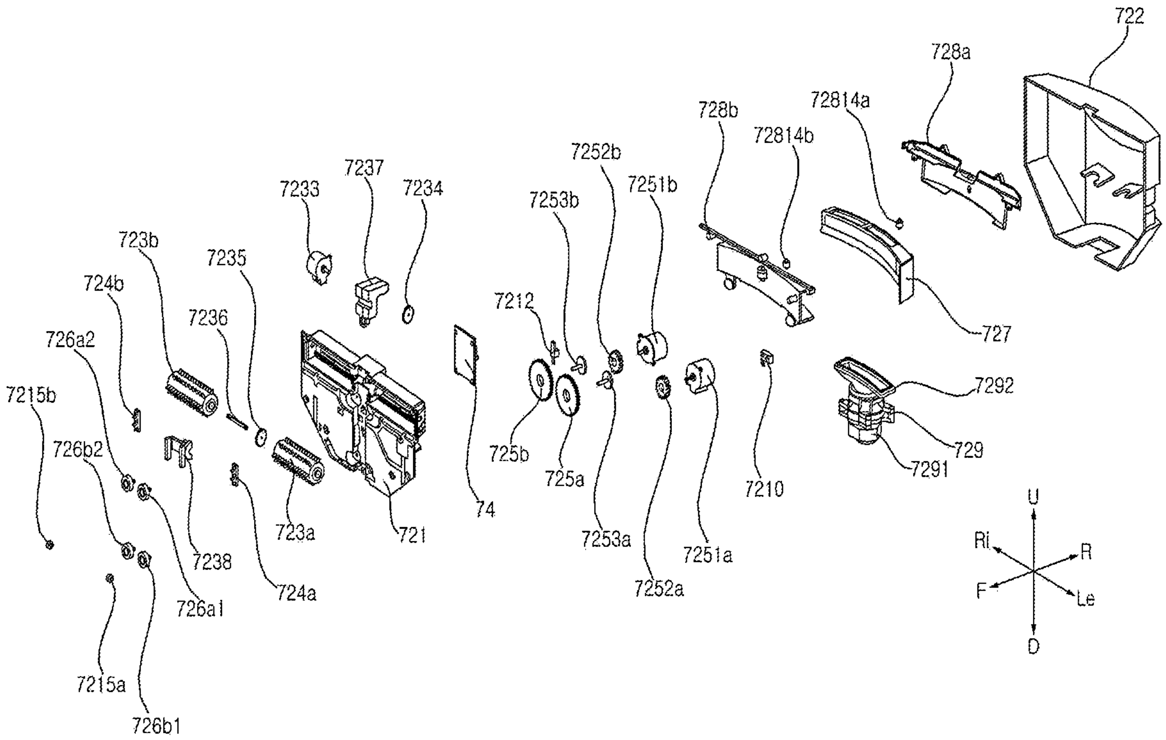
FIG. 13 is a perspective view of a filter cleaner according to an embodiment of the present invention.
Figure 14:
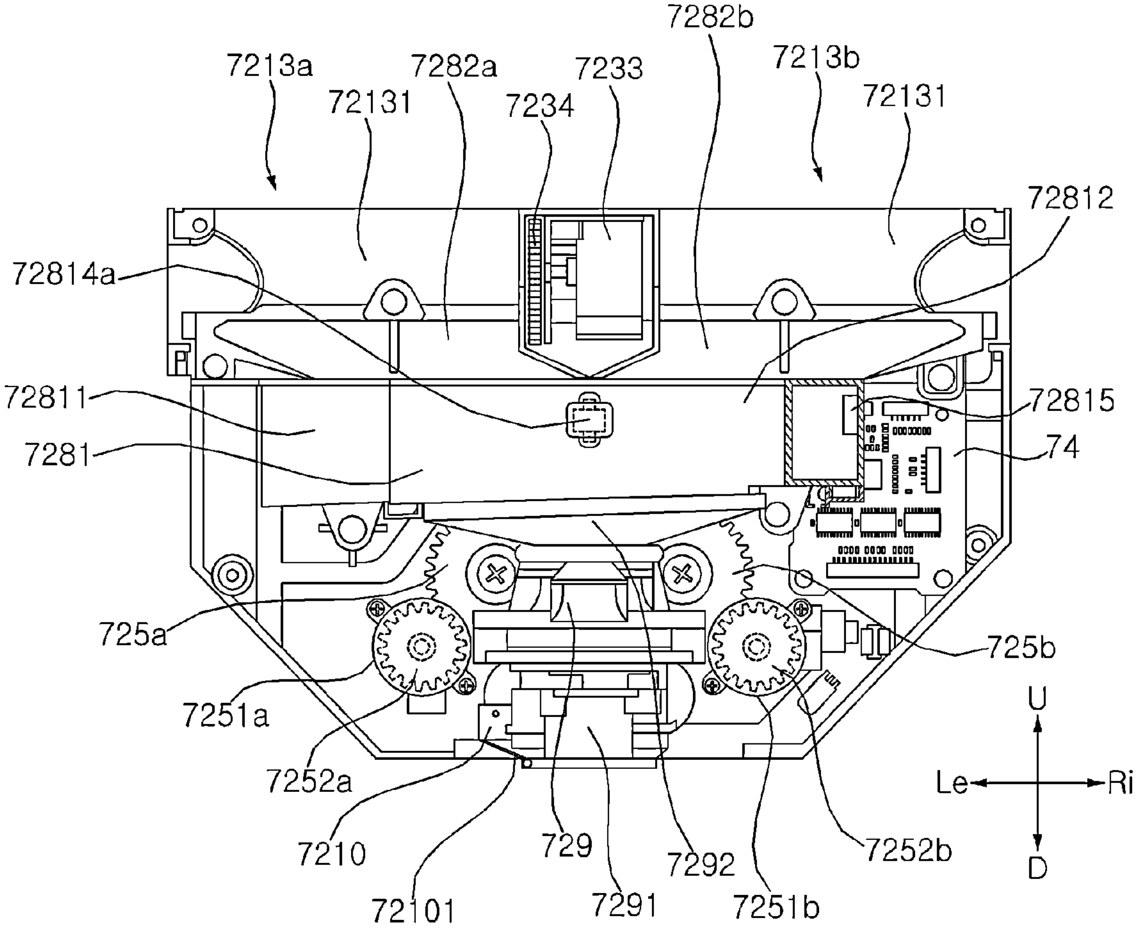
FIG. 14 is a rear view with an outer cover and a dust container removed in FIG. 9.
Figure 15:
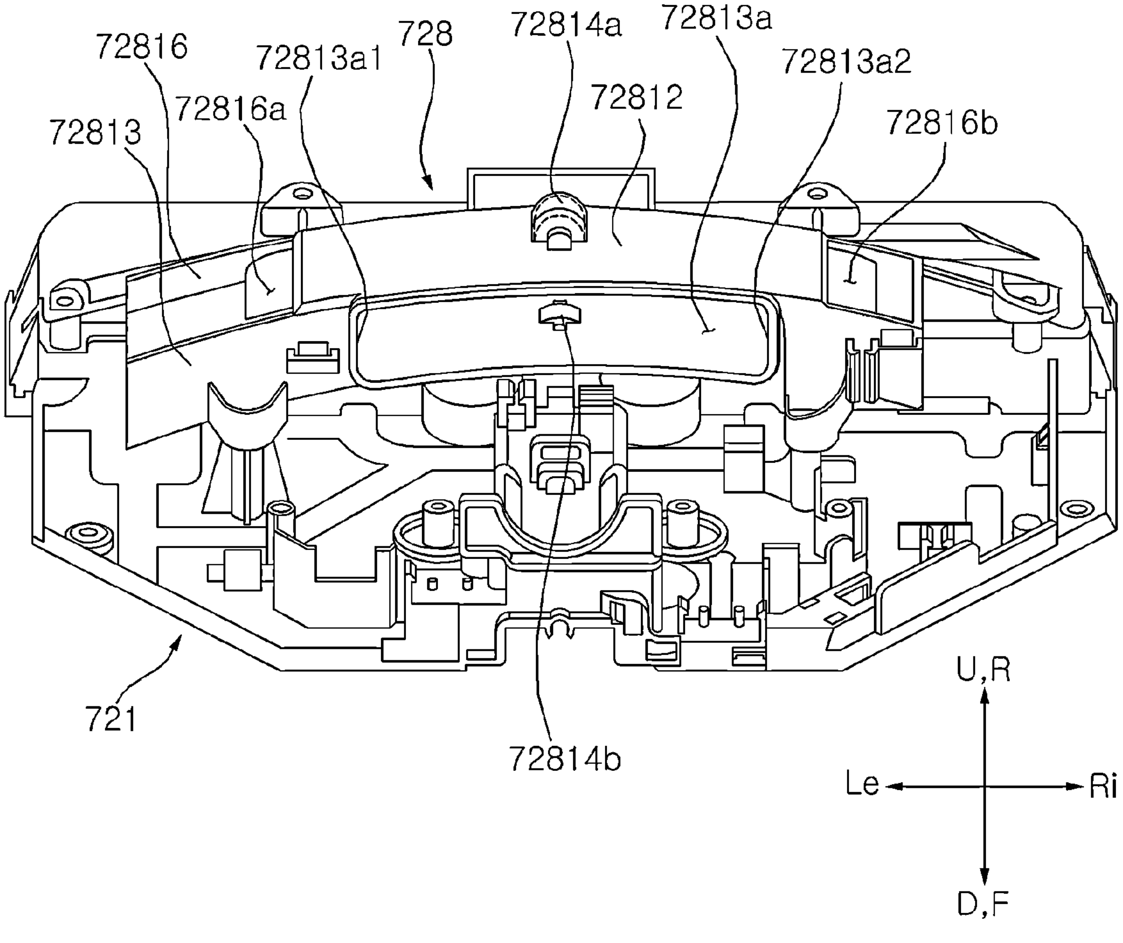
FIG. 15 is a rear view with a connection housing removed in FIG. 14.
Figure 16:
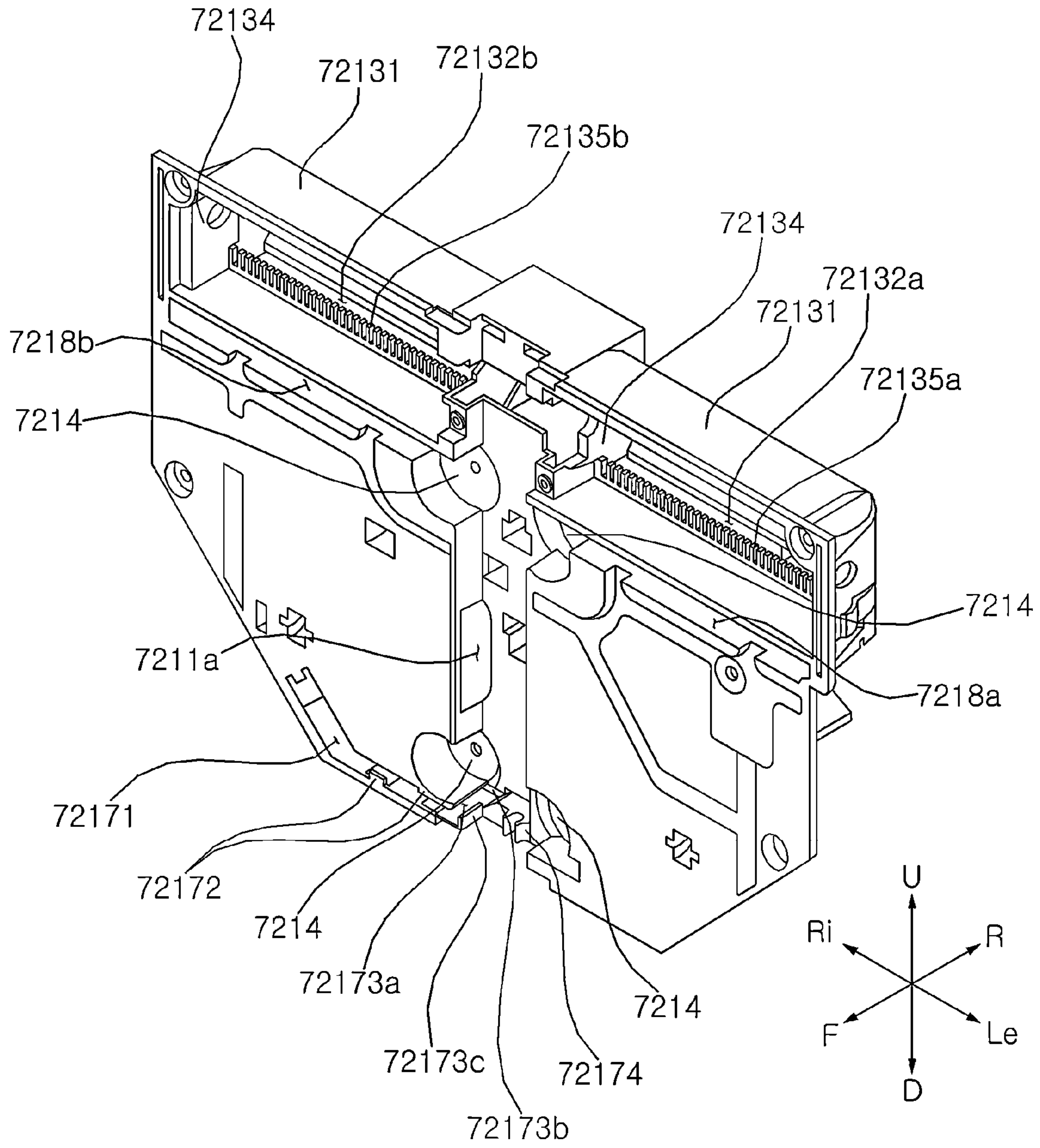
FIG. 16 is a downward view of a base cover and a connection housing coupled thereto according to an embodiment of the present invention.
Figure 17:
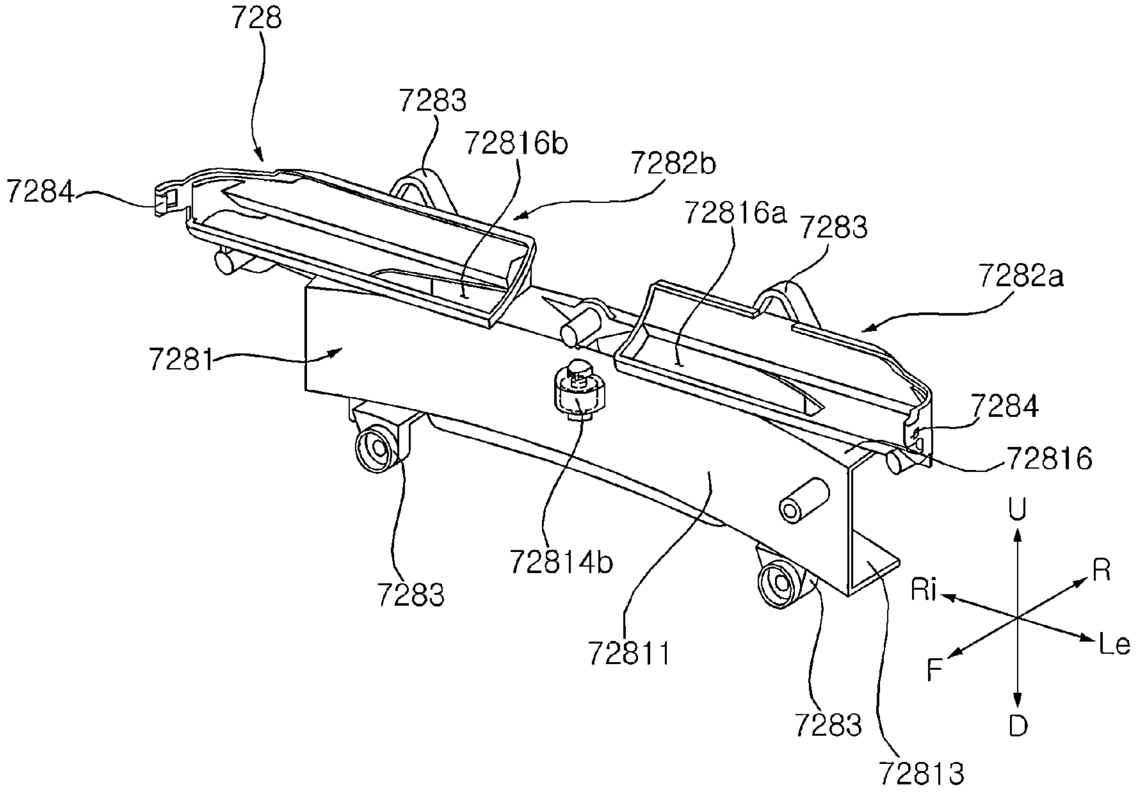
FIG. 17 is a front perspective view of a base cover and a connection housing coupled thereto according to an embodiment of the present invention.
Figure 18:
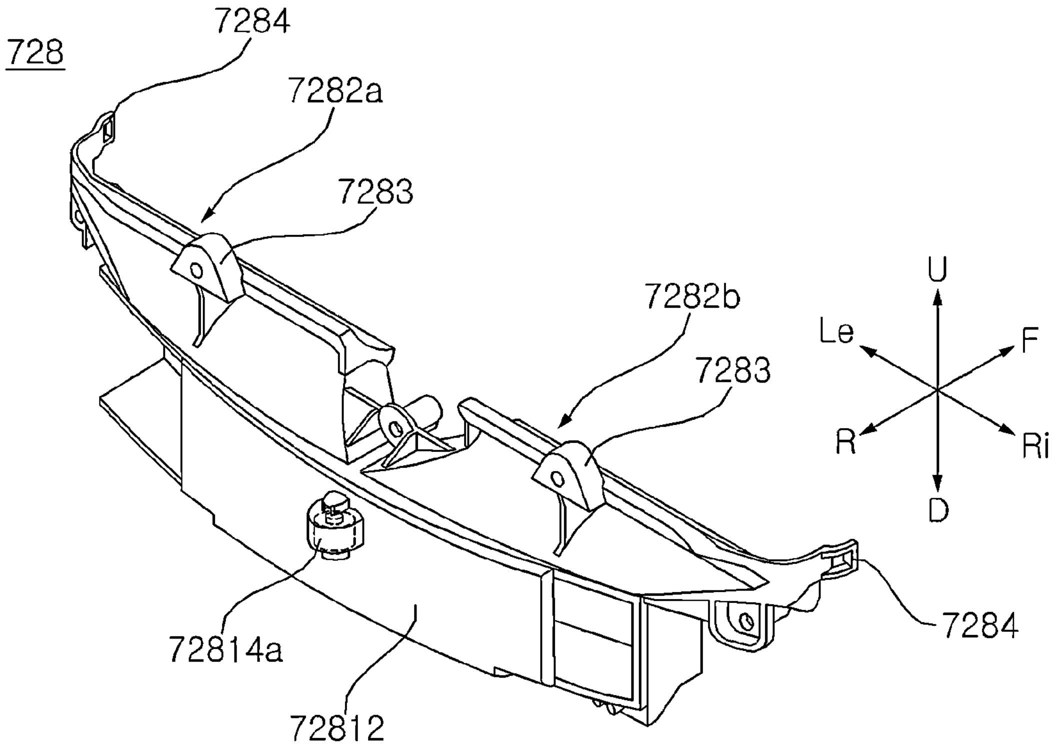
FIG. 18 is a front perspective view of a connection housing according to an embodiment of the present invention.
Figure 19:
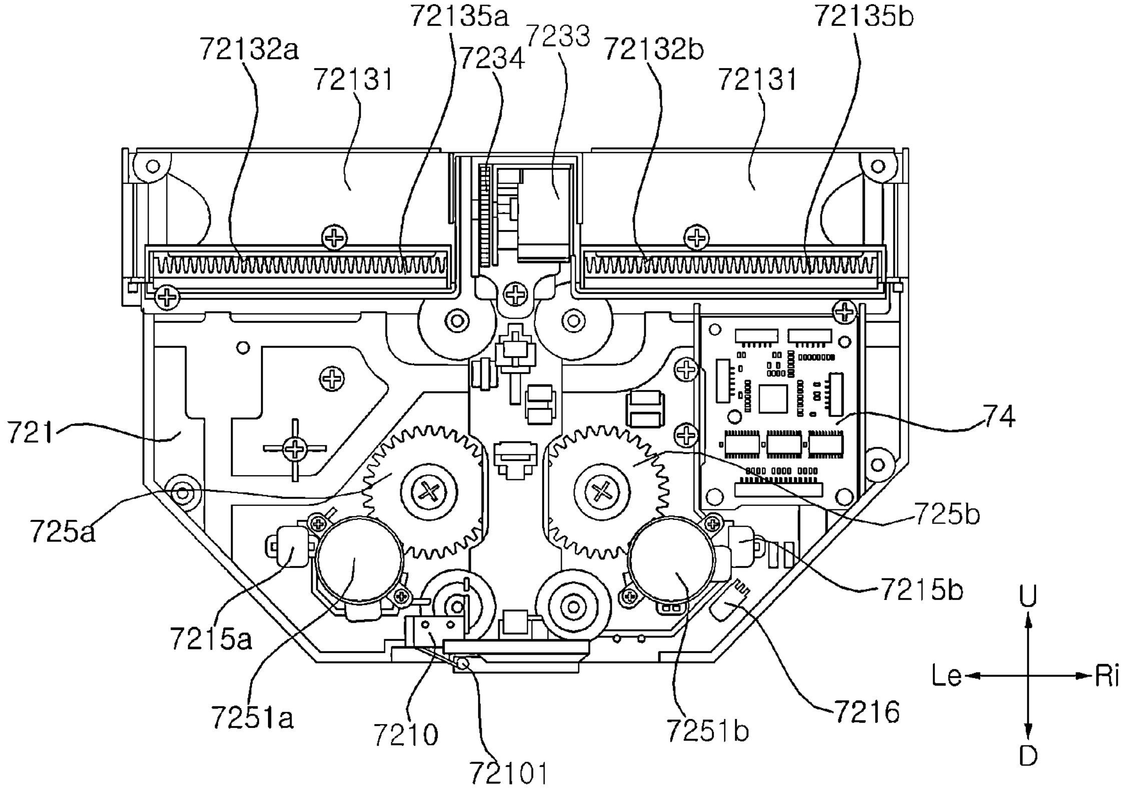
FIG. 19 is a rear perspective view of a connection housing according to an embodiment of the present invention.
Figure 20:
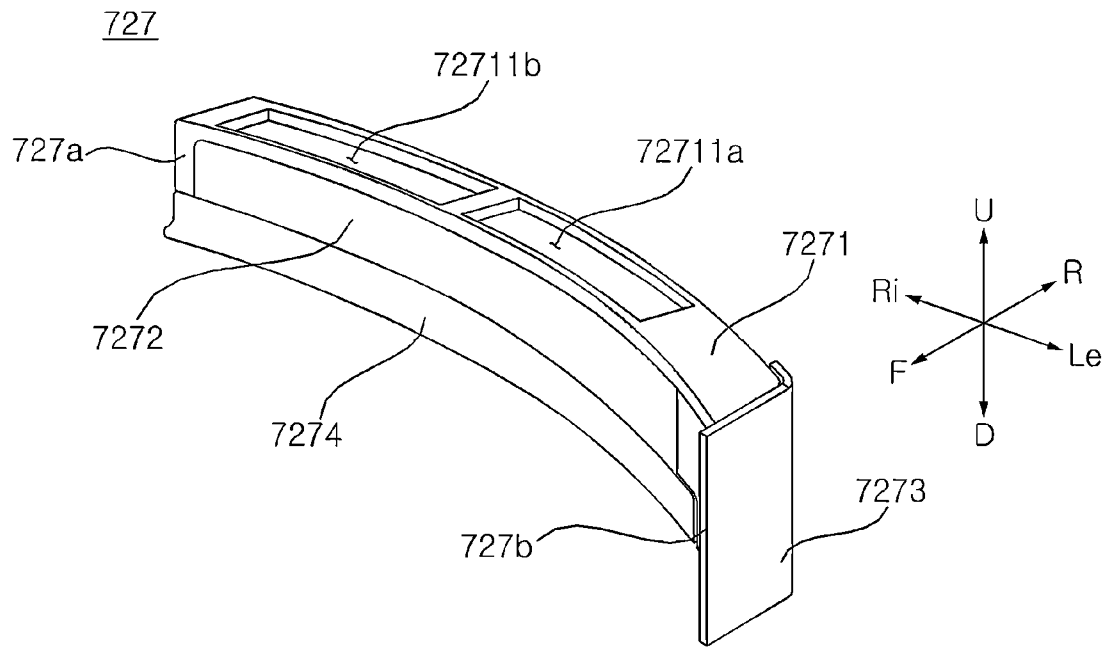
FIG. 20 is a perspective view of a dust container according to an embodiment of the present invention.

Hereinafter, referring to FIGS. 5 to 7, a movement guide 71 of a filter cleaning assembly VII according to the present embodiment will be described.

The movement guider 71 limits a movement range of a filter cleaner 72. The movement guider 71 guides movement of the filter cleaner 72 within the movement range of the filter cleaner 72. The movement guider 71 is disposed in rear of a cabinet assembly I. The movement guider 71 is disposed in rear of a upper cabinet 11 and a lower cabinet 13.

The movement guider 71 includes a guide rail 711 guiding movement of the filter cleaner 72, an upward movement limiting part 712 limiting upward movement of the filter cleaner 72 moving along the guide rail 711, and a downward movement limiting part 713 limiting downward movement of the filter cleaner 72 moving along the guide rail 711.

The guide rail 711 is disposed in rear of the upper cabinet 11 and the lower cabinet 13. The guide rail 711 is elongated in upward and downward directions in rear of the upper cabinet 11. The guide rail 711 is disposed between a pair of filter assemblies VI that are disposed on the left and right sides in rear of the upper cabinet 11. The guide rail 711 may extend from the upper end of the upper cabinet 11 to the downward movement limiting part 713 disposed in the lower cabinet 13.

The guide rail 711 may include an upper guide rail 711*a* disposed in rear of the upper cabinet 11 on which the filter module 62*a*, 62*b*, 62*c*, and 62*d* are disposed, and a lower guide rail 711*b* disposed below the guide rail 711*a* and inward of the lower cabinet 13.

The upper guide rail 711*a* and the lower guide rail 711*b* may form different elements. However, this is merely an example, and the upper guide rail 711*a* and the lower guide rail may be configured as one configuration. In addition, the upper guide rail 711*a* may be divided in plural.

The lower guide rail 711*b* may be disposed in rear of the lower cabinet 13, and a length of the lower guide rail 711*b* may be longer than a vertical length of the filter cleaner 72.

The guide rail 711 includes a gear rail 7111*a* and 7111*b* forming a thread to be engaged with a mobile gear 725*a* and 725*b* of the filter cleaner 72, and a roller rail 7112*a* and 7112*b* along which a guide roller 726*a*1, 726*a*2, 726*b*1, and 726*b*2 of the filter cleaner 72 moves. In addition, a guide groove 7113 in which a power line 731 connected to the filter cleaner 72 is disposed is formed in the guide rail 711.

A front surface 711*a* of the guide rail 711 facing the cabinet assembly I is coupled to the cabinet assembly I. The guide groove 7113 is formed on a rear surface 711*b* of the guide rail 711, which is disposed opposite to the front surface 711*a*. The gear rail 7111*a* and 7111*b* and the roller rail 7112*a* and 7112*b* are disposed on both side surfaces of the guide rail 711 which connect the front surface 711*a* and the rear surface 711*b*.

The gear rail 7111*a* and 7111*b* may take the shape of a rack gear. In addition, the mobile gear 725*a* and 725*b* to be engaged with the gear rail 7111*a* and 7111*b* may take the shape of a pinion gear. The gear rail 7111*a* and 7111*b* may be elongated in upward and downward directions at a portion at which the filter module 62*a*, 62*b*, 62*c*, and 62*d* is disposed. The gear rail 7111*a* and 7111*b* may be formed on both side surfaces of the guide rail 711. The gear rail 7111*a* and 7111*b* is disposed forward of the roller rail 7112*a* and 7112*b*.

The roller rail 7112*a* and 7112*b* may have a rib structure that protrudes in both lateral directions from a rear end of the guide rail 711. The roller rail 7111*a* and 7112*b* is disposed rearward of the gear rail 7111*a* and 7111*b*. The roller rail 7112*a* and 7112*b* protrudes in the both lateral directions by a height that is higher than the thread formed by the gear rail 7111*a* and 7111*b*.

A pair of gear rails 7111*a* and 7111*b* and a pair of roller rails 7112*b* and 7112*b* are provided on both sides of the guide rail 711. The pair of roller rails 7112*a* and 7112*b* is disposed rearward of the pair of gear rails 7111*a* and 7111*b*. The pair of roller rails 7112*a* and 7112*b* protrudes in the both lateral directions further than the pair of gear rails 7111*a* and 7111*b*. Therefore, when the indoor unit according to the present embodiment is viewed from the rear, the indoor unit may have a structure in which the gear rail 7111*a* and 7111*b* is hidden by the roller rail 7112*a* and 7112*b*.

The roller rail 7112*a* and 7112*b* is elongated in upward and downward directions at a portion at which the filter module 62*a*, 62*b*, 62*c*, and 62*d* are disposed. The roller rail 7112*a* and 7112*b* may be formed with a length identical to a length with which the gear rail 7111*a* and 7111*b* is formed in the upward and downward directions.

The guide groove 7113 forms a space in which the power line 731 connected to the filter cleaner 72 is disposed. The guide groove 7113 is formed on a rear surface 7111*b* of the guide rail 711 to be concave forward. The guide groove 7113 is elongated in the upward and downward directions of the guide rail 711. The guide groove 7113 is formed with a thickness greater than a thickness of the power line 731.

The upward movement limiting part 712 may limit upward movement of the filter cleaner 72. The upward movement limiting part 712 may include an magnetic force generator 7121 generating a magnetic force. As the magnetic force generator 7121, a permanent magnet which generates a magnetic force may be used. The magnetic force generator 7121 may be spaced apart a predetermined distance downward from the upper end of the guide rail 711. The magnetic force generator 7121 may be disposed in the guide groove 7113 of the guide rail 711. The magnetic force generator 7121 generates a magnetic force so that the a hall sensor 7212 of the filter cleaner 72 senses the magnetic force.

The upward movement limiting part 712 includes an upper plate 7122 disposed at an upper end of the guide rail 711 to limit upward movement of the filter cleaner 72. The upper plate 7122 may be disposed at the upper end of the guide rail 711 to come into contact with the upper end of the filter cleaner 72. The upper plate 7122 may form a surface vertical to the guide rail 711 at the upper end of the guide rail 711, thereby limiting movement of the filter cleaner 72.

A gap H1 from the upper plate 7122 of the movement guider 71 to the magnetic force generator 7121 is longer than a gap H2 from the upper end of the filter cleaner 72 to the hall sensor 7212. Thus, when filter cleaner 72 moves upward, the upward movement may be limited by the magnetic force generator 7121 and the hall sensor 7212. However, upon an error of the hall sensor 7212, movement of the filter cleaner 72 may be limited by the upper plate 7122.

The downward movement limiting part 713 includes a lower plate 7131 disposed at a lower end of the guide rail 711 to limit downward movement of the filter cleaner 72. The lower plate 7131 may be disposed at the lower end of the guide rail 711 to come into contact with the bottom of the filter cleaner 72. The lower plate 7131 may come into contact with a lower detection sensor 7210 of the filter cleaner 72.

The lower plate 7131 forms a surface vertical to the guide rail 711 at the upper end of the guide rail 711. The lower plate 7131 is disposed above the rearward protruding cover 131 that is formed in the lower cabinet 13.

The lower plate 7131 has a structure of protruding laterally further from both side surfaces of the guide rail 711. However, a lower plate groove 7131*a* penetrated by the power line 731 in a direction downward of the guide groove 7113 formed in the guide rail is formed in the lower plate 7131. The lower plate groove 7131*a* is formed downward of the guide groove 7113. The lower plate groove 7131*a* connects the guide groove 7113 and a power line hole 1312 formed on the upper side of the rearward protruding cover 131 of the lower cabinet 13.

The guide rail 711 may be coupled to the rear of the cabinet assembly I using a separate coupling means. A coupling groove 7114 to be coupled to the additional coupling means is formed I the guide rail 711. The coupling groove 7114 is formed forward of the guide groove 7113 that is formed in the rear of the guide rail 711. A plurality of coupling grooves 7114 vertically spaced apart from one another may be formed in the guide rail 711.

An electrode hole 7115 forming a space where an electrode (not shown) ionizing a particle in the air by discharging is disposed may be formed in the guide rail 711. The electrode hole 7115 is formed forward of the guide groove 7113 that is formed in the rear of the guide rail 711. An electrode may be disposed in the electrode hole 7115. The electrode may be disposed not to protrude outward of the guide groove 7113. The electrode may protrude within a range in which the electrode does not disturb the power line 731 disposed in the guide groove 7113.

<Filter Cleaning Assembly-Filter Cleaner>

Hereinafter, a filter cleaner according to the present embodiment will be described with reference to FIGS. 8 to 29 and 31.

A filter cleaner 72 is movably disposed in rear of an upper cabinet 11. The filter cleaner 72 vertically moves along a guide rail 711, and is capable of removing foreign substances stuck in a pre-filter 621 of a filter module 62*a*, 62*b*, 62*c*, and 62*d*.

Referring to FIGS. 8 to 29, the filter cleaner 72 will be described with reference to the forward, rearward, leftward, rightward, upward, and downward directions in a state in which the filter cleaner 72 is disposed in rear of the upper cabinet 11 or a lower cabinet 13. Thus, if the discriminant state changes, the aforementioned directions may be described differently. This is merely for convenience of explanation of the filter cleaner 72, and does not limit the scope of the present invention.

The filter cleaner 72 includes: a housing 721 and 722 forming an external appearance of the filter cleaner 72; a mobile gear 725*a* and 725*b* rotatably mounted to the housing 721 and 722 and moving the housing 721 and 722; a gear motor 7251*a* and 7251*b* disposed within the housing 721 and 722 and rotating the mobile gear 725*a* and 725*b*; a guide roller 726*a*1, 726*a*2, 726*b*1, and 726*b*2 rotatably mounted to the housing 721 and 722 and guiding movement of the housing 721 and 722; an agitator 723*a* and 723*b* rotatably mounted to one side of the housing 721 and 722 and separating foreign substances stuck in the filter module 62*a*, 62*b*, 62*c*, and 62*d* by rotation; an agitator motor 7233 rotating the agitator 723*a* and 723*b*; a dust container 727 in which foreign substances separated from the filter module 62*a*, 62*b*, 62*c*, and 62*db* by rotation of the agitator 723*a* and 723*b* is contained; a connection housing 728 disposed within the housing 721 and 722 and forming a space where to insert the dust container 727; a suction fan 729 suctioning foreign substances, separated from the filter module 62*a*, 62*b*, 62*c*, and 62*d* by rotation of the agitator 723*a* and 723*b*, in a direction toward the dust container 727; and a suction fan motor 7291 operating the suction fan 729.

The filter cleaner 72 may further include a suction fan connection tube 7292 connecting the connection housing 728 and the suction fan 729.

The housing 721 and 722 defines an external appearance of the filter cleaner 72. The housing 721 and 722 includes a base cover 721 disposed to face the filter module 62*a*, 62*b*, 62*c*, and 62*d* when mounted to the movement guider 71, and an external cover 722 disposed rearward of the base cover 721 and coupled to the base cover 721 to form a space where the dust container 727 is disposed.

The base cover 721 may take a plate shape parallel to the filter module 62*a*, 62*b*, 62*c*, and 62*d*. When the filter cleaner 72 moves in rear of the filter module 62*a*, 62*b*, 62*c*, and 62*d*, a distance of the base cover 721 from the filter module 62*a*, 62*b*, 62*c*, and 62*d* may be constantly maintained.

A guide rail groove 7211, into which the guide rail 722 is inserted when the filter cleaner 72 is movably disposed in the guide rail 722, is formed in the base cover 721. The base cover 721 takes an overall plate shape, and may form a concave portion between a portion where the guide rail groove 7211 is formed and a portion where the agitator groove 7213*a* and 7213*b* are formed. The guide rail groove 7211 may be formed at the center that divides the base cover 721 into the left and right sides. In the guide rail groove 7211, the guide roller 726*a*1, 726*a*2, 726*b*1, and 726*b*2 mounted to the base cover 721 and part of the mobile gear 725*a* and 725*b* may be exposed.

The guide rail groove 7211 is formed vertically to the base cover 721. A hall sensor 7212 sensing a magnetic force of the magnetic force generator 7121 disposed in the guide rail 711 is disposed in the guide rail groove 7211. When sensing the magnetic force of the magnetic force generator 7121, the hall sensor 7212 may output a signal. When the hall sensor 7212 senses the magnetic force of the magnetic force generator 7121, the filter cleaner 72 may stop moving.

The agitator groove 7213*a* and 7213*b* where the agitator 723*a* and 723*b* is disposed are formed in the base cover 721. A pair of agitator grooves 7213*a* and 7213*b* is formed on the left and right sides of the guide rail groove 7211. A first agitator groove 7213*a* is formed in the base cover 721 on the left side of the guide rail groove 7211, and a second agitator groove 7213*b* is formed in the base cover 721 on the right side of the guide rail groove 7211.

Each of the agitator grooves 7213*a* and 2713*b* in pair forms a concave groove rearward from the base cover 721. At a portion where the agitator grooves 7213*a* and 7213*b* are formed, the base cover 721 includes an agitator circumferential surface 72131 that forms a concave groove rearward from the base cover 721. At the portion where the agitator grooves 7213*a* and 7213*b* are formed, the base cover 721 includes the agitator circumferential surface 72131, which is formed to surround the outer circumference of the agitators 723*a* and 723*b*, and a mounting surface 72134, to which the agitators 723*a* and 723*b* are rotatably mounted.

The agitator circumferential surface 72131 may take the shape of U which is convex rearward. On one side of the agitator circumferential surface 72131, a communication hole 72132*a* or 72132*b* is formed to communicate with the dust container 727. The communication hole 72132*a* or 72132*b* is disposed in the leftward and rightward directions of the agitator circumferential surface 72131. The communication hole 72132*a* or 72132*b* is formed in a length direction of the agitator 723*a* or 723*b*, which is formed along a rotational axis of the agitators 723*a* and 723*b*. The communication hole 72132*a* and 72132*b* is formed downward from the agitator circumferential surface 72131.

On one side of the agitator circumferential surface 72131, there may be disposed a duster 72135*a* or 72135*b* that separates dust from blades 7232 of the agitator 723*a* or 723*b*. The duster 72135 or 72135*b* is disposed on one side of the communication hole 72132*a* and 72132*b* on the agitator circumferential surface 72131. The duster 72135*a* or 72135*b* may be disposed in front of the communication hole 72132*a* or 72132*b* on the agitator circumferential surface 72131.

The duster 72135*a* or 72135*b* is disposed to be in friction with the blades 7232 of the agitator 723*a* or 723*b* when the agitator 723*a* or 723*b* rotates. By use of the friction with the agitator 723*a* or 723*b*, the duster 72135*a* or 72135*b* may separate foreign substances from the agitator 723*a* or 723*b*.

The duster 72135*a* or 72135*b* is formed on the agitator circumferential surface 72131 to protrude in a direction in which the agitator 723*a* or 723*b* is disposed. The duster 72135*a* or 72135*b* take the shape of saw teeth and is disposed in one side of the communication hole 72132*a* or 72132*b*. The duster 72135*a* or 72135*b* may be formed with a length identical to a length of the communication hole 72132*a* or 72132*b*. The duster 72135*a* or 72135*b* may be disposed at the rear end of the communication hole 72132*a* or 72132*b* with reference to a rotational direction of the agitator 723*a* or 723*b*.

The agitator grooves 7213*a* and 7213*b* in pair is formed in the upper portion of the base cover 721. The respective agitator grooves 7213*a* and 7213*b* in pair are disposed above the guide roller 726*a*1, 726*a*2, 726*b*1, 726*b*2 and the mobile gear 725*a* and 725*b*.

The filter cleaner 72 further includes a pair of side brush parts 724*a* and 724*b* that is disposed on one side of the pair of agitator grooves 7213*a* and 7213*b* to remove foreign substances stuck in the filter module 62*a*, 62*b*, 62*c*, or 62*d*. In the base cover 721, the pair of side brush parts 724*a* and 724*b* is disposed on one side of the pair of the agitator grooves 7213*a* and 7213*b*. The pair of side brush parts 724*a* and 724*b* may be disposed outside the agitator grooves 7213*a* and 7213*b*. The pair of side brush parts 724*a* and 724*b* may separate foreign substances existing in an area in the filter module 62*a*, 62*b*, 62*c*, and 62*d*, which is far from the guide rail 711.

The pair of side brush parts 724*a* and 724*b* may be divided into a first side brush part 724*a* disposed on one side of the first agitator groove 7213*a*, and a second side brush part 724*b* disposed on one side of the second agitator groove 7213*b*. The first side brush part 724*a* is disposed on the left side of the first agitator groove 7213*a* disposed on the left side of the guide rail groove 7211, and the second side brush part 724*b* is disposed on the right side of the second agitator groove 7213*b* disposed on the right side of the guide rail groove 7211. A length by which each of the first side brush part 724*a* and the second side brush part 724*b* may be equal to or smaller than a length formed by the first agitator groove 7213*a* and the second agitator groove 7213*b* in upward and downward directions. A plurality of brushes 7241 may be disposed vertically within a range of length equal to or smaller than the length vertically formed by the first agitator groove 7213*a* and the second agitator groove 7213*b*.

In the base cover 721, the mobile gear 725*a* and 725*b* for moving the filter cleaner 72, and the guide roller 726*a*1, 726*a*2, 726*b*1, and 726*b*2 for bringing the filter cleaner 72 into contact with the filter module 62*a*, 62*b*, 62*c*, and 62*d* are disposed. The mobile gear 725*a* and 725*b* may rotatably mounted to an inner surface of the base cover 721 facing an external cover 722. The guide roller 726*a*1, 726*a*2, 726*b*1, and 726*b*2 may be rotatably mounted to an external side surface of the base cover 721 facing the filter module 62*a*, 62*b*, 62*c*, and 62*d*. The mobile gear 725*a* and 725*b* is disposed forward of the guide roller 726*a*1, 726*a*2, 726*b*1, and 726*b*2. The mobile gear 725*a* and 725*b* is disposed more adjacent to the filter module 62*a*, 62*b*, 62*c*, and 62*d* than the guide roller 726*a*1, 726*a*2, 726*b*1, and 726*b*2. In the base cover 721, a guide roller groove portion 7214 concavely curved rearward may be formed at a position where the guide roller 726*a*1, 726*a*2, 726*b*1, and 726*b*2 is disposed.

In the base cover 721, there is disposed a pair of mobile gears 725*a* and 725*b* to be engaged with a pair of gear rails 7111*a* and 7111*b* formed on both side surfaces of the guide rail 711. The pair of mobile gears 724*a* and 725*b* respectively disposed on the left and right sides of the guide rail groove 7211 is disposed such that part thereof protrudes from the guide rail groove 7211. Accordingly, a mobile gear hole 7211*a* penetrated by part of the mobile gears 725*a* and 725*b* is formed in the guide rail groove 7211 of the base cover 721.

In the base cover 721, there is disposed the plurality of guide rollers 726*a*1, 726*a*2, 726*b*1, and 726*b*2 that respectively comes into contact with the pair of roller rails 7112*a* and 7112*b* formed on both side surfaces of the guide rail 711. One pair in the plurality of guide rollers 726*a*1, 726*a*2, 726*b*1, and 726*b*2 may be disposed above the mobile gear 725*a* and 725*b*, and the other pair may be disposed below the mobile gear 725*a* and 725*b*.

The filter cleaner 72 includes an auxiliary roller 7215*a* and 7215*b* that comes into contact with the filter module 62*a*, 62*b*, 62*c*, and 62*d* to assist upward and downward movement of the filter cleaner 72. In the base cover 721, there is disposed the auxiliary roller 7215*a* and 7215*b* that rotates while in contact with the filter module 62*a*, 62*b*, 62*c*, and 62*d*. The auxiliary roller 7215*a* and 7215*b* is disposed rotatable with respect to the base cover 721. The auxiliary roller 7215*a* and 7215*b* is disposed to rotate about an rotational axis that is parallel to a surface formed by the filter module 62*a*, 62*b*, 62*c*, and 62*d*.

The auxiliary roller 7125*a* and 7125*b* includes a first auxiliary roller 7125*a* or 7125*b* rotating while in contact with the filter module 62*a*, 62*b*, 62*c*, or 62*d* disposed on the left side of the upper cabinet 11, and a second auxiliary roller 7125*a* or 7125*b* rotating in contact with the filter module 62*a*, 62*b*, 62*c*, or 62*d* disposed on the right side of the upper cabinet 11. The first auxiliary roller 7125*a* or 7125*b* and the second auxiliary roller 7125*a* or 7125*b* may be respectively spaced an equal distance apart from the guide rail groove 7211 in the left and right direction. The first auxiliary roller 7125*a* or 7125*b* and the second auxiliary roller 7125*a* or 7125*b* may move along a vertical rib 6221 of the filter module 62*a*, 62*b*, 62*c*, and 62*d* that is disposed on the left and right sides in the rear of the upper cabinet 11.

In the base cover 721, there is disposed a power line fixing part 7217 that fixes the power line 731 supplying power to the filter cleaner 72. A power supply terminal groove 7216*a*, in which a power supply terminal 7216 connected to the power line 731 is disposed, is formed in the base cover 721, and the power line fixing part 7217, which fixies arrangement of the power line connected to the power supply terminal 7216, is disposed in the base cover 721.

The power line fixing part 7217 prevents that the power line 731 connected to the filter cleaner 72 moving along the guide rail 711 is brought into contact with or intervenes with the guide rail 711 and the filter module 62*a*, 62*b*, 62*c*, and 62*d*. At a portion facing the filter module 62*a*, 62*b*, 62*c*, and 62*d* or the guide rail 711, the power line fixing part 7217 fixes the power line 731 in a direction inward of the base cover 721. The power line fixing part 7217 fixes the power line 731 such that the power line 731 is disposed along the inside of the guide groove 7113.

The power line fixing part 7217 includes: a filter-side fixing portion 72171 and 72172 for preventing the power line 731 from protruding toward the filter module 62*a*, 62*b*, 62*c*, and 62*d*; a rail-side fixing portion 72173 for preventing the power line 731 from protruding toward the guide rail 711; and a guide groove fixing portion 72174 for stably fixing the power line 731 within the guide groove 711 of the guide rail 711.

The filter-side fixing portion 72171 and 72172 includes: a filter-side fixing groove 72171 extending from the power supply terminal groove 7216*a* toward the guide rail groove 7211 and forming a space where the power line 731 is disposed; and a filter-side fixing protrusion 72172 fixing the power line 731 disposed in the filter-side fixing groove 72171. The filter-side fixing groove 72171 may horizontally extend from the power supply terminal groove 7216*a* toward the guide grail groove 7211. The filter-side fixing groove 72171 is formed on a surface that opposes the filter module 62*a*, 62*b*, 62*c*, and 62*d*. The filter-side fixing protrusion 72172 protrudes at the front end of the filter-side fixing groove 72171.

The rail-side fixing portion 72173 includes: a rail-side fixing groove 72173*a* and 72173*b* formed on one side surface of the guide rail groove 7211 to form a space where the power line 731 is disposed; and a rail-side fixing protrusion 72173*c* fixing the power line 731 disposed in the rail-side fixing groove 72173*a* and 72173*b*.

The rail-side fixing groove 72173*a* and 72173*b* includes: a vertical fixing groove 72173*a* connected to the filter-side fixing portion 72171 and 72172 and fixing the power line 731 at a portion that opposes the gear rail 7111*a* and 7111*b* and the roller rail 7112*a* and 7112*b* formed on side surfaces of the guide rail 711; and a horizontal fixing groove 72173*b* connected to the vertical fixing groove 72173*a* and fixing the power line 731 at a portion that opposes a rear surface of the guide rail 711 where the guide groove 7113 is formed.

The vertical fixing groove 72173*a* is formed vertical to the filter-side fixing groove 72171, and forms a groove in the guide rail groove 7211, opposing a side surface of the guide rail 711, in a direction in which the guide rail 711 is disposed. The rail-side fixing protrusion 72173*c* formed in the vertical fixing groove 72173*a* protrudes at an end portion of the vertical fixing groove 72173*a* so as to prevent the power line 731 from deviating from the vertical fixing groove 72173*a*.

The horizontal fixing groove 72173*b* may be formed vertical to the vertical fixing groove 72173*a* and parallel to the filter-side fixing groove 72171 so as to form a space where the power line 731 is disposed.

The rail-side fixing portion 72173 prevents that the gear rail 7111*a* and 7111*b* and the roller rail 7112*a* and 7112*b* formed on both side surfaces of the guide rail 711 come into contact with the power line 731. The rail-side fixing groove 72173*a* and the 72173*b* forms a groove inward of one side surface of the guide rail groove 7211. On one side surface and the rear surface of the guide rail groove 7211, the guide rail groove 7211 forms a groove in a direction distal from the guide rail 711. The rail-side fixing protrusion 72173*c* prevents that the power line 731 disposed along the rail-side fixing groove 72173*a* and 72173*b* protrudes outward.

The guide groove fixing part 72174 fixes the power line 731, protruding from the rail-side fixing groove 72173*b* toward the guide groove 7113 (in a forward direction), to extend downward from the guide groove 7113.

The guide groove fixing portion 72174 fixes the power line 731, disposed in the guide groove 7113, to extend downward. The guide groove fixing portion 72174 is formed on the rear surface of the guide rail groove 7211 to protrude toward the guide groove 7113 of the guide groove fixing portion 72174. The guide groove fixing portion 72174 is disposed above the power line hole 1312 formed in the rearward protruding cover 131.

When the filter cleaner 72 moves upward and downward along the guide rail 711, the guide groove fixing portion 72174 is disposed above the power line hole 1312 formed in the rearward protruding cover 131. Thus, although the filter cleaner 72 moves upward and downward along the guide rail 711, the power line 731 may be disposed inside the guide groove 7113.

The guide groove fixing portion 72174 may horizontally fix the power line 731, and a plurality of protrusions fixing the power line 731 to extends downward may be formed in the guide groove fixing portion 72174. The guide groove fixing portion 72174 may fix the power line 731, which is received in the guide rail groove 7211, using the rail-side fixing portion 72173 in a direction where the guide groove 7113 extends.

Thus, the power line 731 connected to the filter cleaner 72 may be disposed in the guide groove 7113 of the guide rail 711 so as not to be hampered by the filter module, 61*a*, 62*b*, 62*c*, and 62*d* and the guide rail 711 by the power line fixing portion 7217.

In the base cover 721, there is formed an under grove 7218*a* and 7218*b* that alleviates vibration generated by the agitator 723*a* and 723*b*. The under groove 7218*a* and 7218*b* is formed under the pair of the agitator grooves 7213*a* and 7213*b*. The under groove 7218*a* and 7218*b* form a space under the circumferential surface 72131 formed in the agitator groove 7213*a* and 7213*b*.

The under groove 7218*a* and 7218*b* may form a space under the pair of the agitator grooves 7213*a* and 7213*b* so that vibration, generated upon operation of the agitator 723*a* and 723*b*, to be delivered to a lower portion of the base cover 721 may be reduced.

The external cover 722 is disposed in rear of the base cover 721. The external cover 722 may be coupled to the base cover 721 to have a shape convex rearward, so that the filter cleaner 72 is allowed to be positioned inside the shape.

The external cover 722 may include: a top surface 7221 covering the top of the filter cleaner 72; a bottom surface 7222 covering the bottom of the filter cleaner 72; and a circumferential surface 7223, 7224*a*, and 7224*b* positioned between the top surface 7221 and the bottom surface 7222 to form a convex curved surface. The circumferential surface 7223, 7224*a*, and 7224*b* may include: a rear surface disposed rearward and forming a curved surface; and both side surfaces 7224*a* and 7224*b* bent at both ends of the rear surface 7223 to extend forward.

The top surface 7221 of the external cover 722 covers the top of the agitator circumferential surface 7223, 7224*a*, and 7224*b* on which the agitators 723*a* and 723*b* are disposed. On the top surface 7221 of the external cover 722, there is formed an upper groove 7221*a* for receiving the guide rail 711. The upper groove 7221*a* may be formed above the guide rail groove 7211, and may have the same cross section as that of the guide rail groove 7211.

A dust container receiving hole 7225 into which the dust container 727 is inserted is formed on the circumferential surface 7223, 7224*a*, and 7224*b* of the external cover 722. The dust container 7225 may be formed on one side of the external cover 722. The dust container receiving hole 7225 may have a left or right open surface on the circumferential surface of the external cover 722 to make a dust container to be easily inserted or drawn.

The dust container receiving hole 7225 may be formed on one surface out of the both side surfaces 7224*a* and 7224*b* of the circumferential surface 7223, 7224*a*, and 7224*b*. The dust container receiving hole 7225 is formed on a left side surface 7224*a* out of the both side surfaces 7224*a* and 7224*b*. However, this is merely an example, and the dust container receiving hole 7225 may be formed on a right side surface 7224*b* out of the both side surfaces 7224*a* and 7224*b*.

On the bottom surface 7222 of the external cover 722, there is formed a cover exhaust port 7222*b* through which air flowing in the filter cleaner 72 upon operation of the suction fan 729 is exhausted. On the bottom surface 7222 of the external cover 722, there is formed a lower groove 7222*a* for receiving the guide rail 711. The lower groove 7222*a* may be formed below the guide rail groove 7211 and formed with a cross section greater than a cross-section of the guide rail groove 7211.

The filter cleaner 72 may include a lower detection sensor 7210 that detects contact with the lower plate 7131 disposed below the movement guider 71. The lower detection sensor 7210 is disposed at a lower end portion of the filter cleaner 72. The lower detection sensor 7210 includes a detection lever 72101 that detects impact caused by a change in position. The detection lever 72101 of the lower detection sensor 7210 protrudes downward of the filter cleaner 72. An end portion of the detection lever 72101 is disposed in the lower groove 7222*a* formed on the bottom surface 7222 of the external cover 722. The end portion of the detection lever 72101 is disposed to be exposed through the lower groove 7222*a*. Accordingly, when the filter cleaner 72 moves downward, the end portion of the detection lever 72101 may first come into contact with the lower plate 7131.

The mobile gear 725*a* and 725*b* is engaged with the gear rail 7111*a* and 7111*b* of the guide rail 711. The mobile gear 725*a* and 725*b* may rotate while engaged with the gear rail 7111*a* and 7111*b*, and the filter cleaner 72 may be moved upward and downward by the rotation of the mobile gear 725*a* and 725*b*. The mobile gear 725*a* and 725*b* may take the shape of saw teeth having a thread formed on a circumferential surface. The mobile gear 725*a* and 725*b* may take the shape of a pinion gear. The mobile gear 725*a* and 725*b* according to the present embodiment may be implemented as a pair of mobile gears to be engaged with the pair of the gear rails 7111*a* and 7111*b* formed on both side surfaces of the guide rail 711. The mobile gear 725*a* and 725*b* may be divided into a first mobile gear 725*a* disposed on the left side of the guide rail groove 7211, and a second mobile gear 725*b* disposed on the right side of the guide rail groove 7211.

Each of the first mobile gear 725*a* and the second mobile gear 725*b* are disposed rotatably with respect to an inner surface of the base cover 721. Each of the first mobile gear 725*a* and the second mobile gear 725*b* rotates along a rotational axis formed in a direction vertical to a surface formed by the filter module 62*a*, 62*b*, 62*c*, and 62*d*. Each of the first mobile gear 725*a* and the second mobile gear 725*b* may be spaced an equal distance apart from the guide rail groove 7211 in the left and right directions.

Each of the first mobile gear 725*a* and the second mobile gear 725*b* may be disposed such that part thereof is exposed through the mobile gear hole 7211*a* formed in the guide rail groove 7211. The first mobile gear 725*a* and the second mobile gear 725*b* may be disposed to be respectively engaged with the gear rails 7111*a* and 7111*b* formed on both side surfaces of the guide rail 711.

The gear motor 7251*a* and 7251*b* is disposed within the housing 721 and 722. The gear motor 7251*a* and 7251*b* are mounted to an inner surface of the base cover 721. The gear motor 7251*a* and 7251*b* may deliver a rotational force to the mobile gear 725*a* and 725*b*. The gear motor 7251*a* and 7251*b* includes a pair of gear motors 7251*a* and 7251*b* respectively connected to the pair of mobile gears 725*a* and 725*b*.

The gear motor 7251*a* and 7251*b* includes a first gear motor 7251*a* connected to the first mobile gear 725*a*, and a second gear motor 7251*b* connected to the second mobile gear 725*b*. The first gear motor 7251*a* and the second gear motor 7251*b* rotate the first mobile gear 725*a* and the second mobile gear 725*b* in different directions opposite to each other. The first gear motor 7251*a* and the second gear motor 7251*b* rotate the first mobile gear 725*a* and the second mobile gear 725*b* at the same speed.

The filter cleaner 72 may further include an additional connection gear **7252*a* and 7252*b* that transfers rotational force of the gear motor 7251*a* and 7251*b* to the mobile gear 725*a* and 725*b*. The connection gear 7252*a* and 7252*b* may be connected to the gear motor 7251*a* and 7251*b* to thereby rotate, and may be engaged with the mobile gear 725*a* and 725*b* to thereby rotate the mobile gear 725*a* and 725*b***.

The guide roller **726*a*1, 726*a*2, 726*b*1, and 726*b*2 is in contact with the roller rail 7112*a* and 7111*b* of the guide rail 711. As contacting the roller rail 7112*a* and 7112*b*, the guide roller 726*a*1, 726*a*2, 726*b*1, and 726*b*2 assists movement of the filter cleaner 72 and prevents deviation of the filter cleaner 72 from the guide rail 711. The guide roller 726*a*1, 726*a*2, 726*b*1, and 726*b*2 brings the filter cleaner 72 in close contact with the filter module 62*a*, 62*b*, 62*c*, and 62*d*. In this case, the meaning of "close contact" include a state in which the filter cleaner 72 is disposed with at least one portion thereof brought into contact with the filter module 62*a*, 62*b*, 62*c*, and 62*d*. Accordingly, this may include the case where the guide roller 726*a*1, 726*a*2, 726*b*1, and 726*b*2 is disposed to bring a portion of the agitator 723*a* and 723*b* of the filter cleaner 72 into contact with the filter module 62*a*, 62*b*, 62*c*, and 62*d*. Hence, when the guide roller 726*a*1, 726*a*2, 726*b*1, and 726*b*2 bring the filter cleaner 72 into close contact with the filter module 62*a*, 62*b*, 62*c*, and 62*d*, the base cover 721 and the filter module 62*a*, 62*b*, 62*c*, and 62*d*** may be spaced a predetermined distance apart from each other.

The guide roller **726*a*1, 726*a*2, 726*b*1, or 726*b*2 rotates about a rotational axis that is formed in a direction parallel to a rotational axis of the mobile gear 725 or 725*b*. The guide roller 726*a*1, 726*a*2, 726*b*1, or 726*b*2 is disposed to an outer surface of the base cover 721. The guide roller 726*a*1, 726*a*2, 726*b*1, or 726*b*2 is disposed in the guide roller groove portion 7214 that is formed as the outer surface of the base cover 721 is concavely curved rearward. The guide roller 726*a*1, 726*a*2, 726*b*1, or 726*b*2 is disposed rearward of the mobile gear 725*a* or 725*b***.

The guide roller **726*a*1, 726*a*2, 726*b*1, or 726*b*2 may be provided in plural above and below the mobile gear 725*a* and 725*b*. A plurality of guide rollers 726*a*1, 726*a*2, 726*b*1, and 726*b*2 may include a pair of upper guide rollers 726*a*1 and 726*a*2 disposed above the mobile gear 725*a* and 725*b*, and a pair of lower gears 726*b*1 and 726*b*2 disposed below the mobile gear 725*a* and 725*b*. The plurality of guide rollers 726*a*1, 726*a*2, 726*b*1, and 726*b*2 are disposed above and below the mobile gear 725*a* and 725*b* so as to prevent the mobile bears 725*a* and 725*b* from being influenced by weight of the filter cleaner 72**.

A length Dp1 by which the mobile gear **725*a* and 725*b* protrudes from a left end 7211*a* or a right end 7211*b* of the guide rail groove 7211 toward the center of the guide rail groove 7211 is greater than a length Dp2 by which the guide roller 726*a*1, 726*a*2, 726*b*1, and 726*b*2 protrudes from the left end 7211*a* or the right end 7211*b* of the guide rail groove 7211 toward the center of the guide rail groove 7211**.

A gap between one pair of mobile gears **725*a* and 725*b* may be shorter than a gap G2 between the guide rollers 726*a*1, 726*a*2, 726*b*1, and 726*b*2** arranged side by side.

The agitator **723*a* and 723*b* is mounted rotatably with respect to the housing 721 and 722. The agitator 723*a* and 723*b* may rotate around a rotational axis that is formed in a left and right direction. The agitator 723*a* and 723*b* may be disposed to be in contact with the outer side of the filter module 62*a*, 62*b*, 62*c*, and 62*d*. By rotating, the agitator 723*a* and 723*b* may separate foreign substances stuck in the filter module 62*a*, 62*b*, 62*c*, and 62*d***.

The agitator **723*a* and 723*b* includes a first agitator 723*a* disposed on the right side of the filter cleaner 72, and a second agitator 723*b* disposed on the left side of the filter cleaner 72. The first agitator 723*a* is disposed in the first agitator groove 7213*a* formed on the left side of the guide rail groove 7211. The second agitator 823*b* is disposed in the second agitator groove 7213*b* formed on the right side of the guide rail groove 7211**.

Each of the first agitator **723*a* and the second agitator 723*b* include: a rotational bar 7231 rotating about a rotational axis parallel to an outer surface of the filter module 62*a*, 62*b*, 62*c*, and 62*d*; and a plurality of blades 7232 protruding in a radial direction from an outer circumferential surface of the rotational bar 7231**.

Both ends of the rotational bar 7231 may be rotatably fixed to the mounting surface 72134 of the agitator groove **7213*a* and 7213*b*, and one end of the rotational bar 7231 may be connected to the agitator motor 7233 that rotates the agitator 723*a* and 723*b*. The filter cleaner 72 may further include an agitator gear 7234 that transfers a rotational force of the agitator motor 7233 to the agitator 723*a* and 723*b*. The agitator gear 7234 may be provided in plural so as to transfer the rotational force of the agitator motor 7233 to a pair of agitators 723*a* and 723*b***.

The plurality of blades 7232 is disposed along a circumferential surface of the rotational bar 7231. The plurality of blades 7232 are arranged at a predetermined interval along the circumferential surface of the rotational bar 7231. The plurality of blades 7232 may be arranged in a length direction and a circumferential surface of the rotational bar 7231. When positioned toward the filter module **62*a*, 62*b*, 62*c*, and 62*d*, the plurality of blades 7232 may come into contact with the filter module 62*a*, 62*b*, 62*c*, and 62*d*. Thus, while the agitator 723*a* and 723*b* rotates, end portions of the blades 7232 may come into contact the outer surface of the filter module 62*a*, 62*b*, 62*c*, and 62*d***.

When positioned toward the filter module **62*a*, 62*b*, 62*c*, and 62*d*, the plurality of blades 7232 may come into contact with the filter module 62*a*, 62*b*, 62*c*, and 62*d*. While the rotational bar 7231 rotates, the plurality of blades 7232 may come into contact with the filter module 62*a*, 62*b*, 62*c*, and 62*d*. While the rotational bar 7231 rotates, the plurality of blades 7232 may come into contact with the duster 72135*a* and 72135*b* protruding inward from the agitator groove 7213*a* and 7213*b***.

While the rotational bar 7231 rotates, the plurality of blades 7232 may come into contact with the filter module **62*a*, 62*b*, 62*c*, and 62*d* to separate foreign substances stuck in the filter module 62*a*, 62*b*, 62*c*, and 62*d*. While the rotational bar 7231 rotates, the plurality of blades 7232 may come into contact with the duster 72135*a* and 72135*b* to separate foreign substances existing in the plurality of blades 7232**.

The filter cleaner 72 according to the present embodiment includes a side brush part **724*a* and 724*b* that is disposed on one side of the agitator 723*a* and 723*b* to clean the outside of the filter module 62*a*, 62*b*, 62*c*, and 62*d*. The side brush part 724*a* and 724*b* is disposed to come into contact with an end portion of the filter module 62*a*, 62*b*, 62*c*, and 62*d* on one side of the agitator 723*a* and 723*b*. The side brush part 724*a* and 724*b* includes a first side brush part 724*a* disposed on one side of the first agitator 723*a*, and a second side brush part 724*b* disposed on one side of the second agitator 723*b*. The first side brush part 724*a* is disposed on the left side of the first agitator 723*a*, and the second side brush part 724*b* is disposed on the right side of the second agitator 723*b***.

Each of the first brush part 724*a* and the second side brush part 724*b* include a plurality of brushes 7241 that protrude in a forward direction, brought into contact with the outside of the filter module 62*a*, 62*b*, 62*c*, and 62*d*. The plurality of brushes 7241 may be vertically disposed at portions where the side brush part 724*a* and the second side brush part 724*b* are formed, respectively.

A length by which the first side brush part 724*a* and the second side brush part 724*b* are respectively formed in the upward and downward directions may be greater than a diameter of each of the first agitator 723*a* and the second agitator 723*b*.

The dust container 727 is inserted into a dust container receiving part 7281 formed in the connection housing so as to receive foreign substances separated from the filter module 62*a*, 62*b*, 62*c*, and 62*d* by the agitator 723*a* and 723*b*. Through the dust container receiving hole 7225 formed on a side surface of the filter cleaner 72, the dust container 727 may be mounted into the dust container receiving part 7281 formed in the connection housing 728.

The dust container 727 has a curved shape convex rearward, when viewed from top or bottom. The dust container 727 is inserted into a side surface of the filter cleaner 72 disposed in rear of the filter module 62*a*, 62*b*, 62*c*, and 62*d*, and has a shape convex rearward.

The dust container receiving hole 7225 is formed on a side surface of the filter cleaner 72, and, since the dust container 72 has a shape convex rearward, the dust container 727 disposed in rear of the cabinet is capable of being drawn in a forward direction. This structure makes it easy to easily draw or insert the dust container 727 from the front side or a lateral side of the indoor unit.

Figure 21:
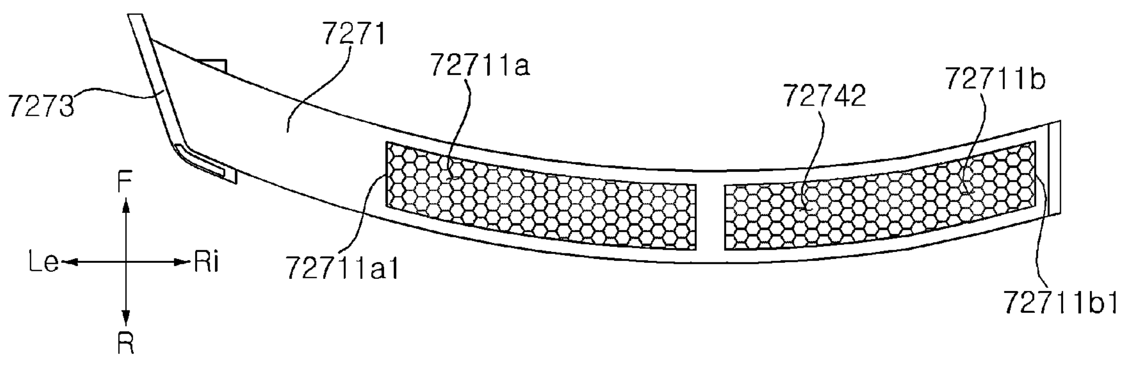
FIG. 21 is a plan view of a dust container according to an embodiment of the present invention.
Figure 22:
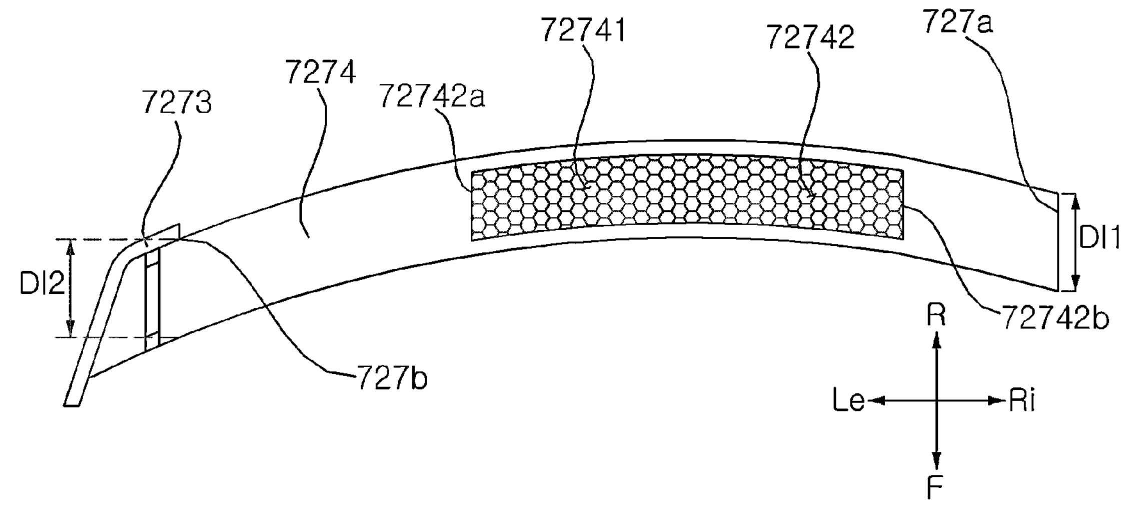
FIG. 22 is a bottom view of a dust container according to an embodiment of the present invention.
Figure 23:
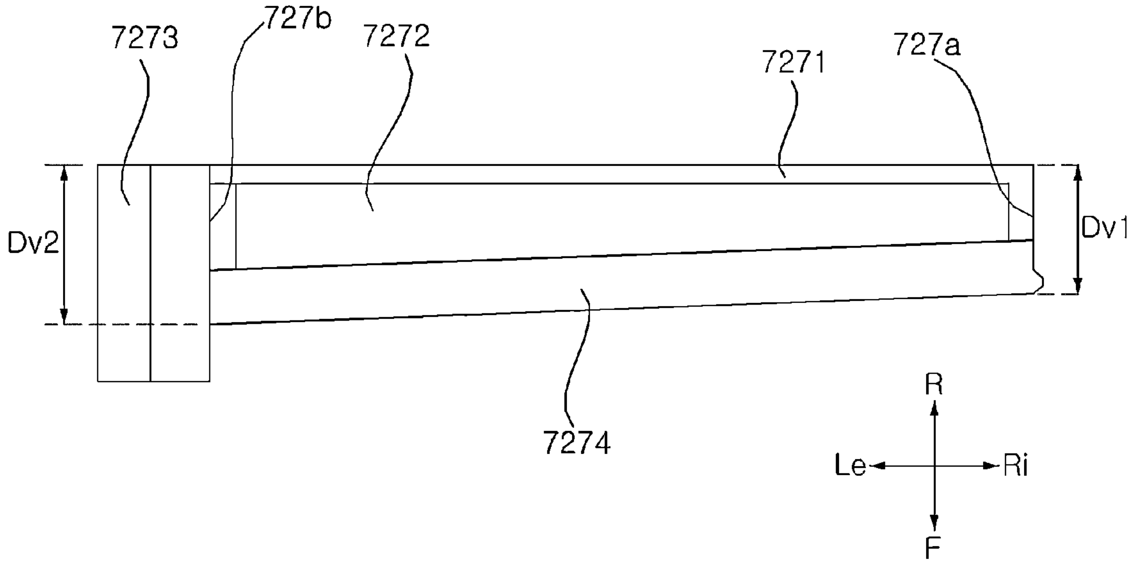
FIG. 23 is a rear view of a dust container according to an embodiment of the present invention.
Figure 24:
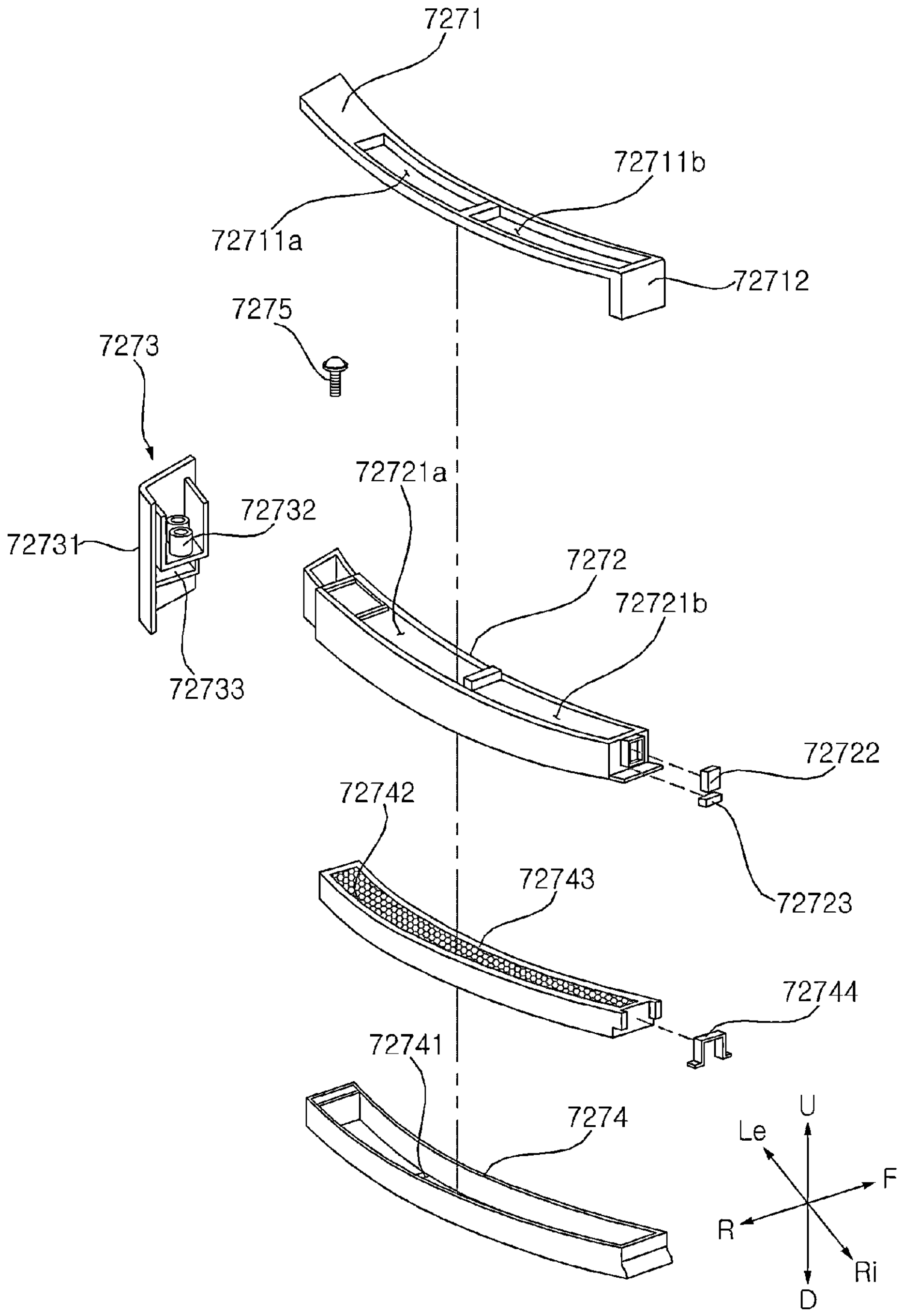
FIG. 24 is a perspective view of a dust container according to an embodiment of the present invention.

A cross section of the dust container 727 increases from an insertion start portion 727*a* toward an insertion end portion 727*b* in a direction in which the dust container 727 is inserted into the dust container receiving part 7281. Referring to FIG. 23, a vertical length Dv1 of the insertion start portion 727*a* of the dust container 727 is shorter than a vertical length Dv2 of the insertion end portion 727*b* of the dust container 727. Referring to FIG. 21, a horizontal length D11 of the insertion start portion 727*a* of the dust container 727 is equal to a horizontal length D12 of the insertion end portion 727*b* of the dust container 727.

The insertion start portion 727*a* may be the first portion to pass the dust container receiving hole 7225 when the dust container 727 is inserted into one side of the filter cleaner 72, and the insertion end portion 727*b* may be the last portion to be received through the dust container hole 7225.

A dust container suction port 72711*a* and 72711*b* are formed in the dust container 727 to suction air in upward direction, and a dust container discharge port 72741 is formed in the dust container 727 to discharge air in a downward direction. The dust container suction port 72711*a* and 72711*b* according to the present embodiment may be implemented as a pair of dust container suction ports respectively connected to the pair of the agitator grooves 7213*a* and 7213*b*.

A size of the dust container suction port 72711*a* and 72711*b* may be equal to a size of a dust container receiving part upper hole 72816*a* and 72816*b*. When the dust container 727 is inserted into the dust container receiving part 7281, both ends 72711*a*1 and 72711*b*1 of the dust container suction port 72711*a* and 72711*b* may be disposed at portions corresponding to both side ends of the dust container receiving part upper hole 72816*a* and 72816*b* formed in the dust container receiving part 7281.

A size of the dust container discharge port 72741 may be equal to a size of a dust container receiving part lower hole 72813*a* formed in the dust container receiving part 7281. When the dust container 727 is inserted into the dust container receiving part 7281, both ends 72741*a* and 72741*b* of the dust container discharge port 72741 may be disposed at positions corresponding to both side ends 72813*a*1, 72813*a*2 of the dust container receiving part lower hole 72813*a* formed in the dust container receiving part 7281. The dust container 727 includes: a dust container body 7272 forming a space where to contain dust; an upper cover 7271 disposed above the dust container body 7272 and having the dust container suction port 72711*a* and 72711*b* formed therein; and a lower cover 7274 disposed below the dust container body 7272 and having the discharge port 72741 formed therein. The dust container 727 includes a dust container filter 72742 that is disposed within the lower cover 7274 to filter dust from discharged air. The dust container 727 may further include a dust container filter mount 72743 to which the dust container filter 72742 is mounted, and which is accommodated within the lower cover 7274. The dust container 727 may further include an exposed portion 7273 that is exposed from one side of the housing 721 and 722 when the dust container 727 is inserted into the filter cleaner 72.

The upper cover 7271 covers a top surface of the dust container 727. A pair of dust container suction ports 72711*a* and 72711*b* open in an upward direction is formed in the upper cover 7171. The upper cover 7271 has a shape convex rearward. The upper cover 7271 may include a bent portion 72712 that is bent downward from the insertion start portion of the dust container 727 to cover an end portion of the dust container body 7272.

An upper side of the dust container body 7272 is coupled to the upper cover 7171, and a lower side thereof is coupled to the lower cover 7274 in a downward direction. The dust container body 7272 has an hollow inner space where to receive dust. Two dust container body suction holes 722721*a* and 72721*b* corresponding to the pair of dust container suction ports 72711*a* and 72711*b* may be formed on the upper side of the dust container body 7172. The lower side of the dust container body 7272, which is subject to be coupled to the lower cover 7274, may be open to communicate with a space of the lower cover 7274.

The dust container body 7272 may be formed of a transparent material so that foreign substances existing in the inner space can be seen. At an end portion in a direction in which the dust container 727 is inserted, the dust container body 7272 may be coupled to the exposed portion 7273.

The dust container body 7272 may have a shape convex rearward. The dust container body 7272 has a shape in which a cross section thereof decreases from the insertion starting portion toward the insertion ending portion. A lower end portion of the dust container body 7272 may have a shape which is upwardly inclined from the insertion ending portion 727*b* toward the insertion start portion 727*a*.

At the insertion start portion of the dust container body 7272 in a direction in which the dust container 727 is inserted, at least one magnet member 72722 or 72723 may be disposed. The insertion start portion of the dust container body 7272 in the direction in which the dust container 727 is inserted includes: a first magnet member 72722 generating a magnetic force to the lower cover 7274; and a second magnet member 72723 generating a magnetic force to the connection housing 728 into which the dust container 727 is inserted. The first magnet member 72722 and the second magnet member 72723 may be disposed between the dust container body 7272 and the bent portion 72712 of the upper cover 7271. The second magnet member 72723 maintains a state in which the dust container 727 is completely inserted into the filter cleaner 72.

Here, complete insertion indicates a state in which portions of the dust container 727 to be inserted into the filter cleaner 72 are all inserted into the filter cleaner 72. Thus, in the state in which the dust container 727 is completely inserted, the dust container 72 is not further inserted into the filter cleaner 72.

Part of the exposed portion 7273 is exposed to the outside of the filter cleaner 72 when the dust container 727 is completely inserted into the filter cleaner 72. The exposed portion 7273 may serve as a handle used by a user to insert the dust container 727 into the filter cleaner 72 or draw the dust container 727 from the filter cleaner 72. The exposed portion 7273 is coupled by an additional coupling member 7275 to an end portion of the dust container body 7272.

The exposed portion 7273 includes: an exposed portion cover 72731 disposed to be exposed from one side of the filter cleaner 72 when the dust container 722 is mounted to the filter cleaner 72; a coupling part 72732 to be coupled by the coupling member 7275 to the dust container body 7272; and a lower cover connector 72733 disposed below the coupling part 72732 and connected to one side of the lower cover 7274.

The exposed portion cover 72731 may have a shape that bends in correspondence to a shape of the dust container receiving hole 7225. When the dust container 727 is mounted to the filter cleaner 72, the coupling part 72732 and the lower cover connector 72733 are positioned inside the filter cleaner 72. In the lower cover connector 72733, there may be formed a groove portion into which an end protrusion 72745 of the lower cover 7274 is inserted.

An upper side of the lower cover 7274 is coupled to the dust container body 7272. In a lower side of the lower cover 7274, there is formed a discharge port 72741 through which air flows toward the suction fan 729. The dust container filter 72742 may be disposed within the lower cover 7274. The dust container filter 72742 may be disposed on the discharge port 72741 of the lower cover 7274.

The dust container filter mount 72743 with the dust container filter 72742 mounted thereto may be disposed in the lower cover 7274. A counterpart member 72744 subject to an attractive force from the first magnet member 72722 disposed on one side of the dust container body 7272 may be disposed in the lower cover 7274.

The end protrusion 72745 on one side of the lower cover 7274 may be inserted into the exposed portion 7273 to be fixed thereto, and the counterpart member 72744 on the other side of the lower cover 7274 may be fixed by an electronic force of the first magnet member 72722 of the dust container body 7272. The counterpart member 72744 is a member on which an attractive force acts with respect to the first magnet member 72722, and may use iron or a magnetic material. The counterpart member 72744 may be disposed at a starting portion of the lower cover 7274. The counterpart member 72744 may be disposed between the lower cover 7274 and the dust container filter mount 72743.

The connection housing 728 is disposed within the housing 721 and 722 to guide the dust container 727 to be inserted or drawn. The connection housing 728 connects the agitator groove 7213*a* and 7213*b* and the dust container 727. The connection housing 728 connects the dust container 727 and the suction fan 729.

The connection housing 728 may be fixed to the inside of the housing 721 and 722. The connection housing 728 may be fixed to an inner surface of the base cover 721. The connection housing 728 includes: the dust container receiving part 7281 into which the dust container 727 is inserted; and the suction connection tube 7282*a* and 7282*b* connecting the agitator groove 7213*a* and 7213*b* and the dust container 727 inserted into the dust container receiving part 7281.

The dust container receiving part 7281 may have a shape corresponding to an external shape of the dust container 727, so that the dust container 727 can be inserted into the dust container receiving part 7281. That is, the dust container receiving part 7281 may have a shape that surrounds an outer circumference of the dust container 727, which is formed convex rearward. In the dust container receiving part 7281, a front surface 72811, into which the dust container 727 is to be inserted, and a rear surface 72812 may be formed as a convexly curved surface. In the dust container receiving part 7281, a bottom surface 72813, into which the dust container 727 is to be inserted, is upwardly inclined in a direction of the insertion.

In the dust container receiving part 7281, there is disposed a receiving part auxiliary roller 72814*a* and 72814*b* that makes it easy to insert or draw the dust container 727. The receiving part auxiliary roller 72814*a* and 72814*b* may be disposed on each of the front surface and the rear surface of the dust container receiving part 7281.

At an end portion of the dust container receiving part 7281, there may be disposed a dust container fixing member 72815 subject to an attracting force from the magnet member 72722 disposed in the dust container 727. The dust container fixing member 72815 may be disposed at an end portion of the dust container receiving part 7281 to fix the dust container 727 using a magnetic force when the dust container 727 is completely inserted into the dust container receiving part 7281.

The suction connection tube 7282*a* and 7282*b* is disposed above the dust container receiving part 7281. On a top surface 72816 disposed above the dust container 7281, there may be formed a pair of dust container receiving part upper holes 72816*a* and 72816*b* communicating with a pair of suction connection tubes 7282*a* and 7282*b*.

A lower side of the dust container receiving part 7281 may be connected to a suction fan connection tube 7292 that is connected to one side of the suction fan 729. On The bottom surface 72813 of the dust container receiving part 7281, there may be formed a dust container receiving part bottom hole 72813*a* corresponding to the discharge port 72741 of the dust container 727. The dust container receiving part bottom hole 72813*a* may allow the inside of the dust container 727 and the suction fan connection tube 7292 to communicate with each other. The bottom surface 72813 of the dust container receiving part 7281 may be disposed to be upwardly inclined from a start portion toward an end portion in a direction in which the dust container 727 is inserted.

When the dust container 727 is completely inserted into the dust container receiving part 7281, the upper cover 7271 of the dust container 727 may be brought into contact with the top surface 72816 of the dust container receiving part 7281, and the lower cover 7274 of the dust container 727 may be brought into contact with the bottom surface 72813 of the dust container receiving part 7281.

The suction connection tube 7282*a* and 7282*b* is disposed above the dust container receiving part 7281. The suction connection tube 7282*a* and 7282*b* connects the dust container receiving part 7281 and the pair of agitator grooves 7213*a* and 7213*b*. The suction connection tube 7282*a* and 7282*b* may include a pair of suction connection tubes 7282*a* and 7282*b* respectively connected to the pair of agitator grooves 7213*a* and 7213*b*. The pair of suction connection tubes 7282*a* and 7282*b* is mounted to one side of an agitator circumferential surface 72131 formed by the pair of agitator grooves 7213*a* and 7213*b*. The pair of suction connection tubes 7282*a* and 7282*b* may communicate with the pair of agitator grooves 7213*a* and 7213*b* through communication holes 72132*a* and 72132*b* that are respectively formed in the pair of agitator grooves 7213*a* and 7213*b*.

The pair of suction connection tubes 7282*a* and 7282*b* may be formed as a structure integrally formed with the dust container receiving part 7281. The connection housing 728 includes a plurality of couplers 7283*s* to couple the base cover 721 and the agitator circumferential surface 72131 of the agitator grooves 7213*a* and 7213*b*. In the pair of suction connection tubes 7282*a* and 7282*b*, coupling hooks 7284 are formed at portions to be brought into contact with the agitator circumferential surface 72131 of the agitator grooves 7213*a* and 7213*b*. The coupling hooks 7284 are to be engaged with coupling protrusions 72133 that are formed on the agitator circumferential surface 72131 of the agitator grooves 7213*a* and 7213*b*. The connection housing 728 is capable of being fixed to the base cover 721 by the coupling hooks 7284 and the coupling protrusion 72133 that is formed on the agitator circumferential surface 72131 of the agitator grooves 7213*a* and 7213*b*. Before the connection housing 728 is coupled to the base cover 721 by an additional coupling member (not shown), the connection housing 728 may be fixed to the base cover 721.

The suction fan 729 forms airflow that flows from the agitator grooves 7213*a* and 7213*b* toward the dust container 727. The suction fan 729 rotates by the suction fan motor 7291. When the suction fan 729 rotates, air and foreign substances existing in the agitator grooves 7213*a* and 7213*b* may be suctioned into the dust container 727. The suction fan 729 is disposed below the dust container 727. The suction fan 729 may have a structure of suctioning air from an upper side and discharging the air in a direction downward of a circumferential surface. The suction fan motor 7291 is disposed below the suction fan 729.

The suction fan 729 is disposed between the pair of gear motors 7251*a* and 7251*b*. The air discharged by the suction fan 729 may flow in a direction toward the gear motors 7251*a* and 7251*b* disposed on a circumferential surface. The air flowing by the suction fan 729 may be discharged to the outside of the filter cleaner 72 through the cover exhaust port 7222*b* formed in the bottom surface 7222 of the outer cover 722.

The suction fan connection tube 7292 connects the discharge port 72741 of the dust container 727 and the suction fan 729. The suction fan connection tube 7292 is connected to the bottom surface 72813 of the dust container receiving part 7281 in the connection housing 728. The upper side of the suction fan connection tube 7292 connected to the lower side of the dust container receiving part 7281 may be formed to be inclined in correspondence to the bottom surface 72813 of the dust container receiving part 7281.

The suction fan connection tube 7292 forms a direction in which an inner cross section of the suction fan connection tube 7292 decreases toward the suction fan 729. That is, the inner cross section of the suction fan connection tube 7292 may decreases from the top thereof connected to the dust container receiving part 7291 toward the bottom thereof connected to the suction fan 729.

In the suction fan connection tube 7292, there may be disposed a suction grill 72921 that removes dust introduced into the suction fan 729. The suction grill 72921 is capable of removing foreign substances flowing toward the suction fan 729 when the dust container 727 is separated from the dust container receiving part 7281. The suction grill 72921 may be disposed at the upper end of the suction fan connection tube 7292.

The filter cleaner 72 may include a Printed Circuit Board (PCB) 74 having a circuit that controls operation of the filter leaner 72 with power supplied through the power line 731. The PCB 74 is disposed within the housing 721 and 722. The PCB 74 may be disposed on the opposite side of the dust container receiving hole 7225 through which the dust container 727 is inserted.

<Filter Cleaning Assembly-Power Supply Device>

With reference to FIGS. 11, 12, and 28 to 31, the power supply device of the filter cleaning assembly according to the present embodiment will be described.

A power supply device 73 supplies power to a filter cleaner 72 that moves upward and downward in rear of an upper cabinet 11 and the lower cabinet 13. The power supply device includes: the power line 731 connected to the filter cleaner 72 to supply power; a code reel 732 for reeling a power line 731 around an outer circumference thereof to maintain tension of the power line 731; and a power line cover tube 733 for minimizing friction of the power line 731 disposed inside the base unit 12 with a different element.

The power line 731 is connected to a power source terminal 7216 of the filter cleaner 72. The power line 731 is fixed to a power line fixing part 7217, and positioned in a guide groove 7113 of a guide rail 711 when the filter cleaner 72 moves.

Since tension of the power line 731 is maintained by the code reel 732, the power line 731 is capable of being positioned in the guide groove 7113 of the guide rail 711. The code reel 732 may be in a structure of reeling the power line around the outer circumferential surface thereof and drawing the power line 731 with a consistent force.

The code reel 732 according to the present embodiment is disposed inside the base unit 12. The code reel 732 may be disposed below a movement guider 71, thereby enabled to maintain tension of the power line 731. The code reel 732 is disposed below the guide rail 711 and draws the power line 731 in a downward direction.

The power line cover tube 733 is disposed between the code reel 732 and the guide rail 711. The power line cover tube 733 prevents the power line 731 disposed inside the base unit 12 from being in friction with a different element disposed inside the base unit 12.

The power line cover tube 733 extends from one side of the outer circumferential surface of the code reel 732 toward a rearward protruding cover 131 formed in a lower cabinet 13. The power line cover tube 733 may extend from the inside of a base unit 12 toward the rearward protruding cover 131 of the lower cabinet 13 external to the base unit 12, thereby forming a curbed tub at some sections.

At a portion disposed on the rearward protruding cover 131, the power line cover tube 733 may form a straight tube extending upward. At an upper end 7331 disposed inside the rearward protruding cover 131, the power line cover tube 733 may form the straight tube extending upward. The upper end 7331 of the power line cover tube 733 may be disposed rearward of the base unit 12 and inward of the rearward protruding cover 131. The top end 7331 of the power line cover tube 733 may be connected to a top surface 1311 of the rearward protruding cover 131. The power line 731 disposed inside a top end 7331 of the power line cover tube 131 may protrude toward the outside of the lower cabinet 13 through a power line hole 1312 of the rearward protruding cover 131.

Figure 32:
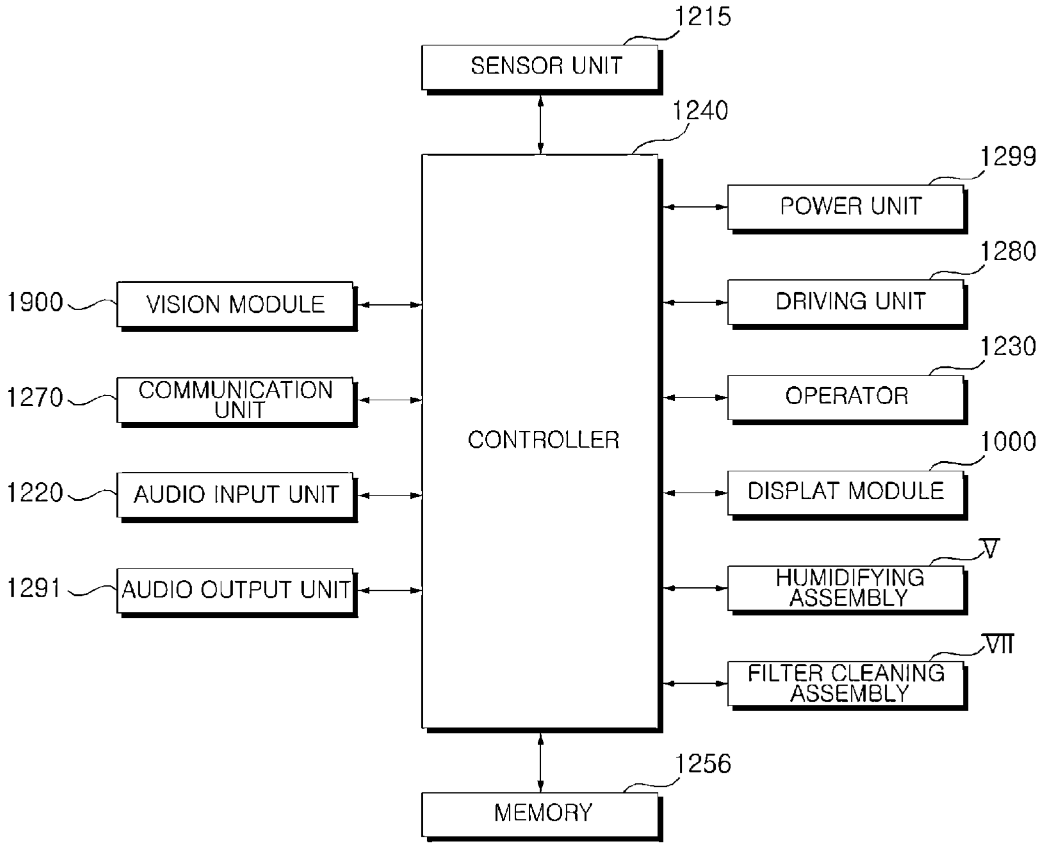
FIG. 32 is a block diagram showing a control relationship between major components of an air conditioner according to an embodiment of the present invention.

FIG. 32 is a block diagram illustrating a control relationship of major components of an air conditioner according to an embodiment of the present invention.

Referring to the drawing, an air conditioner according to an embodiment of the present invention may include: a sensor unit 1215 including one or more sensors configured to sense a variety of data; a memory 1256 configured to store the variety of data; a communication unit 1270 configured to wirelessly communicate with a different electronic device; a filter cleaning assembly VII configured to clean a filter; a humidifying assembly V; a controller 1240 configured to control overall operations of the air conditioner; and a driving unit 1280 configured to control operations of a heat exchanger, a valve, a wind adjustment means, etc. disposed inside the cabinet assembly I under control of the controller 1240.

For example, the sensor unit 1215 may include: one or more temperature sensors configured to sense indoor and outdoor temperature; a humidity sensor configured to sense humidity; a dust sensor configured to sense an air quality; and the like.

The temperature sensors may be disposed at a suction port to measure indoor temperature, disposed inside the cabinet assembly I to measure heat exchange temperature, disposed on one side of a discharge port to measure temperature of discharged air, and disposed in a refrigerant pipe to measure refrigerant temperature.

In particular, the sensor unit 1215 may sense a distance to the filter cleaner 72. Specifically, the sensor unit 1215 may be disposed in the guide rail 711 to sense a distance to the housing 721 and 722. To this end, the sensor unit 215 may include an upper distance sensor 1215*a* and a lower distance sensor 1215*b*.

The upper distance sensor 1215*a* is disposed at an upper end of the guide rail 711 and is capable of sensing a distance to the filter cleaner 72 upon upward movement of the filter cleaner 72.

The lower distance sensor 1215*b* is disposed at the bottom of the guide rail 711 and capable of sensing a distance to the filter cleaner 72 upon downward movement of the filter cleaner 72.

Meanwhile, the controller 1240 may control a moving speed of the filter cleaner 72 based on distance information sensed by the sensor unit 1215.

A vision module 1900 may include at least one camera to photograph an indoor environment. The camera serves to photograph surroundings or an external environment of the air conditioner, and such a camera may be installed in plural at each portion for efficiency in photographing.

For example, the camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

Meanwhile, an image acquired by the camera may be stored in the memory 1256.

The vision module 1900 may be installed in the upper cabinet 11 and may be, in some cases, installed on an upper panel of the cabinet. In addition, the vision module 1900 may be accommodated inside the cabinet assembly I when not in operation, and may be elevated to operate.

A display module 1000 may display information corresponding to a user's command input, a processing result corresponding to the user's command input, an operation mode, an operation state, an error state, etc. in the form of an image.

In some implementations, the display module 1000 may form an inter-layer structure with a touch pad to be configured as a touch screen. In this case, a display may be used not just as an output device but also as an input device using which information corresponding to a user's touch can be received.

In some implementations, the display module 1000 may further include a lighting unit that outputs an operation state on the basis of whether the lighting unit is turned on/off, which light color the lighting unit emits, whether the lighting unit flicks or not.

In some implementations, the air conditioner may further include an additional operator 1230. The operator 1230 may include at least one of a button, a switch, or a touch input means, and may input a user's command or predetermined data to the air conditioner.

The memory 1256 records a variety of information required to operate the air conditioner, and may store control data necessary to control operations, data about operation modes, data sensed by the sensor unit 1215, data transmitted and received via the communication unit 1270, etc.

The memory 1256 may include a volatile or non-volatile recording medium. The recording medium store data readable by a micro processor, and may include a Hard Disk Drive (HDD), a Solid State Disk (SSD), a Silicon Disk Drive (SDD), an ROM, an RAM, a CD-ROM, a magnetic tape, a floppy disk, a optical data storage, etc.

Meanwhile, the memory 1256 may store data required for voice recognition, and the controller 1240 may process a user voice input signal received via an audio input unit 1220 and perform a voice recognition procedure.

Meanwhile, simple voice recognition may be performed by the air conditioner, and sophisticated voice recognition, such as natural language processing and the like, may be performed by a voice recognition server system.

For example, when a wake-up voice signal including a preset call word is received, the air conditioner may be transitioned to a state for receiving a voice command. In this case, the air conditioner may perform a voice recognition procedure to determine whether a voice including a call word is received, and a voice recognition procedure for determining whether a user's voice is received may be performed using the voice recognition server system.

Since there are limitations in system resources of the air conditioner, complicated natural language recognition and processing may be performed by the voice recognition server system.

In some implementations, the memory 1256 may store a sound file of a voice command input by a user, and the stored sound file may be transmitted to the voice recognition server system via the communication unit 1270. In addition, the stored sound file may be deleted after a preset period of time elapses or after a preset operation is performed.

The communication unit 1270 may include one or more communication modules and exchange various signals with a different electronic device by wirelessly communicating with the different electronic device according to a predetermined communication scheme.

In this case, the predetermined communication scheme may be a Wi-Fi communication scheme. In response, a communication module included in the air conditioner may be a Wi-Fi communication module, but the present invention is not limited to a communication scheme.

In addition, the air conditioner may include a different-type communication module or a plurality of communication modules. For example, the air conditioner may include an NFC module, a Zigbee communication module, a Bluetooth™ communication module, etc.

The air conditioner may be connected with a server included in a voice recognition server system, a predetermined external server, a user's mobile terminal, etc. via a Wi-Fi communication module, and may support smart functions, such as remote monitoring, remote control, etc.

A user may check information on an air conditioner using the mobile terminal, or control the air conditioner.

In addition, the communication unit 1270 may communicate with an access point (AP) device and communicate with other devices by accessing a wireless internet network via the AP device.

In addition, the controller 1240 may transmit information on a state of the air conditioner, a user's voice command, etc. to the voice recognition server system via the communication unit 1270.

Meanwhile, when a control signal is received via the communication unit 1270, the controller 1240 may control the air conditioner to operate in accordance with the received control signal.

By controlling rotation of a motor connected to indoor fans, the driving unit 1280 may control an amount of air to be discharged to an indoor space. For example, the driving unit 1280 may control rotation of a motor connected to a circulator fan provided in the front blowing module 31, any other blow fan below the circulator fan, etc.

In addition, the driving unit 1280 may control driving of a heat exchanger to evaporate or condense a supplied refrigerant so as to perform heat exchange of ambient air.

The driving unit 1280 may control operations of a valve, a wind adjustment means, etc. provided inside the cabinet assembly I in accordance with a control command from the controller 1240.

In some implementations, the controller 1240 may directly control a predetermined unit in the air conditioner.

Meanwhile, the driving unit 1280 may include a motor driving unit, and may include an inverter to drive a motor.

In some implementations, the driving unit 1280 may provide a driving force so that the front blowing module 31 rotates. In addition, the driving unit 1280 may provide a driving force to a circulator moving unit (not shown) so that the front blowing module 31 moves. In addition, the driving unit 1280 may control opening and closing of a valve installed inside. In some cases, the driving unit 1280 may provide a driving force so that the upper cabinet slides to the left or to the right. In some implementations, the driving unit 1280 may include a circulator driving unit and a front panel driving unit.

The filter cleaner assembly VII may have the filter module 62*a*, 62*b*, 62*c*, and 62*d* installed therein, and remove foreign substances from the filter module 62*a*, 62*b*, 62*c*, and 62*d*. While moving on the surface of the filter module 62*a*, 62*b*, 62*c*, and 62*d*, the filter cleaner 72 may suction dust from the filter module 62*a*, 62*b*, 62*c*, and 62*d*. In addition, while cleaning the filter module 62*a*, 62*b*, 62*c*, and 62*d*, the filter cleaner 72 may sterilize the filter module 62*a*, 62*b*, 62*c*, and 62*d* using a sterilizing lamp.

When necessary, the filter cleaning assembly VII may be a concept including the guide rail 711, the upper distance sensor 1215*a*, the lower distance sensor 1215*b*, the filter cleaner 72, and a cleaning module controller 1247. In another example, the filter cleaning assembly VII may be a concept including the guide rail 711, the filter cleaner 72, and the cleaning module controller 1247. In yet another example, the filter cleaning assembly VII may be a concept including a filter cleaning unit and the cleaning module controller 1247.

Meanwhile, the air conditioner according to the present invention automatically or manually performs filter cleaning, thereby providing convenience in filter management.

The humidifying assembly V performs humidification by supplying water from the water tank 51 and providing moisture, and may discharge humidified air to the outside.

The humidifying assembly V may humidify air by generating steam, and allow the humidified air to be discharged to an indoor space through a discharge port together with conditioned air.

The humidifying assembly V may employ a vibration type using vibration, a steam type, a spray type by spraying water, and any of various types of humidifying methods.

The controller 1240 may process input and output data, store data in the memory 1256, and perform control to transmit and receive data via the communication unit 1270.

The controller 1240 may control the air conditioner to operate in accordance an input through the display module 1000, the operator 1230, etc., and may control the driving unit 1280 so that cold air conditioned by a refrigerant supplied from an outdoor unit is discharged into an indoor space.

The controller 1240 may perform control based on a set operation mode or data measured by the sensor unit 1215 so that the front blowing module 31 discharges air to the outside.

In addition, the controller 1240 may operate the humidifying assembly V to discharge humidified air, and control the filter cleaning assembly VII to clean a filter.

The controller 1240 may sense presence of a person using the sensor unit 1215 or the vision module 1900, and control airflow based on position information of the sensed person.

The controller 1240 may monitor an operation state of each module, and perform control such that an operation state is output through the display module 1000 based on received data.

Meanwhile, the air conditioner according to an embodiment of the present invention may further include a power unit 1299, an audio input unit 1220 configured to receive a user's voice command, and an audio output unit 1291 configured to output predetermined information in an audio form.

The power unit 1299 may supply operation power to each unit of the air conditioner. The power unit 1299 may rectify and smooth a common power source connected thereto to generate and supply a voltage required by each unit. In addition, the power unit 1299 may prevent an inrush current and generate a constant voltage. In addition, the power unit 1299 may supply operation power to an outdoor unit (not shown).

The audio input unit 1220 may receive an external audio signal and a user voice command. To this end, the audio input unit 1220 may include one or more microphones (MIC). In addition, in order to more precisely receive a user's voice command, the audio input unit 1220 may include a plurality of MICs. The plurality of MICs may be deposed at different positions at intervals, and acquire an external audio signal and process the external audio signal into an electrical signal.

The audio input unit 1220 may include a processor configured to convert analog sound into digital data, or may be connected to a processor to convert a user's voice command into data so that the processor 1240 or a predetermined server can recognize the voice command.

Meanwhile, the audio input unit 1220 may employ any of various noise reduction algorithm to reduce noise occurring when receiving a user's voice command.

In addition, the audio input unit 1220 may include elements required to process an audio signal, such as a filter for reducing noise from an audio signal received from each MIC, an amplifier for amplifying a signal output from a filter and outputting the amplified signal, etc.

In addition, under control of the controller 1240, the audio output unit 1291 may output audio sound to notify a notification message such as warning sound, an operation mode, an operation state, an error state, etc., information corresponding to a user's command input, a processing result corresponding to the user's command input, and the like.

Meanwhile, the audio output unit 1291 may convert an electrical signal from the controller 1240 into an audio signal and output the audio signal. To this end, the audio output unit 1291 may include a speaker or the like.

Figure 33:
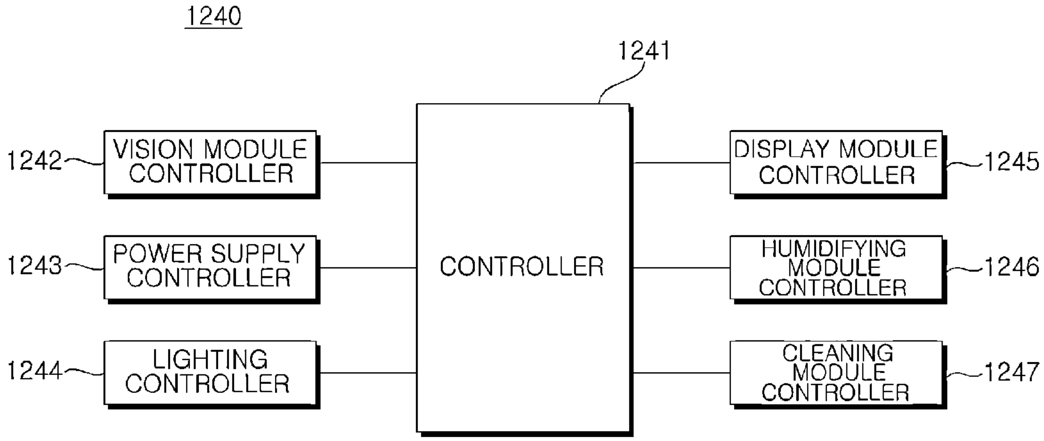
FIG. 33 is a diagram showing an example of internal elements of a controller according to an embodiment of the present invention.

FIG. 33 is a diagram illustrating inner configuration of a controller according to an embodiment of the present invention.

Referring to the drawing, the controller 1240 may be configured as one micro processor or a plurality of micro processors.

Depending on functions, the controller 1240 may include a main controller 1241, a vision module controller 1242, a power supply controller 1243, a light controller 1244, a display module controller 1245, a humidifying module controller 1246, a cleaning module controller 1247, etc.

The controllers 1241 to 1247 may be configured as a single microprocessor and may be installed at each module. For example, the vision module 1900, the filter cleaning assembly VII, and the humidifying assembly V may be controlled using one microprocessor.

In some implementations, the main controller 1241 may apply a control command to other controllers 1241 to 1247, receive data from each of the controllers, and process the received data. The main controller 1241 and the other controllers 1242 to 1247 may be connected in a BUS form to transmit and receive data from one another.

In some implementations, a microprocessor may be installed in each module to process operation of a corresponding module more quickly. For example, a display module controller 1245 may be provided in the display module 1000, and a humidifying module controller 1246 may be provided in the humidifying assembly V.

Meanwhile, the block diagram of the controller 1240 in FIG. 33 is just a block diagram according to one embodiment of the present invention. Some of the components in the block diagram may be integrated, added, or omitted according to the specification of the controller 1240 and units of the air conditioner which are actually implemented. That is, if necessary, two or more components can be integrated into one component or one component may be divided into two or more components and configured. In addition, a function performed by each block is to describe an embodiment of the present invention and its specific operation or device does not limit the scope of the present invention.

Meanwhile, the present invention is to control movement of the filter cleaning assembly VII, and the controller 1240 and the cleaning module controller 1247 may be hereinafter used interchangeably.

Figure 34:
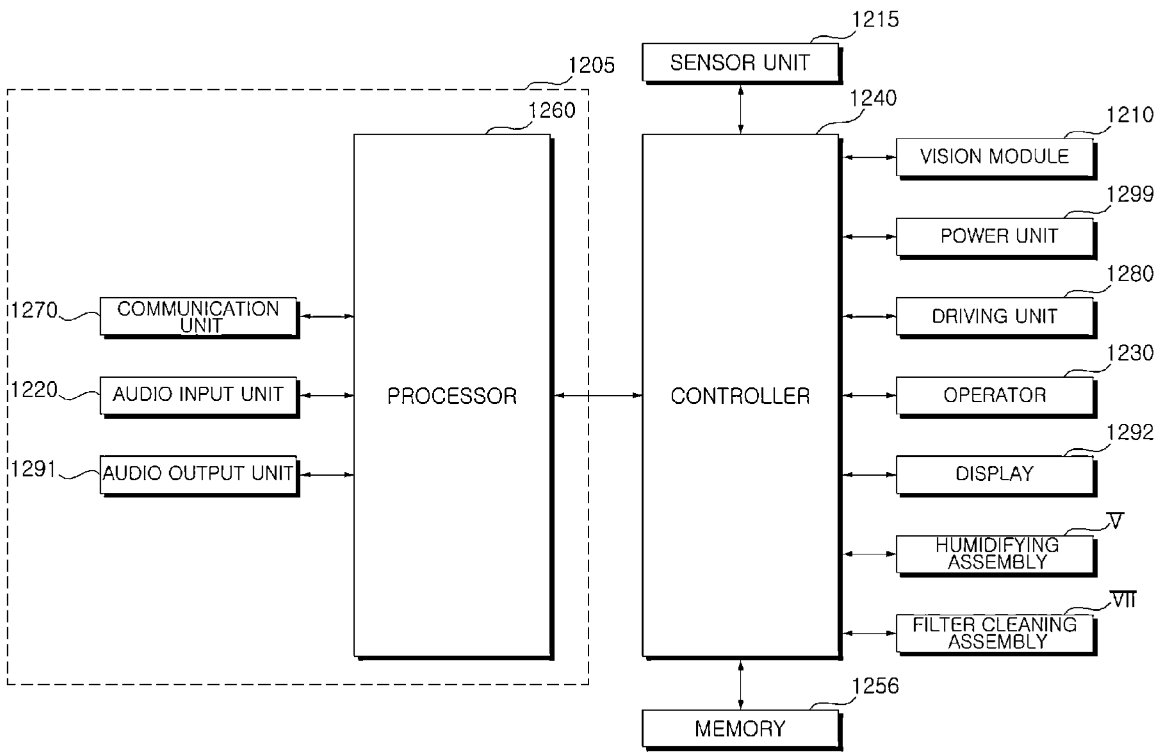
FIG. 34 is a block diagram showing a control relationship between major components of an air conditioner according to an embodiment of the present invention.
Figure 35:
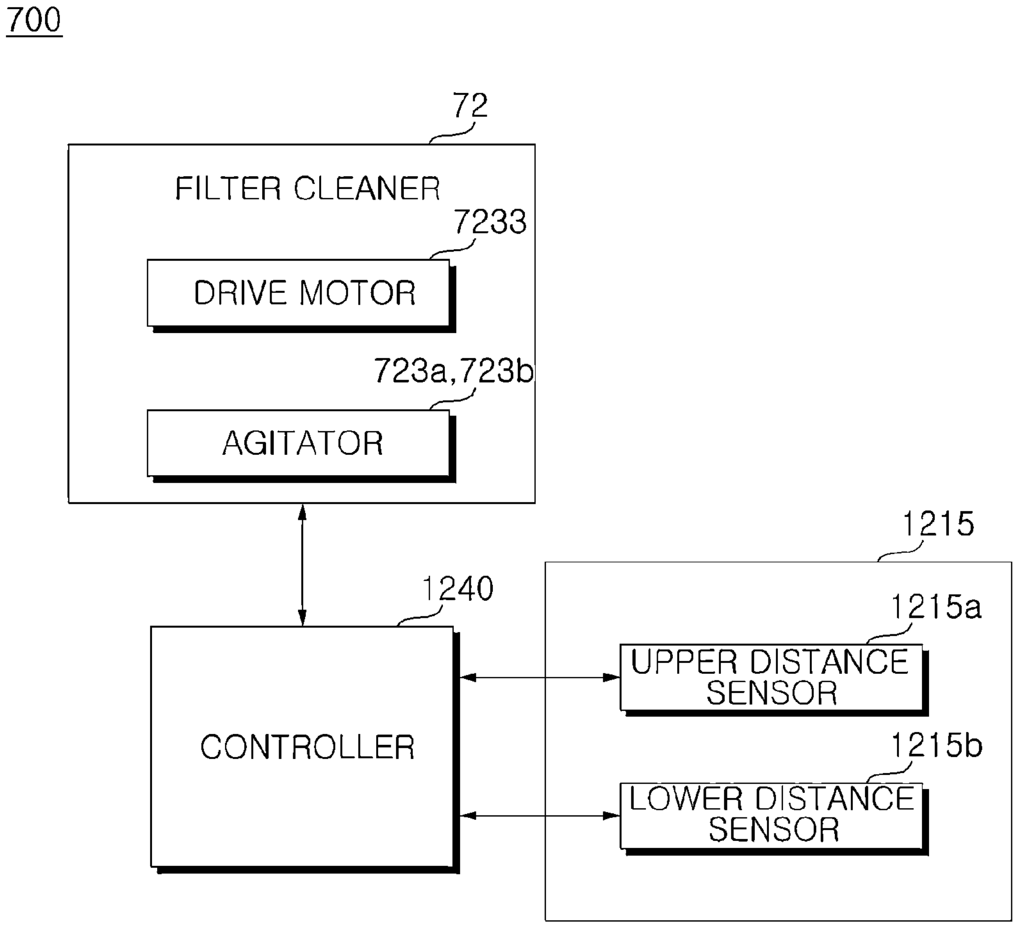
FIG. 35 is a internal block diagram of a cleaning module according to an embodiment of the present invention.

FIG. 34 is a block diagram illustrating a control relationship of major components of an air conditioner according to an embodiment of the present invention.

Referring to the drawing, an air conditioner may include: a vision module 1900, a sensor unit 1215 configured to sense a variety of data; an audio input unit 1220 configured to receive a user's voice command; an operator 1230; a memory 1256 configured to store the variety of data; a communication unit 1270 configured to wirelessly communicate with a different electronic device; a driving unit 1280 configured to perform operations of the air conditioner; a display module 1000 configured to display predetermined information as an image; an audio output unit 1291 configured to output predetermined information as audio sound; a humidifying assembly V, a filter cleaning assembly VII, a controller 1240 configured to control overall operations; and a processor 1260.

The inner block diagram of the air conditioner in FIG. is similar to the diagram in FIG. 32, but different therefrom in that the processor 1260 is further included and that the audio input unit 1220, the audio output unit 1291, the communication unit 1270, and the processor 1260 are provided in one module, that is, a voice recognition module 1205.

In some implementations, the voice recognition module 1205 may include the communication unit 1270 and the processor 1260, and the audio input unit 1220 and the audio output unit 1291 may be configured as an additional integrated module.

Meanwhile, the processor 1260 may control the audio input unit 1220, the audio output unit 1291, the communication unit 1270, and the like.

Hereinafter, FIG. 34 will be described mainly about the differences from FIG. 32.

The processor 1260 may process a user's voice signal received via the audio input unit 1220, and perform a voice recognition procedure.

For example, when a wake-up voice signal including a preset call word is received, the processor 1260 may be transitioned into a state for receiving a voice command. In this case, the processor 1260 may perform the voice recognition procedure as to determining whether a voice including a call word is received, and the voice recognition procedure as to determining a user's voice input may be performed by a voice recognition server system.

The processor 1260 may perform control such that a user's voice command received after recognition of a wake-up voice signal is transmitted to the voice recognition server system via the communication unit 1270.

In addition, the processor 1260 may state information of the air conditioner, the user's voice command, and the like to the voice recognition server system via the communication unit 1270.

Meanwhile, when a control signal is received via the communication unit 1270, the processor 1260 may transmit the control signal to the controller 1240 and then the controller 1240 may control the air conditioner to operate in accordance with the received control signal.

In conclusion, by using the voice recognition module 1205, it is possible to acquire voice data, communicate with the server system, and output corresponding sound.

Meanwhile, the voice recognition module 1205 may be attached not just to the air conditioner but also various electronic devices. Alternatively, the voice recognition module 1205 may be used as a separate device, instead of being attached to any other electronic device.

The air conditioner according to an embodiment of the present invention may receive a user's voice input, and the voice recognition server system may control the air conditioner by recognizing and analyzing the user's voice input.

Accordingly, a user is capable of controlling the air conditioner without manipulating a mobile terminal or a remote controller.

Figure 25:
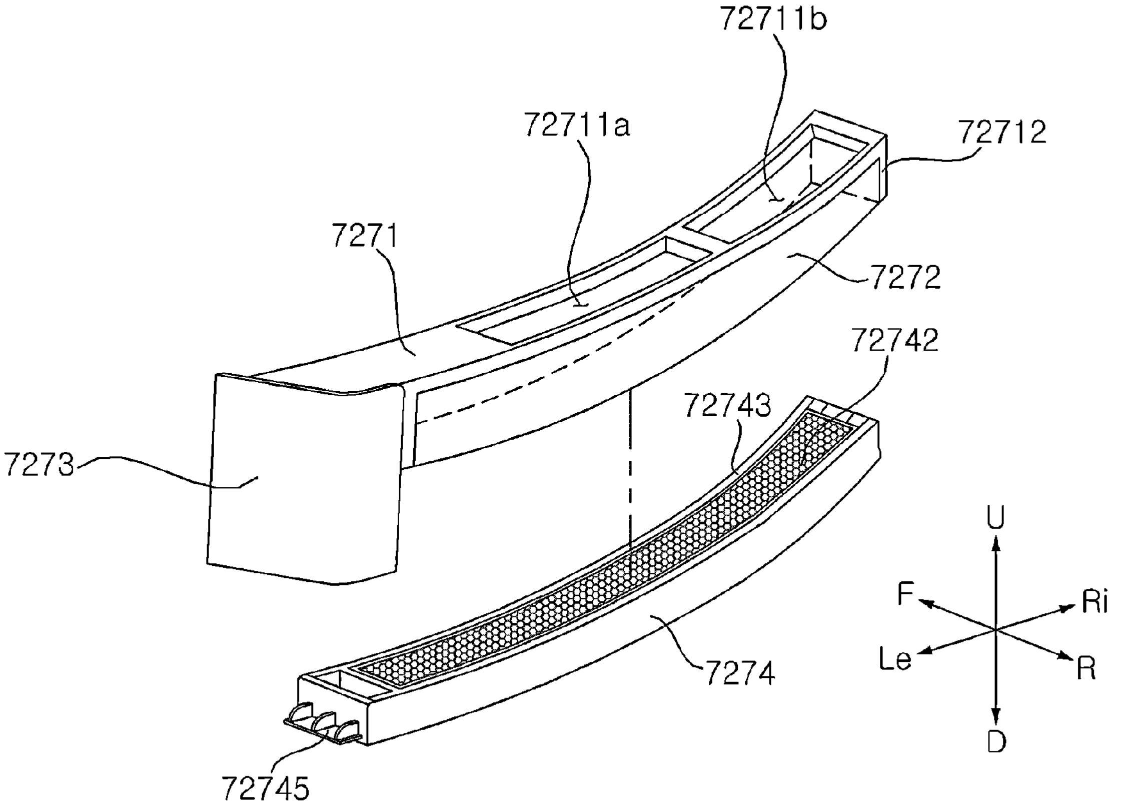
FIG. 25 is a perspective view of a dust container body and a lower cover separated from each other according to an embodiment of the present invention.

FIG. 25 is an internal block diagram of a cleaning module according to an embodiment of the present invention.

Referring to the drawing, the filter cleaning assembly VII may include: a filter cleaner 72 cleaning a filter while moving over a filter module 62*a*, 62*b*, 62*c*, and 62*d*; a guide rail 711 guiding movement of the filter cleaner 72; and a sensor unit 1215 disposed in the guide rail 711 to sense a distance to the filter cleaner 72 in move.

The air conditioner according to the present invention may include the filter module 62*a*, 62*b*, 62*c*, and 62*d* that are disposed at an air suction port to filter air flowing toward an inner space. The filter cleaner 72 may move over the filter module 62*a*, 62*b*, 62*c*, and 62*d*.

More specifically, the guide rail 711 may extend from the center of the top of the filter module 62*a*, 62*b*, 62*c*, and 62*d* toward the center of the bottom of the filter module 62*a*, 62*b*, 62*c*, and 62*d*, and the guide rail 711 may guide upward and downward movement of the filter cleaner 72.

The filter cleaner 72 may include a gear motor 7251*a* and 7251*b* generating a driving force to enable the filter cleaner 72 to move, and a mobile gear 725*a* and 725*b* transferring the driving force of the gear motor 7251*a* and 7251*b*. The mobile gear 725*a* and 725*b* may include pinion gear teeth disposed in a circumferential direction so as to be engaged with the guide rail 711.

The guide rail 711 may include rack gear teeth to be engaged with the pinion gear teeth.

Upon a filter cleaning function request, the controller 1240 may control the gear motor 7251*a* and 7251*b* to generate a driving force. For example, the gear motor 7251 and 7251*b* may be a step motor, and the controller 1240 may generate a pulse signal upon a filter cleaning function request to control the gear motor 7251*a* and 7251*b*. In the case where a step motor rotates once in response to reception of 360 pulses, the step motor may rotate about one degree in response to reception of one pulse.

The driving force generated by the gear motor 7251*a* and 7251*b* is transferred to the mobile gear 725*a* and 725*b*, and the mobile gear 725*a* and 725*b* may rotate accordingly. In this case, the pinion gear teeth of the moving bear 725*a* and 725*b* and rack gear teeth 730*c* of the guide rail 711 may be engaged with each other. In addition, the filter cleaner 72 may move upward or downward depending on a direction of rotation of the mobile gear 725*a* and 725*b*.

Meanwhile, the agitator 723*a* and 723*b* may be connected directly or indirectly to the agitator motor 7233, thereby enabled to rotate in link with the upward or downward movement of the filter cleaner 72. The agitator 723*a* and 723*b* may rotate in friction contact with the filter module 62*a*, 62*b*, 62*c*, and 72*d*. In addition, while rotating, the agitator 723*a* and 723*b* may separate foreign substances stuck in the filter module 62*a*, 62*b*, 62*c*, and 62*d*.

The sensor unit 1215 may include at least one IR (infrared) sensor configured to sense a distance to the filter cleaner 72 based on an infrared signal. The IR sensor may output a first infrared sensor, and sense a distance to the filter cleaner 72 based on a second infrared signal that is reflected from the filter cleaner 72 from among first infrared signals output from the IR sensor.

The sensor unit 1215 of the present invention includes an IR sensor, and thus, it is easy to implement the filter cleaning assembly VII and reduce manufacturing cost.

The sensor unit 1215 may include an upper distance sensor 1215*a* and a lower distance sensor 1215*b*.

The upper distance sensor 1215*a* may be disposed at an upper end of the guide rail 711 and senses a distance to the filter cleaner 72 when the filter cleaner 72 moves upward.

The lower distance sensor 1215*b* may be disposed at a lower end of the guide rail 711 and senses a distance to the filter cleaner 72 when the filter cleaner 72 moves downward.

More specifically, the filter cleaner 72 may include a housing 721 and 722 that accommodates the gear motor 7251*a* and 7251*b* and the agitator 723*a* and 723*b*.

The upper distance sensor 1215*a* may be disposed at the top end of the guide rail 711. Alternatively, the upper distance sensor 1215*a* may be disposed at a position in the guide rail 711 which corresponds to a maximum upward moving path of the filter cleaner 72.

The upper distance sensor 1215*a* may sense a distance to the top surface of the housing 721 and 722 when the filter cleaner 72 moves upward.

The lower distance sensor 1215*b* may be disposed at the lower end of the guide rail 711. Alternatively, the lower distance sensor 1215*b* may be disposed at a position in the guide rail 711 which corresponds to a maximum downward moving path of the filter cleaner 72.

The lower distance sensor 1215*b* may sense a distance to the bottom surface of the housing 721 and 722 when the filter cleaner 72 moves downward.

Since the sensor unit 1215 of the present invention is disposed at the top end and the bottom end of the guide rail 711, limitation to the layout of the filter cleaning assembly VII is minimized, thereby increasing design freedom.

Figure 26:
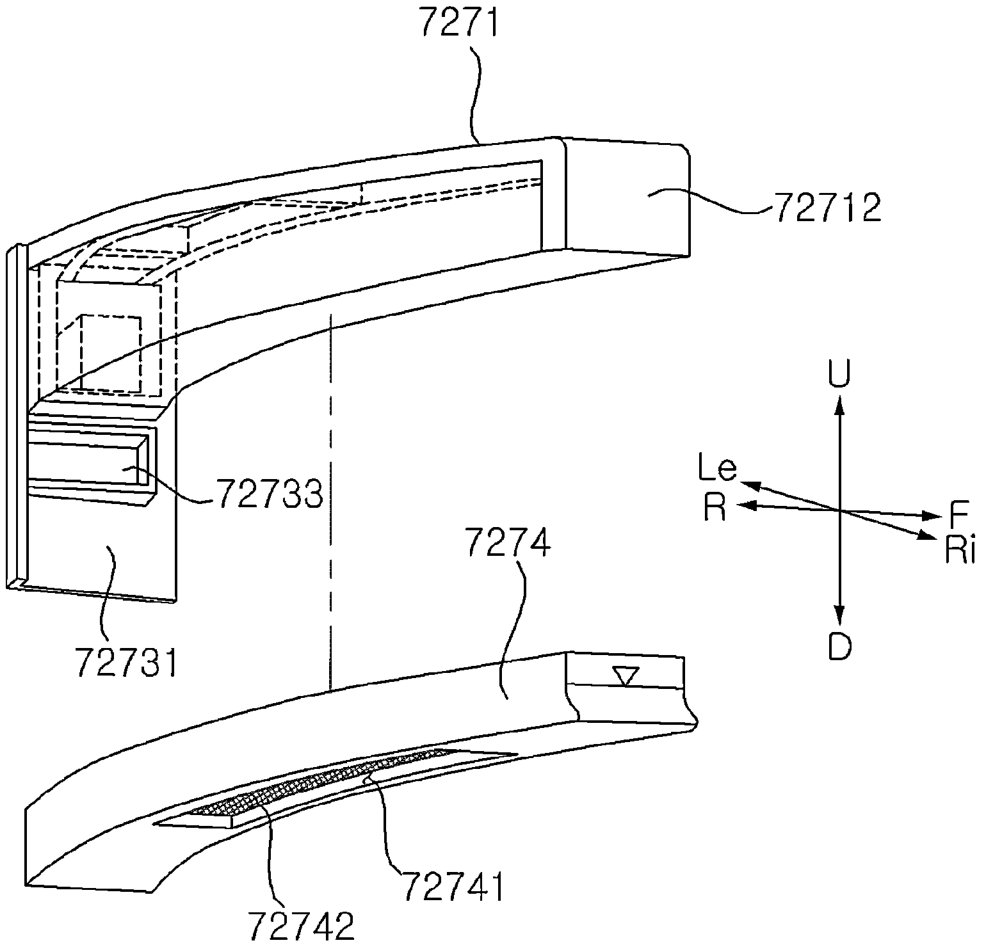
FIG. 26 is a side perspective view different from FIG. 25.

FIG. 26 is a diagram for explanation of how to control a moving speed of the guide rail 711 when the filter cleaner moves in an upward direction of the guide rail 711 and when the filter cleaner moves in a downward direction of the guide rail 711.

Referring to the drawing, the air conditioner of the present invention may include an upper cabinet 11 having an air suction port formed on a rear surface thereof, and a filter module 62*a*, 62*b*, 62*c*, and 62*d* may be disposed on the air suction port to filter air that flows into an inner space.

The guide rail 711 may extends from the center of the top of the filter module 62*a*, 62*b*, 62*c*, and 62*d* in a direction toward the center of the bottom thereof, and the guide rail 711 may guide upward and downward movement of the filter cleaner 72.

The filter cleaner 72 may include a gear motor 7251*a* and 7251*b* generating a driving force to enable the filter cleaner 72 to move, an agitator 723*a* and 723*b* enabled to rotate in friction contact with the filter module 62*a*, 62*b*, 62*c*, and 62*d*, and a housing 721 and 722 accommodating the gear motor 7251*a* and 7251*b* and the agitator 723*a* and 723*b*.

The gear motor 7251*a* and 7251*b* may transfer a driving force to mobile gear 725*a* and 725*b*, and the mobile gear 725*a* and 725*b* may include pinion gear teeth formed in a circumferential direction.

An upper distance sensor 1215*a* may be disposed at the top end of the guide rail 711. Alternatively, the upper distance sensor 1215 may be disposed at a position in the guide rail 711 which corresponds to a maximum upward moving path of the filter cleaner 711.

A lower distance sensor 1215*b* may be disposed at the bottom end of the guide rail 711. Alternatively, the lower distance sensor 1215*b* may be disposed at a position in the guide rail 711 which corresponds to a maximum downward moving path of the filter cleaner 72.

The upper distance sensor 1215*a* may sense a distance to the top surface of the housing 721 and 722 when the filter cleaner 72 moves upward. The lower distance sensor 1215*b* may sense a distance to the bottom surface of the housing 721 and 722 when the filter cleaner 72 moves downward.

The upward distance sensor 1215*a* and the lower distance sensor 1215*b* may be implemented as a limited switch or a photo sensor. Preferably, the upper distance sensor 1215*a* and the lower distance sensor 1215*b* may be implemented by employing infrared rays. That is, each of the upper distance sensor 1215*a* and the lower distance sensor 1215*b* may include an IR sensor.

The controller 1240 may control a moving speed of the filter cleaner 72 based on distance information sensed by the sensor unit 1215.

More specifically, when the filter cleaner 72 reaches a preset first approach distance, the controller 1240 may perform control such that a moving speed of the filter cleaner 72 decreases.

When the filter cleaner 72 reaches the first approach preset distance, the controller 1240 may linearly decreases the moving speed of the filter cleaner 72. In this case, the gradient of the moving speed may be a first gradient (slope 1).

Meanwhile, the first approach distance may be set in consideration of structure, design, a tonality level of the air conditioner. For example, the air conditioner of the present invention may analyze noise occurring upon driving of the filter cleaner 72 through experiments, and set the first approach distance to be a distance of the filter cleaner 72 at a point in time when the tonality level is at the minimum.

In this case, tonality may be understood as quantitively expressing a level of annoyance of a note perceived by a human in Sound Quality (SQ) index.

When the filter cleaner 72*b* reaches a second approach distance shorter than the first approach distance, the controller 1240 may perform control such that the filter cleaner 72 stops.

The second approach distance may be information on a distance to the filter cleaner 72 sensed by the upper distance sensor 1215*a* or the lower distance sensor 1215*b* when the filter cleaner 72 is brought into contact with the upper distance sensor 1215*a* or the lower distance sensor 1215*b*.

Alternatively, the second approach distance may be information on a distance to the filter cleaner 72 sensed by the upper distance sensor 1215*a* or the lower distance sensor 1215*b* when the filter cleaner 72 arrives at the highest position up to which the filter cleaner 72 is allowed to reach along the guide rail 711.

Meanwhile, the above procedure may be performed in response to both upward movement and downward movement of the filter cleaner 72. That is, when the filter cleaner 72 moves upward, the controller 1240 may control a moving speed of the filter cleaner 72 based on distance information sensed by the upper distance sensor 1215*a*.

In addition, when the filter cleaner 72 moves downward, the controller may control a moving speed of the filter cleaner 72 based on distance information sensed by the lower distance sensor 1215*b*.

When the filter cleaner 72 reaches the second approach distance, the controller 1240 may change a direction of rotation of the gear motor 7251*a* and 7251*b*. For example, when the filter cleaner 72 reaches the second approach distance while moving upward, the controller 1240 may change a direction of rotation of the gear motor 7251*a* and 7251*b* such that the filter cleaner 72 moves downward.

In another example, when the filter cleaner 72 reaches the second approach distance while moving downward, the controller 1240 may change a direction of rotation of the gear motor 7251*a* and 7251*b* such that the filter cleaner 72 moves upward.

In this case, the controller 1240 may linearly increase a moving speed of the filter cleaner 72 until the filter cleaner 72 reaches a preset deviation distance. In addition, the gradient of the moving speed may be a second gradient (slope 2).

The deviation distance may be set in consideration of structure, design, tonality level, etc. of the air conditioner.

Meanwhile, an absolute value of the second gradient (slope 2) may be greater than an absolute value of the first gradient (slope 1). That is, when the filter cleaner 72 reaches the second approach distance, the controller 1240 may change a direction of rotation of the gear motor 7251*a* and 7251*b* such that the filter cleaner 72 quickly moves at the maximum speed in the opposite direction. Accordingly, the air conditioner may reduce a filter cleaning time.

Figure 36:
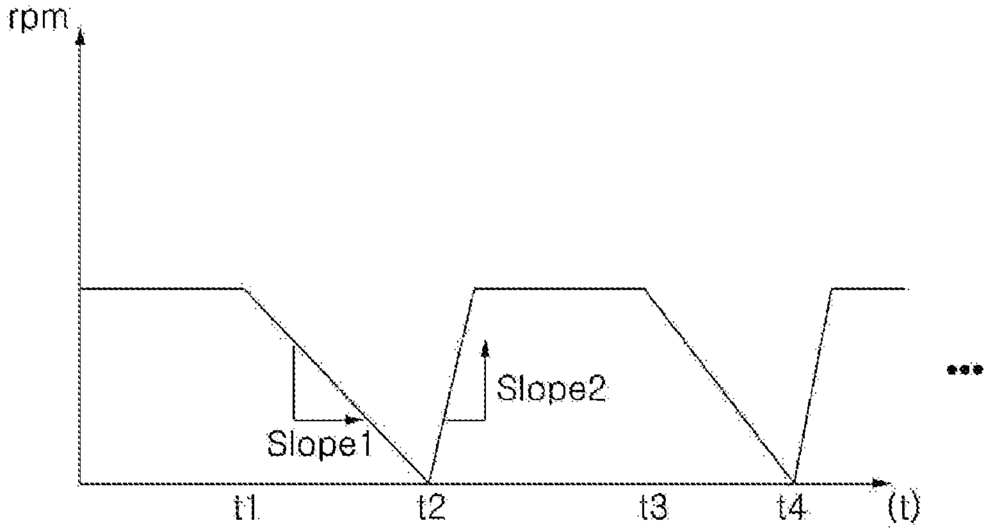
FIG. 36 is a diagram for explanation of how to control a moving speed by a guide rail when a filter cleaner moves in an upward direction and a downward direction of the guide rail.

In FIG. 36, as described above, when the filter cleaner reaches the preset first approach distance (t1), the controller 1240 may linearly reduce a moving speed of the filter cleaner 72 such that the filter cleaner 72 stops at the second approach distance (t2). In this case, the gradient of the moving speed may be a first gradient (slope 1).

In addition, when the filter cleaner 72 reaches the second approach distance, the controller 1240 (t2), the controller 1240 may linearly increases the moving speed of the filter cleaning unit until the filter cleaner 72 reaches the preset deviation distance. In this case, the gradient of the moving speed may be a second gradient (slope 2).

In addition, the filter cleaner 72 may start from a lower portion of the guide rail 711 and may reciprocate at least one time on the moving path. The number of times of reciprocation of the filter cleaner 72 may be automatically set in correspondence to an amount of foreign substances stuck in the filter module 62*a*, 62*b*, 62*c*, and 62*d*. Alternatively, the number of times of reciprocation of the filter cleaner 72 may be manually set in accordance with a user's filter cleaning command.

Figure 27:
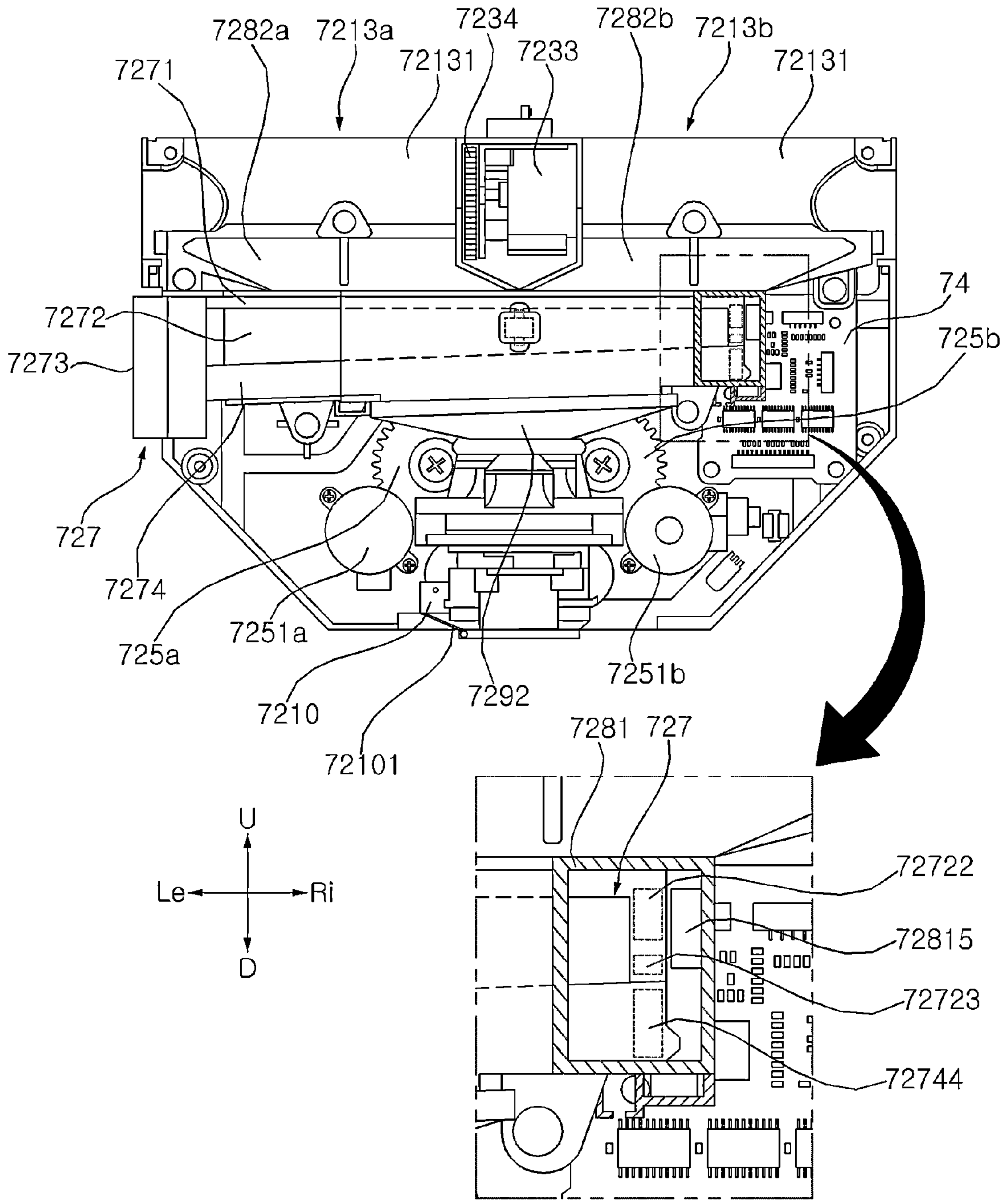
FIG. 27 is a rear view for explanation of coupling between a dust container body and a connection housing according to an embodiment of the present invention.
Figure 28:
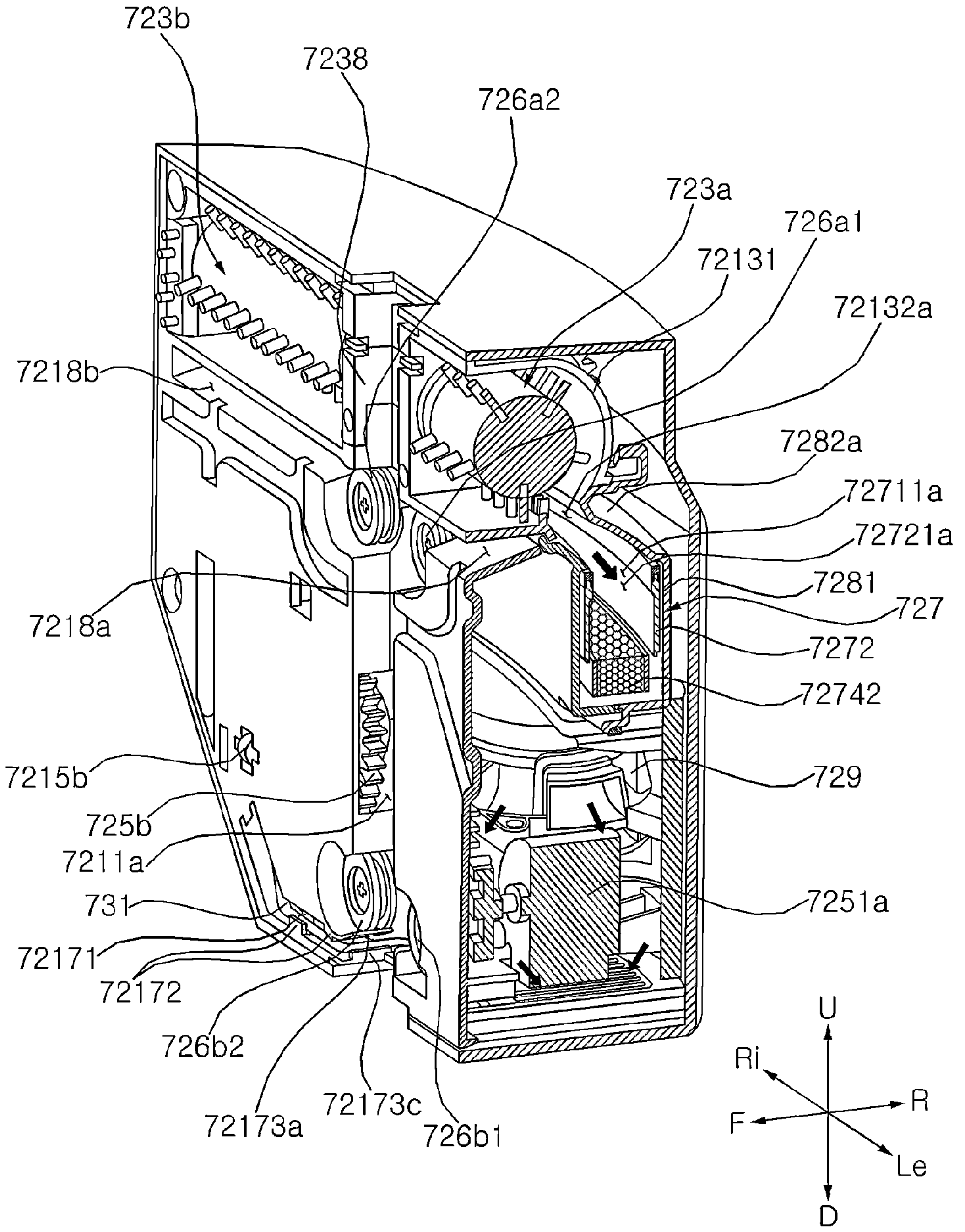
FIG. 28 is a perspective cross-sectional view cut along X1-X1' in FIG. 12.
Figure 29:
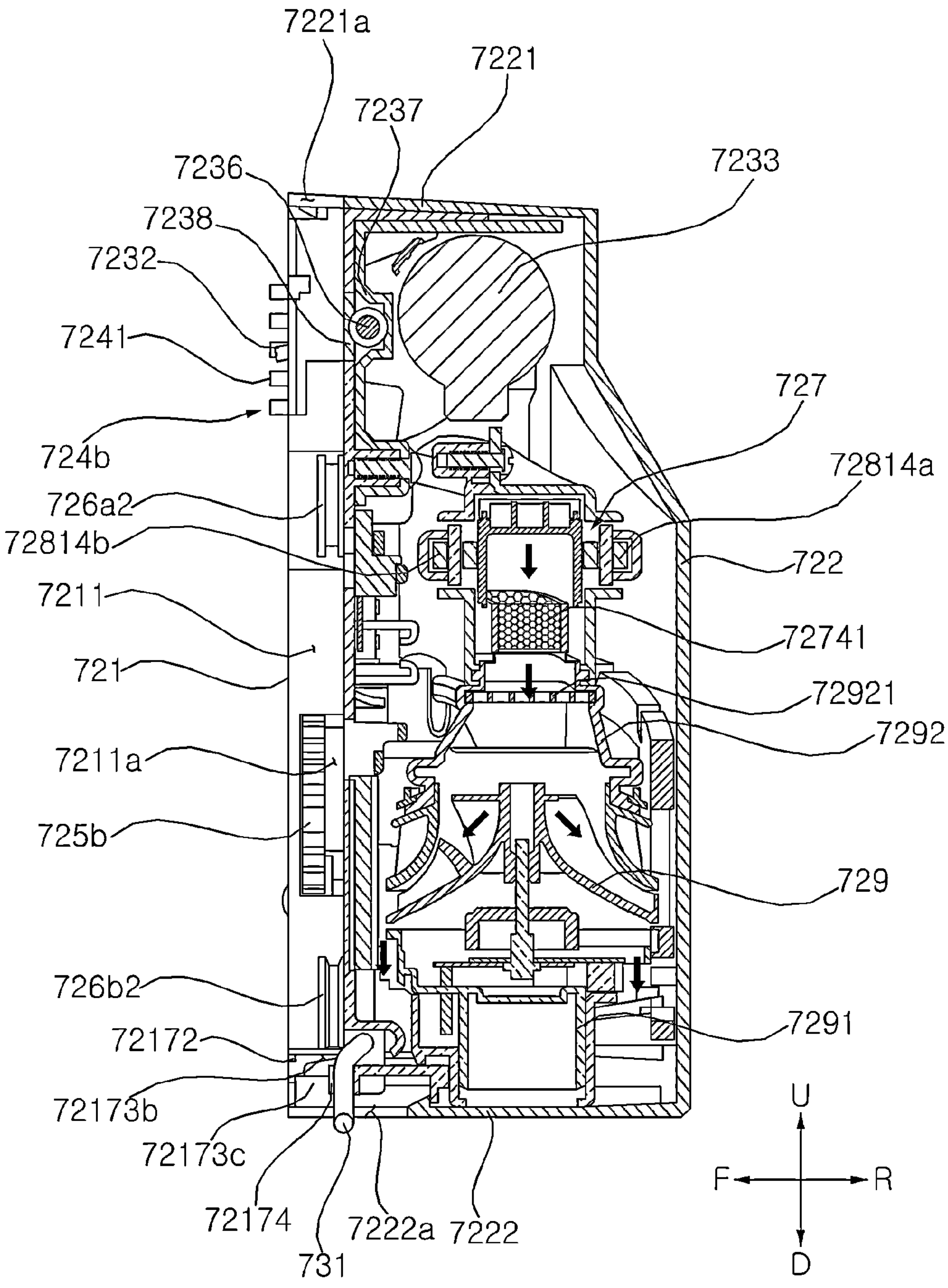
FIG. 29 is a cross-sectional view cut along line X2-X2' in FIG. 12.
Figure 30:
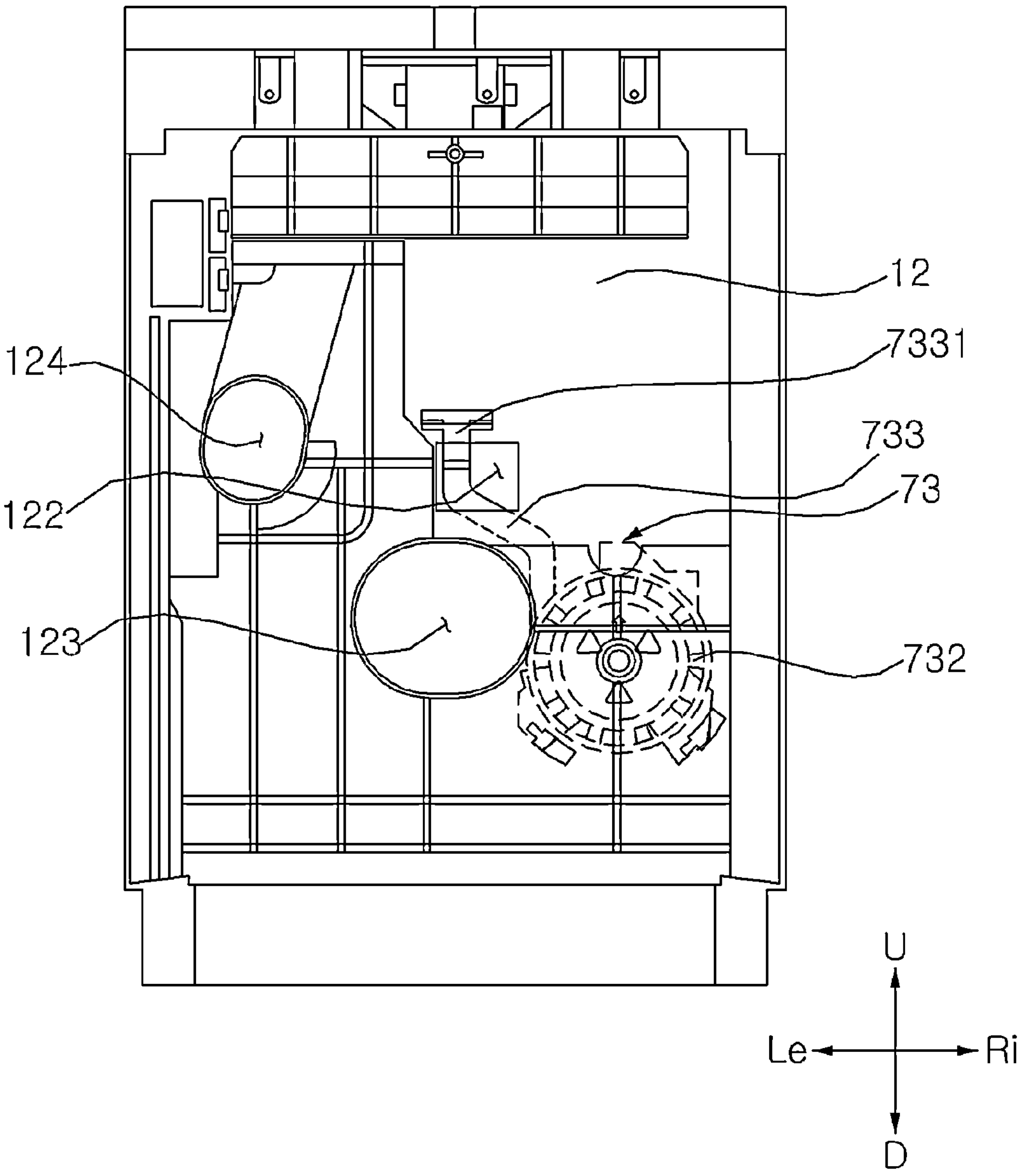
FIG. 30 is a diagram for explanation of a base unit and a power supply device disposed inside and outside the base unit according to an embodiment of the present invention.
Figure 31:
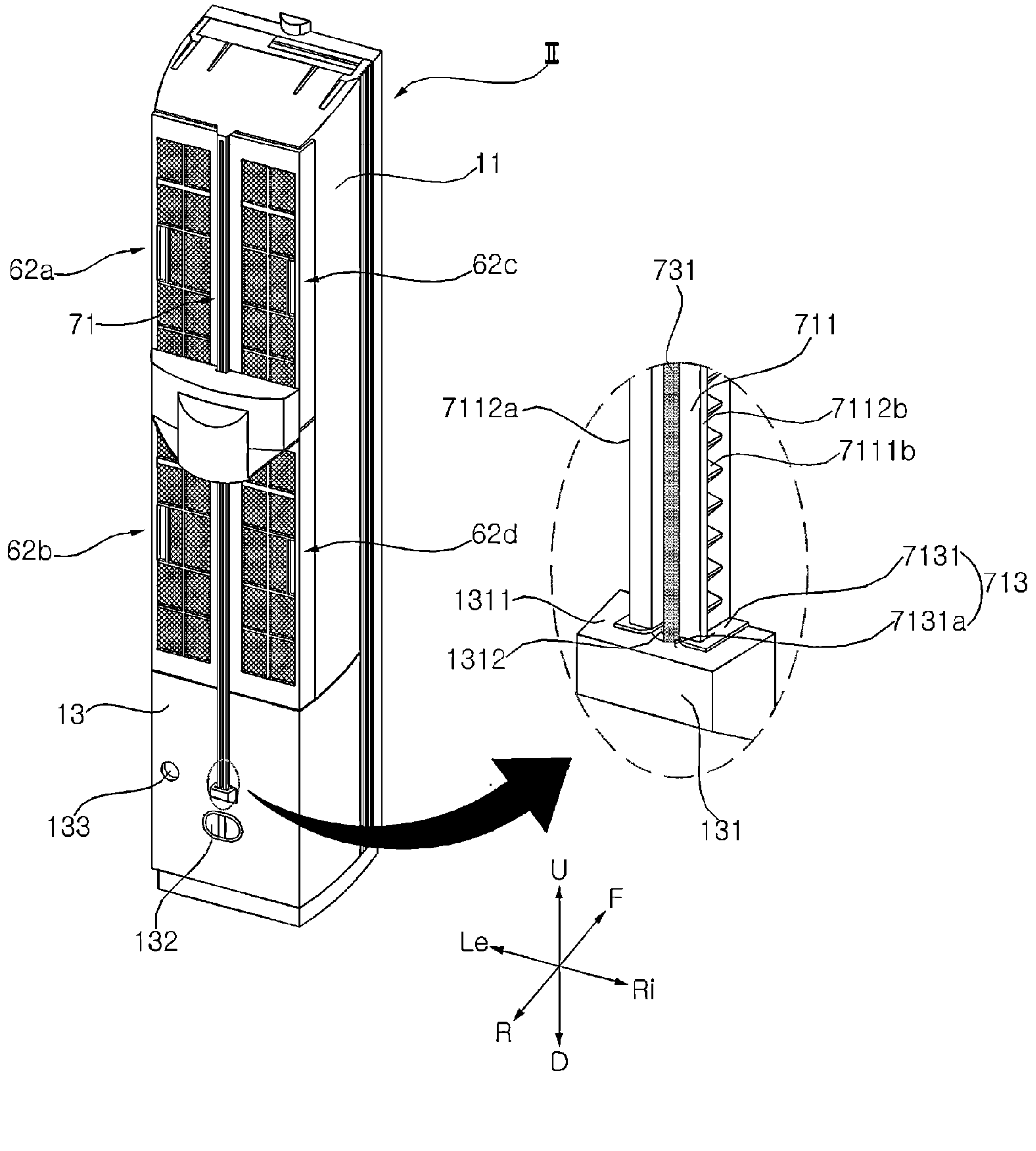
FIG. 31 is a diagram for explanation of a state in which a filter cleaner moves along a guide rail according to an embodiment of the present invention.

FIG. 27 is a flowchart illustrating a method for operating an air conditioner according to an embodiment of the present invention.

Referring to the drawing, the air conditioner may perform a filter cleaning function automatically or manually in accordance with a user's command by sensing an amount of foreign substances stuck in the filter module 62*a*, 62*b*, 62*c*, and 62*d*.

The controller 1240 may perform control such that an initial position of the filter cleaner 72 is located at the lower end of the movement guider. To this end, the controller 1240 may control a rotational direction and a speed of the gear motor 7251*a* and 7251*b*.

The controller 1240 may perform control such that the filter cleaner 72 moves upward (S1601). While the filter cleaner 72 moves upward, the agitator 723*a* and 723*b* may be driven by a separate agitator motor (not shown) in link with the gear motor 7251*a* and 7251*b*.

While rotating, the agitator 723*a* and 723*b* may separate foreign substances from the filter module 62*a*, 62*b*, 72*c*, and 62*d*. The foreign substances separated from the filter module 62*a*, 62*b*, 62*c*, and 62*d* may be collected in a foreign substance collection space within the housing 721 and 722 or may be collected in a separate foreign substances collection container.

The upper distance sensor 1215*a* may be disposed at the top end of the guide rail 711. Alternatively, the upper distance sensor 1215*a* may be disposed at a position corresponding to a maximum upward moving path of the filter cleaner 72.

The upper distance sensor 1215*a* may sense a distance to the top surface of the housing 721 and 722 (S1603).

The controller 1240 may calculate an approach distance of the filter cleaner 72 (S1605). In the case where the filter cleaner 72 fails to reach the first approach distance, the controller 1240 may perform control such that the filter cleaner 72 moves upward with a moving speed maintained.

When the filter cleaner 72 reaches the preset first approach distance, the controller 1240 may perform control such that a moving speed of the filter cleaner 72 decreases (S1607). Specifically, the controller 1240 may linearly decreases the moving speed of the cleaner 72. In this case, the gradient of the moving speed may be a first gradient (slope 1).

The controller 1240 may calculate whether the filter cleaner 72 reaches the second approach distance (S1609).

When the filter cleaner 72 fails to arrive the second approach distance, the controller 1240 may linearly decreases the moving speed of the filter cleaner 72 to have the first gradient (slope 1).

When the filter cleaner 72 reaches the second approach distance, the controller 1250 may perform control such that the filter cleaning unit stops (S1611). In this case, the second approach distance may be information on a distance to the filter cleaner 72 sensed by the upper distance sensor 1215*a* when the filter cleaner 72 is brought into contact with the upper distance sensor 1215*a*.

Alternatively, the second approach distance may be information on a distance to the cleaning unit 710 sensed by the upper distance sensor 1215*a* when the filter cleaner 72 arrives at the highest position up to which the filter cleaner 72 is allowed to reach along the guide rail 711.

At the highest position up to which the filter cleaner 72 is allowed to reach, the controller 1240 may change a direction of rotation of the gear motor 7251*a* and 251*b* to move the filter cleaner 72 downward (S1613).

In this case, the controller 1240 may linearly increase a moving speed of the filter cleaner 72 until the filter cleaner 72 reaches a preset deviation distance. In addition, the gradient of the moving speed may be a second gradient (slope 2).

Even in this case, foreign substances stuck in the filter module 62*a*, 62*b*, 62*c*, and 62*d* may be separated from the agitator 723*a* and 723*b* and collected in a foreign substances collection space in the housing 721 and 722 and/or a separate foreign substances collection container.

Meanwhile, for rapid filter cleaning, it is preferable that the preset deviation distance is smaller than the first approach distance.

The lower distance sensor 1215*b* may be disposed at the bottom end of the guide rail 711. Alternatively, the lower distance sensor 1215*b* may be disposed at the lowest position up to which the filter cleaner 72 is allowed to reach.

The lower distance sensor 1215*b* may sense a distance to the bottom surface of the housing 721 and 722 (S1615).

The controller 1240 may calculate an approach distance of the filter cleaner 72 (S1617). When the filter cleaner 72 fails to reach the first approach distance, the controller 1240 may perform control such that the filter cleaner 72 moves downward with maintaining a moving speed of when the filter cleaner 72 reaches the deviation distance.

When the filter cleaner 72 reaches the preset first approach distance, the controller 1240 may perform control such that the moving speed of the filter cleaner 72 decreases (S1619). Specifically, the controller 1240 may linearly decreases a moving speed of the filter cleaner 72. In this case, the gradient of the moving speed may be a first gradient (slope 1).

The controller 1240 may calculate whether the filter cleaner 72 reaches the second approach distance (S1621). When the filter cleaner 72 fails to reach the second approach distance, the controller 1240 may linearly decreases the moving speed of the filter cleaner 72 to have the first gradient (slope 1).

When the filter cleaner 72 reaches the second approach distance, the controller 1240 may perform control such that the filter cleaning unit stops (S1623). In this case, the second approach distance may be information on a distance to the filter cleaner 72 sensed by the lower distance sensor 1215*b* when the filter cleaner 72 is brought into contact with the lower distance sensor 1215*b*.

Alternatively, the second approach distance may be information on a distance to the filter cleaning unit 710 sensed by the lower distance sensor 1215*b* when the filter cleaner 72 arrives at the lowest position up to which the filter cleaner 72 is allowed to reach along the guide rail 711.

Figure 37:
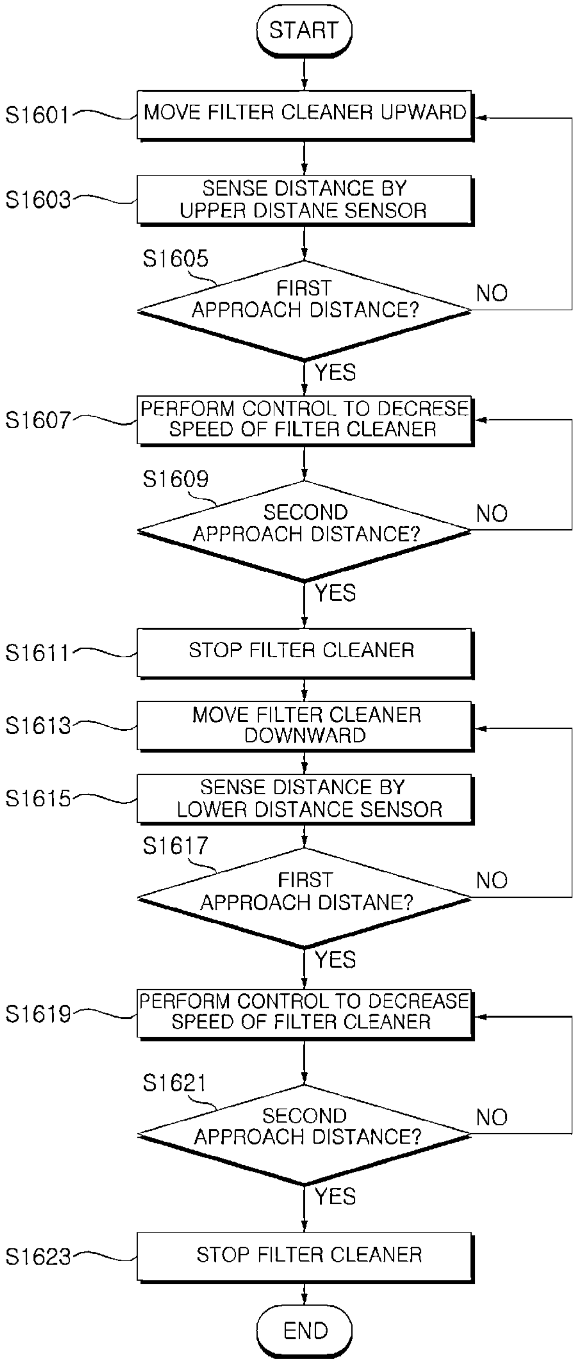
FIG. 37 is a flowchart showing an operation method of an air conditioner according to an embodiment of the present invention.

The procedure shown in FIG. 37 may be performed at least once in a downward direction of the guide rail 711.

As described above, the air conditioner of the present invention may perform control to decrease a moving speed of the filter cleaner 72 in a preset distance, thereby reducing noise caused by operation of the filter cleaner 72.

In addition, the air conditioner may control a speed of the filter cleaner 72 to reduce noise caused by friction between the filter cleaner 72 and the guide rail 711 and/or overswing of the filter cleaner 72, and to prevent an error.

In addition, the air conditioner of the present invention may reduce noise caused by operation of the filter cleaner 72, thereby minimizing an unpleasant feeling to a user.

Figure 38:
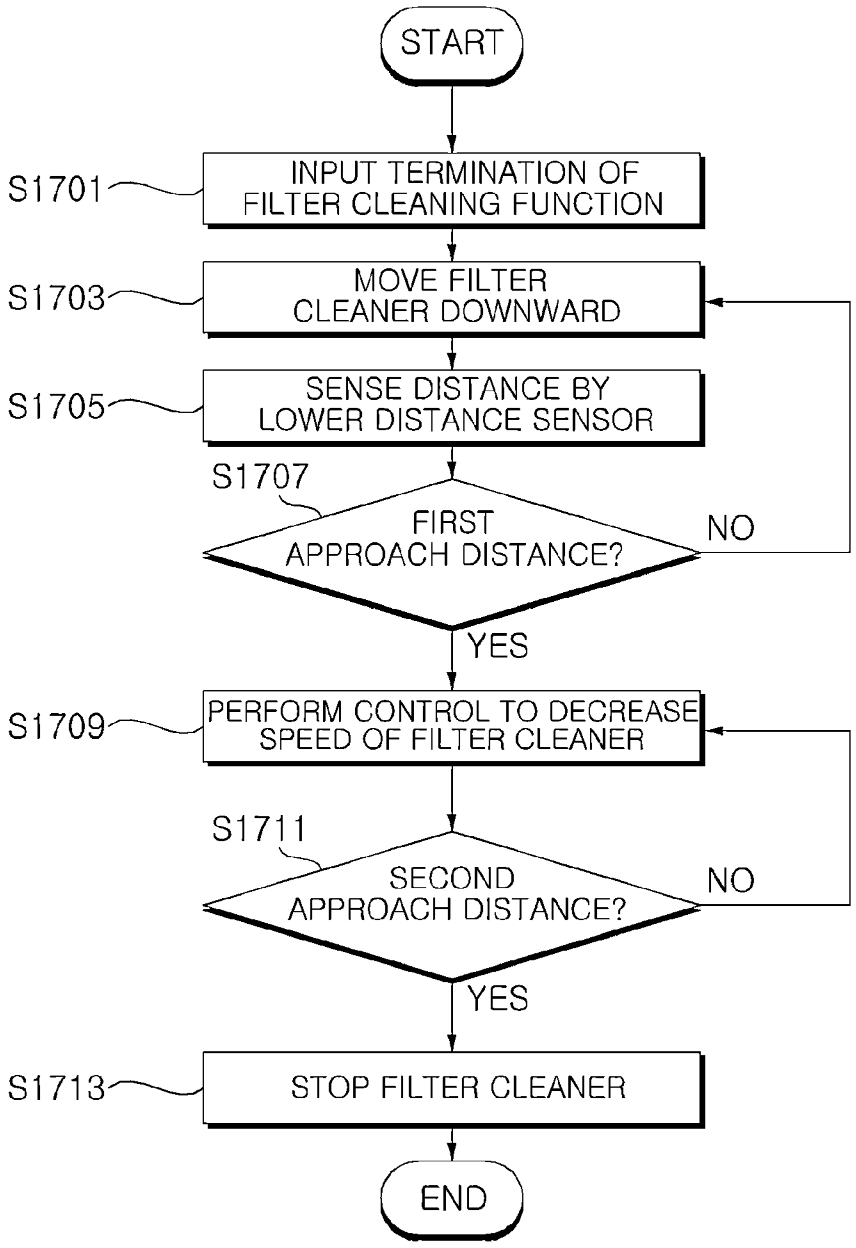
FIG. 38 is a flowchart showing an operation method of an air conditioner according to an embodiment of the present invention.

FIG. 38 is a flowchart showing an operation method of an air conditioner according to an embodiment of the present invention.

Referring to the drawing, the air conditioner may automatically or manually receive a filter cleaning termination signal by sensing an amount of foreign substances stuck in the filter module 62*a*, 62*b*, 62*c*, and 62*d* (S1701).

When the filter cleaning termination signal is received while the filter cleaner 72 moves upward, the controller 1240 may perform control such that the filter cleaner 72 moves downward.

Alternatively, when the filter cleaning termination signal is received while the filter cleaner 72 moves upward, the controller 1240 may perform control such that the filter cleaner 72 moves upward by a second approach distance and then moves downward (S1703).

The lower distance sensor 1215*b* may sense a distance to the bottom surface of the housing 721 and 722 (S1705).

The controller 1240 may calculate an approach distance of the filter cleaner 72 (S1707). When the filter cleaner 72 fails to reach a first approach distance, the controller 1240 may perform control such that the filter cleaner 72 moves downward with a moving speed maintained.

When the filter cleaner 72 reaches the preset first approach distance, the controller 1240 may perform control such that a moving speed of the filter cleaner 72 decreases (S1709).

Specifically, the controller 1240 may linearly decrease the moving speed of the filter cleaner 72. In this case, the gradient of the moving speed may be a first gradient (slope 1).

The controller 1240 may calculate whether the filter cleaner 72 reaches a second approach distance (S1711). When the filter cleaner 72 fails to reach the second approach distance, the controller 1240 may linearly decreases the moving speed of the filter cleaner 72 to have the first gradient (slope 1).

When the filter cleaner 72 reaches the second approach distance, the controller 1240 may perform control such that the filter cleaning unit stops (S1713).

That is, when terminating a filter cleaning function, the controller 1240 may control the filter cleaner 72 to move in a downward direction of the guide rail 711, and, in the meantime, linearly decreasing the moving speed of the filter cleaner 72 so that the filter cleaner 72 is positioned at the lower end of the guide rail 711.

The accompanying drawings are used to help easily understand various embodiments of the present disclosure and it should be understood that the embodiments presented herein are not limited by the accompanying drawings, and the present disclosure should be construed to extend to any alterations, equivalents and substitutes in addition to those which are particularly set out in the accompanying drawings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing are advantageous.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed is:

1. An air conditioner comprising:

a cabinet assembly defining an external appearance of the air conditioner and having an air suction port formed therein;

a filter assembly disposed at the air suction port to remove a foreign substance from air; and a filter cleaning assembly configured to remove the foreign substance from the filter assembly, wherein the filter cleaning assembly comprises:

a filter cleaner configured to remove the foreign substance from the filter assembly;

a movement guider configured to guide movement of the filter cleaner; and a power supply device configured to supply power to the filter cleaner, wherein the movement guider comprises:

a guide rail configured to guide movement of the filter cleaner; and a downward movement limiting part configured to limit downward movement of the filter cleaner moving along the guide rail, wherein a distance from the downward movement limiting part to a lower end of the air suction port is greater than a vertical length of the filter cleaner.

2. The air conditioner of claim 1, wherein a rearward protruding cover having a power line hole through which a power line connected to the filter cleaner passes is disposed on a rear surface of the cabinet assembly, wherein the downward movement limiting part is disposed on a top of the rearward protruding cover.

3. The air conditioner of claim 2, wherein the cabinet assembly comprises:

an upper cabinet having the suction port formed at a rear surface thereof; and a lower cabinet disposed under the upper cabinet and having the rearward protruding cover disposed on a rear surface thereof.

4. The air conditioner of claim 3, wherein a distance from an upper surface of the rearward protruding cover to a top of the lower cabinet is greater than the vertical length of the filter cleaner.

5. The air conditioner of claim 3, wherein the guide rail comprises:

an upper guide rail disposed in rear of the upper cabinet; and a lower guide rail disposed in rear of the lower cabinet, wherein a length of the lower guide rail is greater than the vertical length of the filter cleaner.

6. The air conditioner of claim 3, wherein the guide rail extends from a top of the upper cabinet to the downward movement limiting part.

7. The air conditioner of claim 3, wherein a lower end of the filter assembly is disposed on top of the lower cabinet.

8. The air conditioner of claim 3, wherein the downward movement limiting part comprises a lower plate disposed on an upper surface of the rearward protruding cover and having a lower plate groove formed at a position thereof corresponding to the power line hole.

9. The air conditioner of claim 1, wherein the filter cleaner comprises a lower detection sensor configured to detect contact with the downward movement limiting part.

10. The air conditioner of claim 9, wherein the lower detection sensor comprises a detection lever protruding downwardly from the filter cleaner, wherein an end of the detection lever contacts the downward movement limiting part when the filter cleaner moves downward.

11. The air conditioner of claim 1, wherein the air conditioner further comprises a controller configured to adjust a position of the filter cleaner to a position where the filter cleaner contacts the downward movement limiting part when cleaning of the filter assembly has been completed.

12. An air conditioner comprising:

a cabinet assembly defining an external appearance of the air conditioner and having an air suction port formed therein;

a filter assembly disposed at the air suction port to remove a foreign substance from air; and a filter cleaning assembly configured to remove the foreign substance from the filter assembly, wherein the filter cleaning assembly comprises:

a filter cleaner configured to remove the foreign substance from the filter assembly;

a movement guider configured to guide movement of the filter cleaner; and a power supply device configured to supply power to the filter cleaner, wherein when the filter cleaner is positioned at a lowest position in a movement range in which the filter cleaner is able to move along the movement guider, a vertical level of an upper end of the filter cleaner is lower than a vertical level of a lower end of the filter assembly, wherein the movement guider comprises:

a guide rail configured to guide movement of the filter cleaner; and a downward movement limiting part coming into contact with the filter cleaner when the filter cleaner is positioned at the lowest position in the movement range in which the filter cleaner is able to move along the movement guider.

13. The air conditioner of claim 12, wherein the filter assembly comprises:

a filter module configured to remove foreign substances from flowing air; and a filter mounting member on which the filter module is mounted, wherein when the filter cleaner is positioned at the lowest position in the movement range in which the filter cleaner is able to move along the movement guider, a position of the filter module is changed so that a width direction of the filter module is aligned with a frontward direction.

14. The air conditioner of claim 12, wherein a rearward protruding cover having a power line hole through which a power line connected to the filter cleaner passes is disposed on a rear surface of the cabinet assembly, wherein the downward movement limiting part is disposed on a top of the rearward protruding cover.

15. The air conditioner of claim 14, wherein the downward movement limiting part comprises a lower plate disposed on an upper surface of the rearward protruding cover and having a lower plate groove formed at a position thereof corresponding to the power line hole.

16. The air conditioner of claim 12, wherein the filter cleaner comprises a lower detection sensor configured to detect contact with the downward movement limiting part.

17. The air conditioner of claim 16, wherein the lower detection sensor comprises a detection lever protruding downwardly of the filter cleaner, wherein an end of the detection lever contacts the downward movement limiting part when the filter cleaner moves downward.

18. The air conditioner of claim 12, wherein the air conditioner further comprises a controller configured to adjust a position of the filter cleaner to a position where the filter cleaner contacts the downward movement limiting part when cleaning of the filter assembly has been completed.

* * * * *